US011637390B2

(12) United States Patent
Zerebilov et al.

(10) Patent No.: US 11,637,390 B2
(45) Date of Patent: Apr. 25, 2023

(54) I/O CONNECTOR CONFIGURED FOR CABLE CONNECTION TO A MIDBOARD

(71) Applicant: FCI USA LLC, Etters, PA (US)

(72) Inventors: Arkady Y. Zerebilov, Lancaster, PA (US); R. Brad Brubaker, Etters, PA (US)

(73) Assignee: FCI USA LLC, Etters, PA (US)

( * ) Notice: Subject to any disclaimer, the term of this patent is extended or adjusted under 35 U.S.C. 154(b) by 0 days.

(21) Appl. No.: 17/535,425

(22) Filed: Nov. 24, 2021

(65) Prior Publication Data
US 2022/0158371 A1 May 19, 2022

Related U.S. Application Data

(63) Continuation of application No. 16/750,967, filed on Jan. 23, 2020, now Pat. No. 11,189,943.
(Continued)

(51) Int. Cl.
*H01R 12/53* (2011.01)
*H01R 12/71* (2011.01)
(Continued)

(52) U.S. Cl.
CPC .......... *H01R 12/53* (2013.01); *H01R 12/716* (2013.01); *H01R 13/502* (2013.01); *H01R 13/6581* (2013.01); *H01R 13/6592* (2013.01)

(58) Field of Classification Search
CPC ................ G02B 6/4278; G02B 6/4246; G02B 6/4292; G02B 6/428; H01R 13/6592;
(Continued)

(56) References Cited

U.S. PATENT DOCUMENTS

| 2,124,207 A | 7/1938 | Carl |
| 2,996,710 A | 8/1961 | Pratt |

(Continued)

FOREIGN PATENT DOCUMENTS

| CN | 2519434 Y | 10/2002 |
| CN | 1127783 C | 11/2003 |

(Continued)

OTHER PUBLICATIONS

International Preliminary Report on Patentability for International Application No. PCT/US2018/039919 dated Jan. 16, 2020.
(Continued)

*Primary Examiner* — Jean F Duverne
(74) *Attorney, Agent, or Firm* — Wolf, Greenfield & Sacks, P.C.

(57) ABSTRACT

An I/O connector assembly configured for making a cabled connection to an interior portion of a printed circuit board for signals passing through the connector. The assembly may include a receptacle connector, a cage and cables, terminated to conductive elements of the terminal subassemblies, extending through the cage to the midboard. The terminal subassemblies may have first type conductive elements configured for mounting to the printed circuit board and second type conductive elements configured for terminating cables. Features may be included for precise positioning of the receptacle connector formed with the terminal subassemblies relative to the cage such that connector to connector variation in the positioning of the contact portions of the conductive elements in the terminal subassembly is provided. A mating plug may be designed with low wipe, which improves high frequency performance of the mated connector system.

20 Claims, 32 Drawing Sheets

Related U.S. Application Data

(60) Provisional application No. 62/952,009, filed on Dec. 20, 2019, provisional application No. 62/796,913, filed on Jan. 25, 2019.

(51) Int. Cl.
  *H01R 13/502* (2006.01)
  *H01R 13/6581* (2011.01)
  *H01R 13/6592* (2011.01)

(58) Field of Classification Search
  CPC .............. H01R 13/6581; H01R 12/716; H01R 12/53; H01R 13/502
  See application file for complete search history.

(56) References Cited

U.S. PATENT DOCUMENTS

| | | |
|---|---|---|
| 3,002,162 A | 9/1961 | Garstang |
| 3,007,131 A | 10/1961 | Dahlgren et al. |
| 3,075,167 A | 1/1963 | Kinkaid |
| 3,134,950 A | 5/1964 | Cook |
| 3,229,240 A | 1/1966 | Harrison et al. |
| 3,322,885 A | 5/1967 | May et al. |
| 3,594,613 A | 7/1971 | Prietula |
| 3,715,706 A | 2/1973 | Michel et al. |
| 3,720,907 A | 3/1973 | Asick |
| 3,786,372 A | 1/1974 | Epis et al. |
| 3,825,874 A | 7/1974 | Peverill |
| 3,863,181 A | 1/1975 | Glance et al. |
| 4,083,615 A | 4/1978 | Volinskie |
| 4,155,613 A | 5/1979 | Brandeau |
| 4,157,612 A | 6/1979 | Rainal |
| 4,195,272 A | 3/1980 | Boutros |
| 4,275,944 A | 6/1981 | Sochor |
| 4,276,523 A | 6/1981 | Boutros et al. |
| 4,307,926 A | 12/1981 | Smith |
| 4,371,742 A | 2/1983 | Manly |
| 4,408,255 A | 10/1983 | Adkins |
| 4,447,105 A | 5/1984 | Ruehl |
| 4,471,015 A | 9/1984 | Ebneth et al. |
| 4,484,159 A | 11/1984 | Whitley |
| 4,490,283 A | 12/1984 | Kleiner |
| 4,518,651 A | 5/1985 | Wolfe, Jr. |
| 4,519,664 A | 5/1985 | Tillotson |
| 4,519,665 A | 5/1985 | Althouse et al. |
| 4,615,578 A | 10/1986 | Stadler et al. |
| 4,632,476 A | 12/1986 | Schell |
| 4,636,752 A | 1/1987 | Saito |
| 4,639,054 A | 1/1987 | Kersbergen |
| 4,682,129 A | 7/1987 | Bakermans et al. |
| 4,697,862 A | 10/1987 | Hasircoglu |
| 4,708,660 A | 11/1987 | Claeys et al. |
| 4,724,409 A | 2/1988 | Lehman |
| 4,728,762 A | 3/1988 | Roth et al. |
| 4,751,479 A | 6/1988 | Parr |
| 4,761,147 A | 8/1988 | Gauthier |
| 4,795,375 A | 1/1989 | Williams |
| 4,804,334 A | 2/1989 | Alexeenko et al. |
| 4,806,107 A | 2/1989 | Arnold et al. |
| 4,826,443 A | 5/1989 | Lockard |
| 4,846,724 A | 7/1989 | Sasaki et al. |
| 4,846,727 A | 7/1989 | Glover et al. |
| 4,871,316 A | 10/1989 | Herrell et al. |
| 4,878,155 A | 10/1989 | Conley |
| 4,889,500 A | 12/1989 | Lazar et al. |
| 4,913,667 A | 4/1990 | Muz |
| 4,924,179 A | 5/1990 | Sherman |
| 4,948,922 A | 8/1990 | Varadan et al. |
| 4,949,379 A | 8/1990 | Cordell |
| 4,970,354 A | 11/1990 | Iwasa et al. |
| 4,975,084 A | 12/1990 | Fedder et al. |
| 4,990,099 A | 2/1991 | Marin et al. |
| 4,992,060 A | 2/1991 | Meyer |
| 5,000,700 A | 3/1991 | Masubuchi et al. |
| 5,037,330 A | 8/1991 | Fulponi et al. |
| 5,057,029 A | 10/1991 | Noorily |
| 5,066,236 A | 11/1991 | Broeksteeg |
| 5,141,454 A | 8/1992 | Garrett et al. |
| 5,150,086 A | 9/1992 | Ito |
| 5,168,252 A | 12/1992 | Naito |
| 5,168,432 A | 12/1992 | Murphy et al. |
| 5,176,538 A | 1/1993 | Hansell, III et al. |
| 5,197,893 A | 3/1993 | Morlion et al. |
| 5,203,079 A | 4/1993 | Brinkman et al. |
| 5,266,055 A | 11/1993 | Naito et al. |
| 5,280,191 A | 1/1994 | Chang |
| 5,280,257 A | 1/1994 | Cravens et al. |
| 5,287,076 A | 2/1994 | Johnescu et al. |
| 5,306,171 A | 4/1994 | Marshall |
| 5,332,397 A | 7/1994 | Ingalsbe |
| 5,332,979 A | 7/1994 | Roskewitsch et al. |
| 5,334,050 A | 8/1994 | Andrews |
| 5,340,334 A | 8/1994 | Nguyen |
| 5,342,211 A | 8/1994 | Broeksteeg |
| 5,346,410 A | 9/1994 | Moore, Jr. |
| 5,366,390 A | 11/1994 | Kinross et al. |
| 5,387,130 A | 2/1995 | Fedder et al. |
| 5,393,234 A | 2/1995 | Yamada et al. |
| 5,402,088 A | 3/1995 | Pierro et al. |
| 5,429,520 A | 7/1995 | Morlion et al. |
| 5,429,521 A | 7/1995 | Morlion et al. |
| 5,433,617 A | 7/1995 | Morlion et al. |
| 5,433,618 A | 7/1995 | Morlion et al. |
| 5,435,757 A | 7/1995 | Fedder et al. |
| 5,441,424 A | 8/1995 | Morlion et al. |
| 5,456,619 A | 10/1995 | Belopolsky et al. |
| 5,461,392 A | 10/1995 | Mott et al. |
| 5,484,310 A | 1/1996 | McNamara et al. |
| 5,487,673 A | 1/1996 | Hurtarte |
| 5,496,183 A | 3/1996 | Soes et al. |
| 5,499,935 A | 3/1996 | Powell |
| 5,509,827 A | 4/1996 | Huppenthal et al. |
| 5,551,893 A | 9/1996 | Johnson |
| 5,554,038 A | 9/1996 | Morlion et al. |
| 5,562,497 A | 10/1996 | Yagi et al. |
| 5,597,328 A | 1/1997 | Mouissie |
| 5,598,627 A | 2/1997 | Saka et al. |
| 5,632,634 A | 5/1997 | Soes |
| 5,637,015 A | 6/1997 | Tan et al. |
| 5,651,702 A | 7/1997 | Hanning et al. |
| 5,669,789 A | 9/1997 | Law |
| 5,691,506 A | 11/1997 | Miyazaki et al. |
| 5,695,354 A | 12/1997 | Noda |
| 5,702,258 A | 12/1997 | Provencher et al. |
| 5,713,764 A | 2/1998 | Brunker et al. |
| 5,733,148 A | 3/1998 | Kaplan et al. |
| 5,743,765 A | 4/1998 | Andrews et al. |
| 5,781,759 A | 7/1998 | Kashiwabara |
| 5,796,323 A | 8/1998 | Uchikoba et al. |
| 5,797,770 A | 8/1998 | Davis et al. |
| 5,808,236 A | 9/1998 | Brezina et al. |
| 5,831,491 A | 11/1998 | Buer et al. |
| 5,865,646 A | 2/1999 | Ortega et al. |
| 5,924,890 A | 7/1999 | Morin et al. |
| 5,924,899 A | 7/1999 | Paagman |
| 5,981,869 A | 11/1999 | Kroger |
| 5,982,253 A | 11/1999 | Perrin et al. |
| 6,019,616 A | 2/2000 | Yagi et al. |
| 6,022,239 A | 2/2000 | Wright |
| 6,053,770 A | 4/2000 | Blom |
| 6,083,046 A | 7/2000 | Wu et al. |
| 6,095,825 A | 8/2000 | Liao |
| 6,095,872 A | 8/2000 | Lang et al. |
| 6,116,926 A | 9/2000 | Ortega et al. |
| 6,144,559 A | 11/2000 | Johnson et al. |
| 6,146,202 A | 11/2000 | Ramey et al. |
| 6,152,747 A | 11/2000 | McNamara |
| 6,168,466 B1 | 1/2001 | Chiou |
| 6,168,469 B1 | 1/2001 | Lu |
| 6,174,203 B1 | 1/2001 | Asao |
| 6,174,944 B1 | 1/2001 | Chiba et al. |
| 6,203,376 B1 | 3/2001 | Magajne et al. |
| 6,215,666 B1 | 4/2001 | Hileman et al. |

(56) References Cited

U.S. PATENT DOCUMENTS

| | | |
|---|---|---|
| 6,217,372 B1 | 4/2001 | Reed |
| 6,238,241 B1 | 5/2001 | Zhu et al. |
| 6,273,753 B1 | 8/2001 | Ko |
| 6,273,758 B1 | 8/2001 | Lloyd et al. |
| 6,283,786 B1 | 9/2001 | Margulis et al. |
| 6,285,542 B1 | 9/2001 | Kennedy, III et al. |
| 6,293,827 B1 | 9/2001 | Stokoe |
| 6,299,438 B1 | 10/2001 | Sahagian et al. |
| 6,299,483 B1 | 10/2001 | Cohen et al. |
| 6,322,379 B1 | 11/2001 | Ortega et al. |
| 6,328,601 B1 | 12/2001 | Yip et al. |
| 6,347,962 B1 | 2/2002 | Kline |
| 6,350,134 B1 | 2/2002 | Fogg et al. |
| 6,364,711 B1 | 4/2002 | Berg et al. |
| 6,364,718 B1 | 4/2002 | Polgar et al. |
| 6,366,471 B1 | 4/2002 | Edwards et al. |
| 6,371,788 B1 | 4/2002 | Bowling et al. |
| 6,375,510 B2 | 4/2002 | Asao |
| 6,379,188 B1 | 4/2002 | Cohen et al. |
| 6,398,588 B1 | 6/2002 | Bickford |
| 6,409,543 B1 | 6/2002 | Astbury, Jr. et al. |
| 6,447,337 B1 | 9/2002 | Anderson et al. |
| 6,452,789 B1 | 9/2002 | Pallotti et al. |
| 6,482,017 B1 | 11/2002 | Van Doorn |
| 6,489,563 B1 | 12/2002 | Zhao et al. |
| 6,503,103 B1 | 1/2003 | Cohen et al. |
| 6,506,076 B2 | 1/2003 | Cohen et al. |
| 6,517,360 B1 | 2/2003 | Cohen |
| 6,517,382 B2 | 2/2003 | Flickinger et al. |
| 6,530,790 B1 | 3/2003 | McNamara et al. |
| 6,535,367 B1 | 3/2003 | Carpenter et al. |
| 6,537,086 B1 | 3/2003 | Mac Mullin |
| 6,537,087 B2 | 3/2003 | McNamara et al. |
| 6,551,140 B2 | 4/2003 | Billman et al. |
| 6,554,647 B1 | 4/2003 | Cohen et al. |
| 6,565,387 B2 | 5/2003 | Cohen |
| 6,574,115 B2 | 6/2003 | Asano et al. |
| 6,575,772 B1 | 6/2003 | Soubh et al. |
| 6,579,116 B2 | 6/2003 | Brennan et al. |
| 6,582,244 B2 | 6/2003 | Fogg et al. |
| 6,592,390 B1 | 7/2003 | Davis et al. |
| 6,592,401 B1 | 7/2003 | Gardner et al. |
| 6,595,802 B1 | 7/2003 | Watanabe et al. |
| 6,602,095 B2 | 8/2003 | Astbury, Jr. et al. |
| 6,607,402 B2 | 8/2003 | Cohen et al. |
| 6,616,864 B1 | 9/2003 | Jiang et al. |
| 6,652,296 B2 | 11/2003 | Kuroda et al. |
| 6,652,318 B1 | 11/2003 | Winings et al. |
| 6,655,966 B2 | 12/2003 | Rothermel et al. |
| 6,685,501 B1 | 2/2004 | Wu et al. |
| 6,692,262 B1 | 2/2004 | Loveless |
| 6,705,893 B1 | 3/2004 | Ko |
| 6,709,294 B1 | 3/2004 | Cohen et al. |
| 6,713,672 B1 | 3/2004 | Stickney |
| 6,743,057 B2 | 6/2004 | Davis et al. |
| 6,749,448 B2 | 6/2004 | Bright et al. |
| 6,776,649 B2 | 8/2004 | Pape et al. |
| 6,776,659 B1 | 8/2004 | Stokoe et al. |
| 6,780,018 B1 | 8/2004 | Shipe |
| 6,786,771 B2 | 9/2004 | Gailus |
| 6,797,891 B1 | 9/2004 | Blair et al. |
| 6,811,326 B2 | 11/2004 | Keeble et al. |
| 6,814,619 B1 | 11/2004 | Stokoe et al. |
| 6,816,376 B2 | 11/2004 | Bright et al. |
| 6,824,426 B1 | 11/2004 | Spink, Jr. |
| 6,830,489 B2 | 12/2004 | Aoyama |
| 6,843,657 B2 | 1/2005 | Driscoll et al. |
| 6,846,115 B1 | 1/2005 | Shang et al. |
| 6,872,085 B1 | 3/2005 | Cohen et al. |
| 6,872,094 B1 | 3/2005 | Murr et al. |
| 6,903,934 B2 | 6/2005 | Lo et al. |
| 6,916,183 B2 | 7/2005 | Alger et al. |
| 6,932,649 B1 | 8/2005 | Rothermel et al. |
| 6,951,487 B2 | 10/2005 | Ozai |
| 6,955,565 B2 | 10/2005 | Lloyd et al. |
| 6,962,499 B2 | 11/2005 | Yamamoto et al. |
| 6,971,887 B1 | 12/2005 | Trobough |
| 6,979,226 B2 | 12/2005 | Otsu et al. |
| 7,044,794 B2 | 5/2006 | Consoli et al. |
| 7,056,128 B2 | 6/2006 | Driscoll et al. |
| 7,057,570 B2 | 6/2006 | Irion, II et al. |
| 7,070,446 B2 | 7/2006 | Henry et al. |
| 7,074,086 B2 | 7/2006 | Cohen et al. |
| 7,077,658 B1 | 7/2006 | Ashman et al. |
| 7,094,102 B2 | 8/2006 | Cohen et al. |
| 7,108,556 B2 | 9/2006 | Cohen et al. |
| 7,148,428 B2 | 12/2006 | Meier et al. |
| 7,163,421 B1 | 1/2007 | Cohen et al. |
| 7,175,444 B2 | 2/2007 | Lang et al. |
| 7,198,519 B2 | 4/2007 | Regnier et al. |
| 7,214,097 B1 | 5/2007 | Hsu et al. |
| 7,223,915 B2 | 5/2007 | Hackman |
| 7,234,944 B2 | 6/2007 | Nordin et al. |
| 7,244,137 B2 | 7/2007 | Renfro et al. |
| 7,267,515 B2 | 9/2007 | Lappohn |
| 7,275,966 B2 | 10/2007 | Poh et al. |
| 7,280,372 B2 | 10/2007 | Grundy et al. |
| 7,285,018 B2 | 10/2007 | Kenny et al. |
| 7,303,438 B2 | 12/2007 | Dawiedczyk et al. |
| 7,307,293 B2 | 12/2007 | Fjelstad et al. |
| 7,331,816 B2 | 2/2008 | Krohn et al. |
| 7,331,830 B2 | 2/2008 | Minich |
| 7,335,063 B2 | 2/2008 | Cohen et al. |
| 7,354,274 B2 | 4/2008 | Minich |
| 7,354,300 B2 | 4/2008 | Shindo |
| 7,361,042 B2 | 4/2008 | Hashimoto et al. |
| 7,371,117 B2 | 5/2008 | Gailus |
| 7,384,275 B2 | 6/2008 | Ngo |
| 7,402,048 B2 | 7/2008 | Meier et al. |
| 7,422,483 B2 | 9/2008 | Avery et al. |
| 7,431,608 B2 | 10/2008 | Sakaguchi et al. |
| 7,445,471 B1 | 11/2008 | Scherer et al. |
| 7,448,897 B2 | 11/2008 | Dawiedczyk et al. |
| 7,462,942 B2 | 12/2008 | Tan et al. |
| 7,485,012 B2 | 2/2009 | Daugherty et al. |
| 7,494,383 B2 | 2/2009 | Cohen et al. |
| 7,534,142 B2 | 5/2009 | Avery et al. |
| 7,540,747 B2 | 6/2009 | Ice et al. |
| 7,540,781 B2 | 6/2009 | Kenny et al. |
| 7,549,897 B2 | 6/2009 | Fedder et al. |
| 7,553,190 B2 | 6/2009 | Laurx et al. |
| 7,575,471 B2 | 8/2009 | Long |
| 7,581,990 B2 | 9/2009 | Kirk et al. |
| 7,585,188 B2 | 9/2009 | Regnier |
| 7,588,464 B2 | 9/2009 | Kim |
| 7,613,011 B2 | 11/2009 | Grundy et al. |
| 7,621,779 B2 | 11/2009 | Laurx et al. |
| 7,652,381 B2 | 1/2010 | Grundy et al. |
| 7,654,831 B1 | 2/2010 | Wu |
| 7,658,654 B2 | 2/2010 | Ohyama et al. |
| 7,686,659 B2 | 3/2010 | Peng |
| 7,690,930 B2 | 4/2010 | Chen et al. |
| 7,713,077 B1 | 5/2010 | McGowan et al. |
| 7,719,843 B2 | 5/2010 | Dunham |
| 7,722,401 B2 | 5/2010 | Kirk et al. |
| 7,722,404 B2 | 5/2010 | Neumetzler |
| 7,731,537 B2 | 6/2010 | Amleshi et al. |
| 7,744,414 B2 | 6/2010 | Scherer et al. |
| 7,753,731 B2 | 7/2010 | Cohen et al. |
| 7,764,504 B2 | 7/2010 | Phillips et al. |
| 7,771,233 B2 | 8/2010 | Gailus |
| 7,775,802 B2 | 8/2010 | Defibaugh et al. |
| 7,781,294 B2 | 8/2010 | Mauder et al. |
| 7,789,676 B2 | 9/2010 | Morgan et al. |
| 7,794,240 B2 | 9/2010 | Cohen et al. |
| 7,794,278 B2 | 9/2010 | Cohen et al. |
| 7,806,698 B2 | 10/2010 | Regnier |
| 7,811,129 B2 | 10/2010 | Glover et al. |
| 7,819,675 B2 | 10/2010 | Ko et al. |
| 7,824,197 B1 | 11/2010 | Westman et al. |
| 7,828,560 B2 | 11/2010 | Wu et al. |
| 7,857,630 B2 | 12/2010 | Hermant et al. |
| 7,862,344 B2 | 1/2011 | Morgan et al. |
| 7,871,294 B2 | 1/2011 | Long |

(56) References Cited

U.S. PATENT DOCUMENTS

| | | |
|---|---|---|
| 7,871,296 B2 | 1/2011 | Fowler et al. |
| 7,874,873 B2 | 1/2011 | Do et al. |
| 7,887,371 B2 | 2/2011 | Kenny et al. |
| 7,906,730 B2 | 3/2011 | Atkinson et al. |
| 7,914,302 B1 | 3/2011 | Zhu |
| 7,914,304 B2 | 3/2011 | Cartier et al. |
| 7,976,318 B2 | 7/2011 | Fedder et al. |
| 7,985,097 B2 | 7/2011 | Gulla |
| 7,993,147 B2 | 8/2011 | Cole et al. |
| 8,002,581 B1 | 8/2011 | Whiteman, Jr. et al. |
| 8,016,616 B2 | 9/2011 | Glover et al. |
| 8,018,733 B2 | 9/2011 | Jia |
| 8,036,500 B2 | 10/2011 | McColloch |
| 8,057,266 B1 | 11/2011 | Roitberg |
| 8,057,267 B2 | 11/2011 | Johnescu |
| 8,083,553 B2 | 12/2011 | Manter et al. |
| 8,092,235 B2 | 1/2012 | Frantum, Jr. et al. |
| 8,092,254 B2 | 1/2012 | Miyazaki et al. |
| 8,100,699 B1 | 1/2012 | Costello |
| 8,157,573 B2 | 4/2012 | Tanaka |
| 8,162,675 B2 | 4/2012 | Regnier et al. |
| RE43,427 E | 5/2012 | Dawiedczyk et al. |
| 8,167,651 B2 | 5/2012 | Glover et al. |
| 8,182,289 B2 | 5/2012 | Stokoe et al. |
| 8,192,222 B2 | 6/2012 | Kameyama |
| 8,197,285 B2 | 6/2012 | Farmer |
| 8,210,877 B2 | 7/2012 | Droesbeke |
| 8,215,968 B2 | 7/2012 | Cartier et al. |
| 8,226,441 B2 | 7/2012 | Regnier et al. |
| 8,251,745 B2 | 8/2012 | Johnescu et al. |
| 8,272,877 B2 | 9/2012 | Stokoe et al. |
| 8,282,402 B2 | 10/2012 | Ngo |
| 8,308,491 B2 | 11/2012 | Nichols et al. |
| 8,308,512 B2 | 11/2012 | Ritter et al. |
| 8,337,243 B2 | 12/2012 | Elkhatib et al. |
| 8,338,713 B2 | 12/2012 | Fjelstad et al. |
| 8,358,504 B2 | 1/2013 | McColloch et al. |
| 8,371,875 B2 | 2/2013 | Gailus |
| 8,371,876 B2 | 2/2013 | Davis |
| 8,382,524 B2 | 2/2013 | Khilchenko et al. |
| 8,398,433 B2 | 3/2013 | Yang |
| 8,419,472 B1 | 4/2013 | Swanger et al. |
| 8,439,704 B2 | 5/2013 | Reed |
| 8,449,312 B2 | 5/2013 | Lang et al. |
| 8,449,330 B1 | 5/2013 | Schroll et al. |
| 8,465,302 B2 | 6/2013 | Regnier et al. |
| 8,465,320 B2 | 6/2013 | Long |
| 8,469,738 B2 | 6/2013 | Long |
| 8,469,745 B2 | 6/2013 | Davis et al. |
| 8,475,210 B2 | 7/2013 | Wang |
| 8,535,065 B2 | 9/2013 | Costello et al. |
| 8,540,525 B2 | 9/2013 | Regnier et al. |
| 8,550,861 B2 | 10/2013 | Cohen et al. |
| 8,553,102 B2 | 10/2013 | Yamada |
| 8,556,657 B1 | 10/2013 | Nichols |
| 8,588,561 B2 | 11/2013 | Zbinden et al. |
| 8,588,562 B2 | 11/2013 | Zbinden et al. |
| 8,597,045 B2 | 12/2013 | Zhu |
| 8,597,055 B2 | 12/2013 | Regnier et al. |
| 8,632,365 B2 | 1/2014 | Ngo |
| 8,651,880 B2 | 2/2014 | Wu et al. |
| 8,657,627 B2 | 2/2014 | McNamara et al. |
| 8,662,923 B2 | 3/2014 | Wu |
| 8,672,707 B2 | 3/2014 | Nichols et al. |
| 8,678,860 B2 | 3/2014 | Minich et al. |
| 8,690,589 B2 | 4/2014 | Ngo |
| 8,690,604 B2 | 4/2014 | Davis |
| 8,715,003 B2 | 5/2014 | Buck et al. |
| 8,740,644 B2 | 6/2014 | Long |
| 8,753,145 B2 | 6/2014 | Lang et al. |
| 8,758,051 B2 | 6/2014 | Nonen et al. |
| 8,764,464 B2 | 7/2014 | Buck et al. |
| 8,771,016 B2 | 7/2014 | Atkinson et al. |
| 8,787,711 B2 | 7/2014 | Zbinden et al. |
| 8,804,342 B2 | 8/2014 | Behziz et al. |
| 8,814,595 B2 | 8/2014 | Cohen et al. |
| 8,830,679 B2 | 9/2014 | Scholeno |
| 8,845,364 B2 | 9/2014 | Wanha et al. |
| 8,858,243 B2 | 10/2014 | Luo et al. |
| 8,864,521 B2 | 10/2014 | Atkinson et al. |
| 8,870,471 B2 | 10/2014 | Ito et al. |
| 8,888,531 B2 | 11/2014 | Jeon |
| 8,888,533 B2 | 11/2014 | Westman et al. |
| 8,911,255 B2 | 12/2014 | Scherer et al. |
| 8,926,377 B2 | 1/2015 | Kirk et al. |
| 8,944,831 B2 | 2/2015 | Stoner et al. |
| 8,992,236 B2 | 3/2015 | Wittig et al. |
| 8,992,237 B2 | 3/2015 | Regnier et al. |
| 8,998,642 B2 | 4/2015 | Manter et al. |
| 9,004,942 B2 | 4/2015 | Paniauqa |
| 9,011,177 B2 | 4/2015 | Lloyd et al. |
| 9,022,806 B2 | 5/2015 | Cartier, Jr. et al. |
| 9,028,201 B2 | 5/2015 | Kirk et al. |
| 9,028,281 B2 | 5/2015 | Kirk et al. |
| 9,035,183 B2 | 5/2015 | Kodama et al. |
| 9,040,824 B2 | 5/2015 | Guetig et al. |
| 9,071,001 B2 | 6/2015 | Scherer et al. |
| 9,077,118 B2 | 7/2015 | Szu et al. |
| 9,118,151 B2 | 8/2015 | Tran et al. |
| 9,119,292 B2 | 8/2015 | Gundel |
| 9,124,009 B2 | 9/2015 | Atkinson et al. |
| 9,136,634 B2 | 9/2015 | De Geest et al. |
| 9,142,921 B2 | 9/2015 | Wanha et al. |
| 9,203,171 B2 | 12/2015 | Yu et al. |
| 9,210,817 B2 | 12/2015 | Briant |
| 9,214,768 B2 | 12/2015 | Pao et al. |
| 9,219,335 B2 | 12/2015 | Atkinson et al. |
| 9,225,085 B2 | 12/2015 | Cartier, Jr. et al. |
| 9,232,676 B2 | 1/2016 | Sechrist et al. |
| 9,246,251 B2 | 1/2016 | Regnier et al. |
| 9,246,262 B2 | 1/2016 | Brown |
| 9,246,280 B2 | 1/2016 | Neer |
| 9,257,778 B2 | 2/2016 | Buck et al. |
| 9,257,794 B2 | 2/2016 | Wanha et al. |
| 9,276,358 B2 | 3/2016 | Ista |
| 9,281,636 B1 | 3/2016 | Schmitt |
| 9,300,067 B2 | 3/2016 | Yokoo |
| 9,312,618 B2 | 4/2016 | Regnier et al. |
| 9,337,585 B1 | 5/2016 | Yang |
| 9,350,108 B2 | 5/2016 | Long |
| 9,356,401 B1 | 5/2016 | Horning et al. |
| 9,362,678 B2 | 6/2016 | Wanha et al. |
| 9,368,916 B2 | 6/2016 | Heyvaert et al. |
| 9,373,917 B2 | 6/2016 | Sypolt et al. |
| 9,374,165 B2 | 6/2016 | Zbinden et al. |
| 9,385,455 B2 | 7/2016 | Regnier et al. |
| 9,389,368 B1 | 7/2016 | Sharf |
| 9,391,407 B1 | 7/2016 | Bucher et al. |
| 9,413,112 B2 | 8/2016 | Helster et al. |
| 9,450,344 B2 | 9/2016 | Cartier, Jr. et al. |
| 9,490,558 B2 | 11/2016 | Wanha et al. |
| 9,509,101 B2 | 11/2016 | Cartier, Jr. et al. |
| 9,509,102 B2 | 11/2016 | Sharf et al. |
| 9,520,680 B2 | 12/2016 | Hsu et al. |
| 9,520,689 B2 | 12/2016 | Cartier, Jr. et al. |
| 9,531,133 B1 | 12/2016 | Horning et al. |
| 9,553,381 B2 | 1/2017 | Regnier |
| 9,559,446 B1 | 1/2017 | Wetzel et al. |
| 9,564,696 B2 | 2/2017 | Gulla |
| 9,608,348 B2 | 3/2017 | Wanha et al. |
| 9,651,752 B2 | 5/2017 | Zbinden et al. |
| 9,653,829 B2 | 5/2017 | Long |
| 9,660,364 B2 | 5/2017 | Wig et al. |
| 9,666,961 B2 | 5/2017 | Horning et al. |
| 9,668,378 B2 | 5/2017 | Phillips |
| 9,671,582 B2 | 6/2017 | Yeh |
| 9,685,724 B2 | 6/2017 | Tojo |
| 9,685,736 B2 | 6/2017 | Gailus et al. |
| 9,711,901 B2 | 7/2017 | Scholeno |
| 9,735,495 B2 | 8/2017 | Gross |
| 9,761,974 B2 | 9/2017 | L'Esperance et al. |
| 9,774,144 B2 | 9/2017 | Cartier, Jr. et al. |
| 9,801,301 B1 | 10/2017 | Costello |
| 9,829,662 B2 | 11/2017 | Kurashima |

(56) References Cited

U.S. PATENT DOCUMENTS

| | | |
|---|---|---|
| 9,841,572 B2 | 12/2017 | Zbinden et al. |
| 9,843,135 B2 | 12/2017 | Guetig et al. |
| 9,929,500 B1 | 3/2018 | Ista |
| 9,929,512 B1 | 3/2018 | Trout et al. |
| 9,985,367 B2 | 5/2018 | Wanha et al. |
| 9,985,389 B1 | 5/2018 | Morgan et al. |
| 10,020,614 B1 | 7/2018 | Bucher |
| 10,056,706 B2 | 8/2018 | Wanha et al. |
| 10,062,984 B2 | 8/2018 | Regnier |
| 10,062,988 B1 | 8/2018 | Vinther et al. |
| 10,069,225 B2 | 9/2018 | Wanha et al. |
| 10,096,945 B2 | 10/2018 | Cartier, Jr. et al. |
| 10,109,968 B2 | 10/2018 | Khazen |
| 10,114,182 B2 | 10/2018 | Zbinden et al. |
| 10,128,627 B1 | 11/2018 | Kazav |
| 10,136,517 B2 | 11/2018 | Shirasaki |
| 10,153,571 B2 | 12/2018 | Kachlic |
| 10,170,869 B2 | 1/2019 | Gailus et al. |
| 10,181,663 B2 | 1/2019 | Regnier |
| 10,205,286 B2 | 2/2019 | Provencher et al. |
| 10,243,305 B1 | 3/2019 | Pan et al. |
| 10,276,995 B2 | 4/2019 | Little |
| 10,305,224 B2 | 5/2019 | Girard, Jr. |
| RE47,459 E | 6/2019 | Vinther et al. |
| 10,348,007 B2 | 7/2019 | Kataoka et al. |
| 10,367,283 B2 | 7/2019 | L'Esperance et al. |
| 10,367,308 B2 | 7/2019 | Little et al. |
| 10,374,355 B2 | 8/2019 | Ayzenberg et al. |
| 10,381,767 B1 | 8/2019 | Milbrand, Jr. et al. |
| 10,446,960 B2 | 10/2019 | Guy Ritter et al. |
| 10,462,904 B2 | 10/2019 | Shirasaki |
| 10,511,118 B2 | 12/2019 | Beltran et al. |
| 10,551,580 B2 | 2/2020 | Regnier et al. |
| 10,555,437 B2 | 2/2020 | Little |
| 10,588,243 B2 | 3/2020 | Little et al. |
| 10,651,606 B2 | 5/2020 | Little |
| 10,680,364 B2 | 6/2020 | Champion et al. |
| 10,797,417 B2 | 10/2020 | Scholeno et al. |
| 10,840,622 B2 | 11/2020 | Sasame et al. |
| 10,847,930 B2 | 11/2020 | Ayzenberg et al. |
| 10,847,937 B2 | 11/2020 | Cartier, Jr. et al. |
| 10,879,643 B2 | 12/2020 | Astbury et al. |
| 10,944,215 B2 | 3/2021 | Chua et al. |
| 11,050,176 B2 | 6/2021 | Yang et al. |
| 11,070,006 B2 * | 7/2021 | Gailus .................. H01R 12/716 |
| 11,101,611 B2 | 8/2021 | Winey et al. |
| 11,143,830 B2 | 10/2021 | Luo et al. |
| 11,177,592 B2 | 11/2021 | Scholeno et al. |
| 11,189,943 B2 * | 11/2021 | Zerebilov .............. G02B 6/428 |
| 11,205,877 B2 | 12/2021 | Diaz et al. |
| 11,271,348 B1 | 3/2022 | Chen et al. |
| 11,437,762 B2 | 9/2022 | Manter et al. |
| 11,444,404 B2 | 9/2022 | Si et al. |
| 2001/0012730 A1 | 8/2001 | Ramey et al. |
| 2001/0042632 A1 | 11/2001 | Manov et al. |
| 2001/0046810 A1 | 11/2001 | Cohen et al. |
| 2002/0042223 A1 | 4/2002 | Belopolsky et al. |
| 2002/0088628 A1 | 7/2002 | Chen |
| 2002/0089464 A1 | 7/2002 | Joshi |
| 2002/0098738 A1 | 7/2002 | Astbury et al. |
| 2002/0111068 A1 | 8/2002 | Cohen et al. |
| 2002/0111069 A1 | 8/2002 | Astbury et al. |
| 2002/0157865 A1 | 10/2002 | Noda |
| 2002/0187688 A1 | 12/2002 | Marvin et al. |
| 2002/0192989 A1 | 12/2002 | Ling et al. |
| 2002/0197043 A1 | 12/2002 | Hwang |
| 2003/0073331 A1 | 4/2003 | Peloza et al. |
| 2003/0119362 A1 | 6/2003 | Nelson et al. |
| 2003/0129876 A1 | 7/2003 | Hasircoglu |
| 2004/0005815 A1 | 1/2004 | Mizumura et al. |
| 2004/0018757 A1 | 1/2004 | Lang et al. |
| 2004/0020674 A1 | 2/2004 | McFadden et al. |
| 2004/0094328 A1 | 5/2004 | Fjelstad et al. |
| 2004/0110421 A1 | 6/2004 | Broman et al. |
| 2004/0115968 A1 | 6/2004 | Cohen |
| 2004/0121633 A1 | 6/2004 | David et al. |
| 2004/0121652 A1 | 6/2004 | Gailus |
| 2004/0155328 A1 | 8/2004 | Kline |
| 2004/0196112 A1 | 10/2004 | Welbon et al. |
| 2004/0224559 A1 | 11/2004 | Nelson et al. |
| 2004/0229510 A1 | 11/2004 | Lloyd et al. |
| 2004/0259419 A1 | 12/2004 | Payne et al. |
| 2004/0264894 A1 | 12/2004 | Cooke et al. |
| 2005/0006126 A1 | 1/2005 | Aisenbrey |
| 2005/0032430 A1 | 2/2005 | Otsu et al. |
| 2005/0037655 A1 | 2/2005 | Henry et al. |
| 2005/0070160 A1 | 3/2005 | Cohen et al. |
| 2005/0087359 A1 | 4/2005 | Tachibana et al. |
| 2005/0093127 A1 | 5/2005 | Fjelstad et al. |
| 2005/0118869 A1 | 6/2005 | Evans |
| 2005/0133245 A1 | 6/2005 | Katsuyama et al. |
| 2005/0142944 A1 | 6/2005 | Ling et al. |
| 2005/0176835 A1 | 8/2005 | Kobayashi et al. |
| 2005/0233610 A1 | 10/2005 | Tutt et al. |
| 2005/0239339 A1 | 10/2005 | Pepe |
| 2005/0255726 A1 | 11/2005 | Long |
| 2005/0283974 A1 | 12/2005 | Richard et al. |
| 2005/0287869 A1 | 12/2005 | Kenny et al. |
| 2006/0001163 A1 | 1/2006 | Kolbehdari et al. |
| 2006/0068640 A1 | 3/2006 | Gailus |
| 2006/0079119 A1 | 4/2006 | Wu |
| 2006/0091507 A1 | 5/2006 | Fjelstad et al. |
| 2006/0160429 A1 | 7/2006 | Dawiedczyk et al. |
| 2006/0216969 A1 | 9/2006 | Bright et al. |
| 2006/0228922 A1 | 10/2006 | Morriss |
| 2006/0249820 A1 | 11/2006 | Ice et al. |
| 2006/0292934 A1 | 12/2006 | Schell et al. |
| 2007/0004282 A1 | 1/2007 | Cohen et al. |
| 2007/0021001 A1 | 1/2007 | Laurx et al. |
| 2007/0021002 A1 | 1/2007 | Laurx et al. |
| 2007/0032104 A1 | 2/2007 | Yamada et al. |
| 2007/0037419 A1 | 2/2007 | Sparrowhawk |
| 2007/0042639 A1 | 2/2007 | Manter et al. |
| 2007/0054554 A1 | 3/2007 | Do et al. |
| 2007/0059961 A1 | 3/2007 | Cartier et al. |
| 2007/0155241 A1 | 7/2007 | Lappohn |
| 2007/0197095 A1 | 8/2007 | Feldman et al. |
| 2007/0207641 A1 | 9/2007 | Minich |
| 2007/0218765 A1 | 9/2007 | Cohen et al. |
| 2007/0243741 A1 | 10/2007 | Yang |
| 2007/0254517 A1 | 11/2007 | Olson et al. |
| 2008/0026638 A1 | 1/2008 | Cohen et al. |
| 2008/0194146 A1 | 8/2008 | Gailus |
| 2008/0200955 A1 | 8/2008 | Tepic |
| 2008/0207023 A1 | 8/2008 | Tuin et al. |
| 2008/0246555 A1 | 10/2008 | Kirk et al. |
| 2008/0248658 A1 | 10/2008 | Cohen et al. |
| 2008/0248659 A1 | 10/2008 | Cohen et al. |
| 2008/0248660 A1 | 10/2008 | Kirk et al. |
| 2008/0264673 A1 | 10/2008 | Chi et al. |
| 2008/0267620 A1 | 10/2008 | Cole et al. |
| 2008/0297988 A1 | 12/2008 | Chau |
| 2008/0305689 A1 | 12/2008 | Zhang et al. |
| 2009/0011641 A1 | 1/2009 | Cohen et al. |
| 2009/0011645 A1 | 1/2009 | Laurx et al. |
| 2009/0011664 A1 | 1/2009 | Laurx et al. |
| 2009/0017682 A1 | 1/2009 | Amleshi et al. |
| 2009/0023330 A1 | 1/2009 | Stoner et al. |
| 2009/0051558 A1 | 2/2009 | Dorval |
| 2009/0098767 A1 | 4/2009 | Long |
| 2009/0117386 A1 | 5/2009 | Vacanti et al. |
| 2009/0130913 A1 | 5/2009 | Yi et al. |
| 2009/0130918 A1 | 5/2009 | Nguyen et al. |
| 2009/0166082 A1 | 7/2009 | Liu et al. |
| 2009/0176400 A1 | 7/2009 | Davis et al. |
| 2009/0205194 A1 | 8/2009 | Semba et al. |
| 2009/0215309 A1 | 8/2009 | Mongold et al. |
| 2009/0227141 A1 | 9/2009 | Pan |
| 2009/0239395 A1 | 9/2009 | Cohen et al. |
| 2009/0247012 A1 | 10/2009 | Pan |
| 2009/0269971 A1 | 10/2009 | Tamura et al. |
| 2009/0291593 A1 | 11/2009 | Atkinson et al. |
| 2009/0291596 A1 | 11/2009 | Miyazoe |
| 2009/0305533 A1 | 12/2009 | Feldman et al. |

(56) References Cited

U.S. PATENT DOCUMENTS

| | | |
|---|---|---|
| 2009/0311908 A1 | 12/2009 | Fogg et al. |
| 2010/0009571 A1 | 1/2010 | Scherer et al. |
| 2010/0018738 A1 | 1/2010 | Chen et al. |
| 2010/0078738 A1 | 4/2010 | Chambers et al. |
| 2010/0081302 A1 | 4/2010 | Atkinson et al. |
| 2010/0099299 A1 | 4/2010 | Moriyama et al. |
| 2010/0112850 A1 | 5/2010 | Rao et al. |
| 2010/0144167 A1 | 6/2010 | Fedder et al. |
| 2010/0144168 A1 | 6/2010 | Glover et al. |
| 2010/0144175 A1 | 6/2010 | Helster et al. |
| 2010/0144201 A1 | 6/2010 | Defibaugh et al. |
| 2010/0144203 A1 | 6/2010 | Glover et al. |
| 2010/0177489 A1 | 7/2010 | Yagisawa |
| 2010/0183141 A1 | 7/2010 | Arai et al. |
| 2010/0203768 A1 | 8/2010 | Kondo et al. |
| 2010/0221951 A1 | 9/2010 | Pepe et al. |
| 2010/0248544 A1 | 9/2010 | Xu et al. |
| 2010/0291806 A1 | 11/2010 | Minich et al. |
| 2010/0294530 A1 | 11/2010 | Atkinson et al. |
| 2011/0003509 A1 | 1/2011 | Gailus |
| 2011/0034075 A1 | 2/2011 | Feldman et al. |
| 2011/0067237 A1 | 3/2011 | Cohen et al. |
| 2011/0074213 A1 | 3/2011 | Schaffer et al. |
| 2011/0081114 A1 | 4/2011 | Togami |
| 2011/0104948 A1 | 5/2011 | Girard, Jr. et al. |
| 2011/0130038 A1 | 6/2011 | Cohen et al. |
| 2011/0136387 A1 | 6/2011 | Matsuura et al. |
| 2011/0177699 A1 | 7/2011 | Crofoot et al. |
| 2011/0212632 A1 | 9/2011 | Stokoe et al. |
| 2011/0212633 A1 | 9/2011 | Regnier et al. |
| 2011/0212649 A1 | 9/2011 | Stokoe et al. |
| 2011/0212650 A1 | 9/2011 | Amleshi et al. |
| 2011/0223807 A1 | 9/2011 | Jeon et al. |
| 2011/0230095 A1 | 9/2011 | Atkinson et al. |
| 2011/0230096 A1 | 9/2011 | Atkinson et al. |
| 2011/0230104 A1 | 9/2011 | Lang et al. |
| 2011/0263156 A1 | 10/2011 | Ko |
| 2011/0287663 A1 | 11/2011 | Gailus et al. |
| 2011/0300757 A1 | 12/2011 | Regnier et al. |
| 2011/0300760 A1 | 12/2011 | Ngo |
| 2012/0003848 A1 | 1/2012 | Casher et al. |
| 2012/0034798 A1 | 2/2012 | Khemakhem et al. |
| 2012/0034820 A1 | 2/2012 | Lang et al. |
| 2012/0052712 A1 | 3/2012 | Wang |
| 2012/0058665 A1 | 3/2012 | Zerebilov |
| 2012/0077369 A1 | 3/2012 | Andersen |
| 2012/0077380 A1 | 3/2012 | Minich et al. |
| 2012/0094536 A1 | 4/2012 | Khilchenko et al. |
| 2012/0135643 A1 | 5/2012 | Lange et al. |
| 2012/0156929 A1 | 6/2012 | Manter et al. |
| 2012/0164860 A1 | 6/2012 | Wang |
| 2012/0184136 A1 | 7/2012 | Ritter |
| 2012/0184145 A1 | 7/2012 | Zeng |
| 2012/0202363 A1 | 8/2012 | McNamara et al. |
| 2012/0202370 A1 | 8/2012 | Mulfinger et al. |
| 2012/0202386 A1 | 8/2012 | McNamara et al. |
| 2012/0214344 A1 | 8/2012 | Cohen et al. |
| 2012/0252232 A1 | 10/2012 | Buck et al. |
| 2012/0329294 A1 | 12/2012 | Raybold et al. |
| 2013/0012038 A1 | 1/2013 | Kirk et al. |
| 2013/0017715 A1 | 1/2013 | Laarhoven et al. |
| 2013/0017733 A1 | 1/2013 | Kirk et al. |
| 2013/0034999 A1 | 2/2013 | Szczesny et al. |
| 2013/0040482 A1 | 2/2013 | Ngo et al. |
| 2013/0065454 A1 | 3/2013 | Milbrand, Jr. |
| 2013/0078870 A1 | 3/2013 | Milbrand, Jr. |
| 2013/0084744 A1* | 4/2013 | Zerebilov ........ H01R 12/7052 439/607.35 |
| 2013/0092429 A1 | 4/2013 | Ellison |
| 2013/0109232 A1 | 5/2013 | Paniaqua |
| 2013/0143442 A1 | 6/2013 | Cohen et al. |
| 2013/0164970 A1 | 6/2013 | Regnier et al. |
| 2013/0196553 A1 | 8/2013 | Gailus |
| 2013/0210246 A1 | 8/2013 | Davis et al. |
| 2013/0223036 A1 | 8/2013 | Herring et al. |
| 2013/0225006 A1 | 8/2013 | Khilchenko et al. |
| 2013/0273781 A1* | 10/2013 | Buck ................. H01R 13/6471 439/626 |
| 2013/0288513 A1 | 10/2013 | Masubuchi et al. |
| 2013/0288521 A1 | 10/2013 | McClellan et al. |
| 2013/0288525 A1 | 10/2013 | McClellan et al. |
| 2013/0288539 A1 | 10/2013 | McClellan et al. |
| 2013/0340251 A1 | 12/2013 | Regnier et al. |
| 2014/0004724 A1 | 1/2014 | Cartier, Jr. et al. |
| 2014/0004726 A1 | 1/2014 | Cartier, Jr. et al. |
| 2014/0004746 A1 | 1/2014 | Cartier, Jr. et al. |
| 2014/0035755 A1 | 2/2014 | Ward |
| 2014/0041937 A1 | 2/2014 | Lloyd et al. |
| 2014/0057475 A1 | 2/2014 | Tohjo |
| 2014/0057493 A1 | 2/2014 | De Geest et al. |
| 2014/0057494 A1 | 2/2014 | Cohen |
| 2014/0057498 A1 | 2/2014 | Cohen |
| 2014/0065883 A1 | 3/2014 | Cohen et al. |
| 2014/0073174 A1 | 3/2014 | Yang |
| 2014/0073181 A1 | 3/2014 | Yang |
| 2014/0099844 A1 | 4/2014 | Dunham |
| 2014/0154912 A1 | 6/2014 | Hirschy |
| 2014/0193993 A1 | 7/2014 | Meng |
| 2014/0199885 A1 | 7/2014 | Vinther et al. |
| 2014/0242844 A1 | 8/2014 | Wanha et al. |
| 2014/0273551 A1 | 9/2014 | Resendez et al. |
| 2014/0273557 A1 | 9/2014 | Cartier, Jr. et al. |
| 2014/0273627 A1 | 9/2014 | Cartier, Jr. et al. |
| 2014/0286613 A1 | 9/2014 | Ito et al. |
| 2014/0287627 A1 | 9/2014 | Cohen |
| 2014/0295680 A1 | 10/2014 | YuQiang et al. |
| 2014/0302706 A1 | 10/2014 | YuQiang et al. |
| 2014/0308852 A1 | 10/2014 | Gulla |
| 2014/0334792 A1 | 11/2014 | Bragg |
| 2014/0335707 A1 | 11/2014 | Johnescu et al. |
| 2014/0335736 A1 | 11/2014 | Regnier et al. |
| 2015/0056856 A1 | 2/2015 | Atkinson et al. |
| 2015/0072561 A1 | 3/2015 | Schmitt et al. |
| 2015/0079829 A1 | 3/2015 | Brodsgaard |
| 2015/0079845 A1 | 3/2015 | Wanha et al. |
| 2015/0093083 A1 | 4/2015 | Tsai et al. |
| 2015/0132990 A1 | 5/2015 | Nong Chou et al. |
| 2015/0180578 A1 | 6/2015 | Leigh et al. |
| 2015/0194751 A1 | 7/2015 | Herring |
| 2015/0200483 A1 | 7/2015 | Martin et al. |
| 2015/0200496 A1 | 7/2015 | Simpson et al. |
| 2015/0207247 A1 | 7/2015 | Regnier et al. |
| 2015/0236450 A1 | 8/2015 | Davis |
| 2015/0236451 A1 | 8/2015 | Cartier, Jr. et al. |
| 2015/0236452 A1 | 8/2015 | Cartier, Jr. et al. |
| 2015/0255926 A1 | 9/2015 | Paniagua |
| 2015/0280351 A1 | 10/2015 | Bertsch |
| 2015/0280368 A1 | 10/2015 | Bucher |
| 2015/0288110 A1 | 10/2015 | Tanguchi et al. |
| 2015/0303608 A1 | 10/2015 | Zerebilov et al. |
| 2015/0357736 A1 | 12/2015 | Tran et al. |
| 2015/0357747 A1 | 12/2015 | Filipon et al. |
| 2015/0357761 A1 | 12/2015 | Wanha et al. |
| 2016/0004022 A1 | 1/2016 | Ishii |
| 2016/0013594 A1 | 1/2016 | Costello et al. |
| 2016/0013596 A1 | 1/2016 | Regnier |
| 2016/0028189 A1 | 1/2016 | Resendez et al. |
| 2016/0054527 A1 | 2/2016 | Tang et al. |
| 2016/0104956 A1 | 4/2016 | Santos et al. |
| 2016/0104990 A1 | 4/2016 | Laurx et al. |
| 2016/0111825 A1 | 4/2016 | Wanha et al. |
| 2016/0131859 A1 | 5/2016 | Ishii et al. |
| 2016/0141807 A1 | 5/2016 | Gailus et al. |
| 2016/0149343 A1 | 5/2016 | Atkinson et al. |
| 2016/0149362 A1 | 5/2016 | Ritter et al. |
| 2016/0150633 A1 | 5/2016 | Cartier, Jr. |
| 2016/0150639 A1 | 5/2016 | Gailus et al. |
| 2016/0150645 A1 | 5/2016 | Gailus et al. |
| 2016/0156133 A1 | 6/2016 | Masubuchi et al. |
| 2016/0172803 A1 | 6/2016 | Tamai |
| 2016/0174412 A1 | 6/2016 | Karaaslan et al. |
| 2016/0181713 A1 | 6/2016 | Peloza et al. |
| 2016/0181732 A1 | 6/2016 | Laurx et al. |
| 2016/0190747 A1 | 6/2016 | Regnier et al. |

(56) References Cited

U.S. PATENT DOCUMENTS

| | | |
|---|---|---|
| 2016/0197423 A1 | 7/2016 | Regnier |
| 2016/0211623 A1 | 7/2016 | Sharf et al. |
| 2016/0218455 A1 | 7/2016 | Sayre et al. |
| 2016/0233598 A1 | 8/2016 | Wittig |
| 2016/0268714 A1 | 9/2016 | Wanha et al. |
| 2016/0268739 A1 | 9/2016 | Zerebilov et al. |
| 2016/0274316 A1 | 9/2016 | Verdiell |
| 2016/0308296 A1 | 10/2016 | Pitten et al. |
| 2016/0315425 A1 | 10/2016 | Nishimori et al. |
| 2016/0322770 A1 | 11/2016 | Zerebilov |
| 2016/0336692 A1 | 11/2016 | Champion et al. |
| 2016/0344141 A1 | 11/2016 | Cartier, Jr. et al. |
| 2017/0025783 A1 | 1/2017 | Astbury et al. |
| 2017/0033478 A1 | 2/2017 | Wanha et al. |
| 2017/0042070 A1 | 2/2017 | Baumler et al. |
| 2017/0047692 A1 | 2/2017 | Cartier, Jr. et al. |
| 2017/0054234 A1 | 2/2017 | Kachlic |
| 2017/0054250 A1 | 2/2017 | Kim et al. |
| 2017/0077643 A1 | 3/2017 | Zbinden et al. |
| 2017/0093093 A1 | 3/2017 | Cartier, Jr. et al. |
| 2017/0098901 A1 | 4/2017 | Regnier |
| 2017/0162960 A1 | 6/2017 | Wanha et al. |
| 2017/0222374 A1 | 8/2017 | Saito et al. |
| 2017/0285282 A1 | 10/2017 | Regnier et al. |
| 2017/0294743 A1 | 10/2017 | Gailus et al. |
| 2017/0302011 A1 | 10/2017 | Wanha et al. |
| 2017/0338595 A1 | 11/2017 | Girard, Jr. |
| 2017/0365942 A1 | 12/2017 | Regnier |
| 2017/0365943 A1 | 12/2017 | Wanha et al. |
| 2018/0006416 A1 | 1/2018 | Lloyd et al. |
| 2018/0034175 A1 | 2/2018 | Lloyd et al. |
| 2018/0034190 A1 | 2/2018 | Ngo |
| 2018/0040989 A1 | 2/2018 | Chen |
| 2018/0062323 A1 | 3/2018 | Kirk et al. |
| 2018/0089966 A1 | 3/2018 | Ward |
| 2018/0109043 A1 | 4/2018 | Provencher et al. |
| 2018/0145438 A1 | 5/2018 | Cohen |
| 2018/0212385 A1 | 7/2018 | Little |
| 2018/0219331 A1 | 8/2018 | Cartier, Jr. et al. |
| 2018/0219332 A1 | 8/2018 | Brungard et al. |
| 2018/0269612 A1 | 9/2018 | Pitten et al. |
| 2018/0278000 A1 | 9/2018 | Regnier |
| 2018/0287280 A1 | 10/2018 | Ratkovic |
| 2018/0309214 A1 | 10/2018 | Lloyd et al. |
| 2018/0366880 A1 | 12/2018 | Zerebilov et al. |
| 2019/0013617 A1 | 1/2019 | Ayzenberg et al. |
| 2019/0013625 A1 | 1/2019 | Gailus et al. |
| 2019/0020155 A1 | 1/2019 | Trout et al. |
| 2019/0044284 A1* | 2/2019 | Dunham ............ H01R 13/6471 |
| 2019/0115677 A1 | 4/2019 | Kachlic |
| 2019/0157812 A1 | 5/2019 | Gailus et al. |
| 2019/0173236 A1 | 6/2019 | Provencher et al. |
| 2019/0181582 A1 | 6/2019 | Beltran et al. |
| 2019/0191094 A1 | 6/2019 | Khoe et al. |
| 2019/0260147 A1 | 8/2019 | Pitten et al. |
| 2020/0076455 A1 | 3/2020 | Sharf |
| 2020/0091637 A1 | 3/2020 | Scholeno et al. |
| 2020/0142142 A1 | 5/2020 | Luo et al. |
| 2020/0220289 A1 | 7/2020 | Scholeno et al. |
| 2020/0244025 A1 | 7/2020 | Winey et al. |
| 2020/0274267 A1 | 8/2020 | Zerebilov |
| 2020/0274295 A1 | 8/2020 | Briant |
| 2020/0274301 A1 | 8/2020 | Manter et al. |
| 2021/0021085 A1 | 1/2021 | Diaz et al. |
| 2021/0091496 A1 | 3/2021 | Cartier, Jr. et al. |
| 2021/0098927 A1 | 4/2021 | Si et al. |
| 2021/0234291 A1 | 7/2021 | Zerebilov |
| 2021/0305731 A1 | 9/2021 | Klein et al. |
| 2021/0384691 A1 | 12/2021 | Winey et al. |
| 2022/0013962 A1 | 1/2022 | Gailus et al. |
| 2022/0094111 A1 | 3/2022 | Duan et al. |
| 2022/0224057 A1 | 7/2022 | Diaz et al. |
| 2022/0287205 A1 | 9/2022 | Huang et al. |
| 2022/0352675 A1 | 11/2022 | Zerebilov et al. |

FOREIGN PATENT DOCUMENTS

| | | |
|---|---|---|
| CN | 1681218 A | 10/2005 |
| CN | 101132094 A | 2/2008 |
| CN | 101164204 A | 4/2008 |
| CN | 101312275 A | 11/2008 |
| CN | 101330172 A | 12/2008 |
| CN | 101752700 A | 6/2010 |
| CN | 201562814 U | 8/2010 |
| CN | 102106046 A | 6/2011 |
| CN | 102598430 A | 7/2012 |
| CN | 202678544 U | 1/2013 |
| CN | 102986091 A | 3/2013 |
| CN | 103969768 A | 8/2014 |
| CN | 104025393 A | 9/2014 |
| CN | 104518363 A | 4/2015 |
| CN | 104779467 A | 7/2015 |
| CN | 105051978 A | 11/2015 |
| CN | 105612671 A | 5/2016 |
| CN | 105826740 A | 8/2016 |
| CN | 106030925 A | 10/2016 |
| CN | 106104933 A | 11/2016 |
| CN | 108713355 A | 10/2018 |
| CN | 109273932 A | 1/2019 |
| CN | 109980386 A | 7/2019 |
| CN | 111769395 A | 10/2020 |
| CN | 111769396 A | 10/2020 |
| CN | 212412345 U | 1/2021 |
| CN | 213151165 U | 5/2021 |
| CN | 112993659 A | 6/2021 |
| CN | 113422243 A | 9/2021 |
| CN | 215184602 U | 12/2021 |
| DE | 3447556 A1 | 7/1986 |
| EP | 0635912 A1 | 1/1995 |
| EP | 1 207 587 A2 | 5/2002 |
| EP | 1 779 472 | 5/2007 |
| EP | 2 169 770 A2 | 3/2010 |
| GB | 1272347 A | 4/1972 |
| JP | H02-079571 U | 6/1990 |
| JP | H06-029061 A | 2/1994 |
| JP | H07-302649 A | 11/1995 |
| JP | 2000-311749 A | 11/2000 |
| JP | 2003-208928 A | 7/2003 |
| JP | 2006-108115 A | 4/2006 |
| JP | 2010-266729 A | 11/2010 |
| JP | 2011-018651 A | 1/2011 |
| JP | 2012-516021 A | 7/2012 |
| JP | 2014-195061 A | 10/2014 |
| JP | 2016-528688 A | 9/2016 |
| JP | 6193595 B2 | 9/2017 |
| JP | 6599548 B2 | 10/2019 |
| JP | 1656986 S | 4/2020 |
| JP | 1668637 S | 9/2020 |
| JP | 1668730 S | 9/2020 |
| KR | 10-1989-0007458 A | 6/1989 |
| KR | 10-2010-0055197 A | 5/2010 |
| KR | 10-2015-0067010 A | 6/2015 |
| KR | 10-2015-0101020 A | 9/2015 |
| KR | 10-2016-0038192 A | 4/2016 |
| KR | 10-2016-0076334 A | 6/2016 |
| TW | M357771 U | 5/2009 |
| TW | I446657 B | 7/2014 |
| TW | D209874 | 2/2021 |
| WO | 88/05218 A1 | 7/1988 |
| WO | 99/56352 A2 | 11/1999 |
| WO | 2004/059794 A2 | 7/2004 |
| WO | 2004/059801 A1 | 7/2004 |
| WO | 2004/098251 A1 | 11/2004 |
| WO | 2006/002356 A1 | 1/2006 |
| WO | 2006/039277 A1 | 4/2006 |
| WO | 2007/005597 A2 | 1/2007 |
| WO | 2007/005599 A1 | 1/2007 |
| WO | 2008/072322 A1 | 6/2008 |
| WO | 2008/124057 A1 | 10/2008 |
| WO | 2010/039188 A1 | 4/2010 |
| WO | 2012/078434 A2 | 6/2012 |
| WO | 2013/006592 A2 | 1/2013 |
| WO | 2015/013430 A1 | 1/2015 |
| WO | 2015/112717 A1 | 7/2015 |

(56) References Cited

FOREIGN PATENT DOCUMENTS

| WO | 2017/015470 A1 | 1/2017 |
| WO | 2017/123574 A1 | 7/2017 |
| WO | 2017/164418 A1 | 9/2017 |
| WO | 2019/195319 A1 | 10/2019 |
| WO | 2021/070273 A1 | 4/2021 |

OTHER PUBLICATIONS

International Search Report and Written Opinion for International Application No. PCT/US2010/056482 dated Mar. 14, 2011.
International Search Report and Written Opinion for International Application No. PCT/US2011/026139 dated Nov. 22, 2011.
International Search Report and Written Opinion for International Application No. PCT/US2012/023689 dated Sep. 12, 2012.
International Search Report and Written Opinion for International Application No. PCT/US2012/060610 dated Mar. 29, 2013.
International Search Report and Written Opinion for International Application No. PCT/US2015/012463 dated May 13, 2015.
International Search Report and Written Opinion for International Application No. PCT/US2005/034605 dated Jan. 26, 2006.
International Search Report and Written Opinion for International Application No. PCT/US2011/034747 dated Jul. 28, 2011.
International Search Report and Written Opinion for International Application No. PCT/US2015/060472 dated Mar. 11, 2016.
International Search Report and Written Opinion for International Application No. PCT/US2015/012542 dated Apr. 30, 2015.
International Search Report and Written Opinion for International Application No. PCT/US2016/043358 dated Nov. 3, 2016.
International Search Report and Written Opinion for International Application No. PCT/US2017/033122 dated Aug. 8, 2017.
International Search Report and Written Opinion for International Application No. PCT/US2014/026381 dated Aug. 12, 2014.
International Search Report and Written Opinion for International Application No. PCT/US2017/057402 dated Jan. 19, 2018.
Extended European Search Report for European Application No. EP 11166820.8 dated Jan. 24, 2012.
International Search Report and Written Opinion for International Application No. PCT/US2006/25562 dated Oct. 31, 2007.
International Search Report and Written Opinion for International Application No. PCT/US2010/056495 dated Jan. 25, 2011.
International Search Report and Written Opinion for International Application No. PCT/US2018/045207 dated Nov. 29, 2018.
International Preliminary Report on Patentability for International Application No. PCT/US2017/057402 dated May 2, 2019.
Chinese Office Action for Application No. CN201580069567.7 dated Jun. 17, 2019.
Chinese Office Action for Application No. CN201580069567.7 dated Oct. 9, 2019.
Chinese Office Action for Chinese Application No. 201880064336.0, dated Oct. 19, 2020.
International Search Report and Written Opinion for International Application No. PCT/US2020/014799, dated May 27, 2020.
International Search Report and Written Opinion for International Application No. PCT/US2020/014826, dated May 27, 2020.
International Search Report and Written Opinion for International Application No. PCT/US2018/039919, dated Nov. 8, 2018.
International Search Report and Written Opinion for International Application No. PCT/US2020/052397 dated Jan. 15, 2021.
International Search Report and Written Opinion dated Jun. 24, 2020 in connection with International Application No. PCT/US2020/019019.
International Preliminary Report on Patentability for International Application No. PCT/US2015/060472 dated May 26, 2017.
International Preliminary Report on Patentability for International Application No. PCT/US2017/033122 dated Nov. 29, 2018.
International Preliminary Report on Patentability for International Application No. PCT/US2014/026381 dated Sep. 24, 2015.
International Preliminary Report on Patentability for International Application No. PCT/US2018/045207 dated Feb. 13, 2020.
International Search Report and Written Opinion for International Application No. PCT/US2019/025426 dated Jun. 28, 2019.
International Preliminary Report on Patentability for International Application No. PCT/US2019/025426 dated Oct. 15, 2020.
International Search Report and Written Opinion for International Application No. PCT/US2020/051242, dated Feb. 1, 2021.
International Preliminary Report on Patentability dated Sep. 2, 2021 in connection with International Application No. PCT/US2020/019019.
International Preliminary Report on Patentability dated Mar. 31, 2022 in connection with International Application No. PCT/US2020/051242.
Chinese Office Action dated Nov. 3, 2021 in connection with Chinese Application No. 201980036855.0.
Chinese Office Action for Chinese Application No. 201880057597.X, dated Jan. 5, 2021.
Chinese Office Action for Chinese Application No. 201880057597.X, dated Dec. 3, 2021.
International Preliminary Report on Patentability dated Aug. 5, 2021 in connection with International Application No. PCT/US2020/014799.
International Preliminary Report on Patentability dated Aug. 5, 2021 in connection with International Application No. PCT/US2020/014826.
Chinese Office Action dated May 10, 2022 in connection with Chinese Application No. 202080016725.3.
International Preliminary Report on Patentability dated Apr. 7, 2022 in connection with International Application No. PCT/US2020/052397.
Chinese Office Action dated Jun. 9, 2022 in connection with Chinese Application No. 202080019763.4.
Invitation to Pay Additional Fees dated Jul. 22, 2022 in connection with International Application No. PCT/US2022/026964.
Taiwanese Office Action dated Sep. 19, 2022 in connection with Taiwanese Application No. 107127074.
International Search Report and Written Opinion dated Oct. 6, 2022 in connection with International Application No. PCT/US2022/026964.
[No. Author Listed], Amphenol TCS expands the Xcede Platform with 85 Ohm Connectors and High-Speed Cable Solutions. Press Release. Published Feb. 25, 2009. http://www.amphenol.com/about/news_archive/2009/58 [Retrieved on Mar. 26, 2019 from Wayback Machine]. 4 pages.
[No. Author Listed], Agilent. Designing Scalable 10G Backplane Interconnect Systems Utilizing Advanced Verification Methodologies. White Paper, Published May 5, 2012. 24 pages.
[No. Author Listed], Carbon Nanotubes For Electromagnetic Interference Shielding. SBIR/STTR. Award Information. Program Year 2001. Fiscal Year 2001. Materials Research Institute, LLC. Chu et al. Available at http://sbir.gov/sbirsearch/detail/225895. Last accessed Sep. 19, 2013. 2 pages.
[No. Author Listed], Difference Between Weld Metal and Heat Affected Zone (HAZ). Minaprem.com. 2021. 7 pages. URL:http://www.difference.minaprem.com/joining/difference-between-weld-metal-and-heat-affected-zone-haz [date retrieved Dec. 20, 2021].
[No. Author Listed], File:Wrt54gl-layout.jpg Sep. 8, 2006. Retrieved from the Internet: https://xinu.mscs.mu.edu/File:Wrt54gl-layout.jpg [retrieved on Apr. 9, 2019]. 2 pages.
[No. Author Listed], Hitachi Cable America Inc. Direct Attach Cables. 8 pages. Retrieved Aug. 10, 2017 from http://www.hca.hitachi-cable.com/products/hca/catalog/pdfs/direct-attach-cable-assemblies.pdf [last accessed Mar. 6, 2019].
[No. Author Listed], INF-8438i Specification for QSFP (Quad Small Formfactor Pluggable) Transceiver. Rev 1.0 Nov. 2006. SFF Committee. 75 pages.
[No. Author Listed], INF-8628 Specification for QSFP-DD 8X Transceiver (QSFP Double Density) Rev 0.0 Jun. 27, 2016. SNIA SFF TWG Technology Affiliate. 1 page.
[No. Author Listed], SFF-8663 Specification for QSFP+ 28 Gb/s Cage (Style A) Rev 1.7. Oct. 19, 2017. SNIA SFF TWG Technology Affiliate. 18 pages.
[No. Author Listed], Size 8 High Speed Quadrax and Differential Twinax Contacts for Use in MIL-DTL-38999 Special Subminiature

(56) References Cited

OTHER PUBLICATIONS

Cylindrical and ARINC 600 Rectangular Connectors. Published May 2008. 10 pages. Retrieved from https://www.peigenesis.com/images/content/news/amphenol_quadrax.pdf.

[No. Author Listed], What is the Heat Affected Zone (HAZ)? TWI Ltd. 2021. 8 pages. URL:https://www.twi-global.com/technical-knowledge/faqs/what-is-the-heat-affected-zone [date retrieved Dec. 20, 2021].

[No. Author Listed], Specification for Quad Small Form Factor Pluggable Module 112. QSFP112 Published Specification Rev. 2.0. QSFP112 Multi-Source Agreement. Jan. 22, 2022. 55 pages.

Beaman, High Performance Mainframe Computer Cables. 1997 Electronic Components and Technology Conference. 1997;911-7.

Fjelstad, Flexible Circuit Technology. Third Edition. BR Publishing, Inc. Sep. 2006. 226 pages. ISBN 0-9667075-0-8.

Lehto et al., Characterisation of local grain size variation of welded structural steel. Weld World. 2016;60:673-688. 16 pages. URL:https://link.springer.com/content/pdf/10.1007/s40194-016-0318-8.pdf.

Lloyd et al., High Speed Bypass Cable Assembly, USAN U.S. Appl. No. 15/271,903, filed Sep. 21, 2016.

Lloyd et al., High Speed Bypass Cable Assembly, USAN U.S. Appl. No. 15/715,939, filed Sep. 26, 2017.

PALKERT (ed), QSFP-DD Overview. Mar. 14, 2017. 19 pages. URL:http://www.qsfp-dd.com.

Shi et al. Improving Signal Integrity in Circuit Boards by Incorporating Absorbing Materials. 2001 Proceedings. 51st Electronic Components and Technology Conference, Orlando FL. 2001:1451-56.

Si et al., High Performance Stacked Connector, USAN U.S. Appl. No. 17/940,250, filed Sep. 8, 2022.

\* cited by examiner

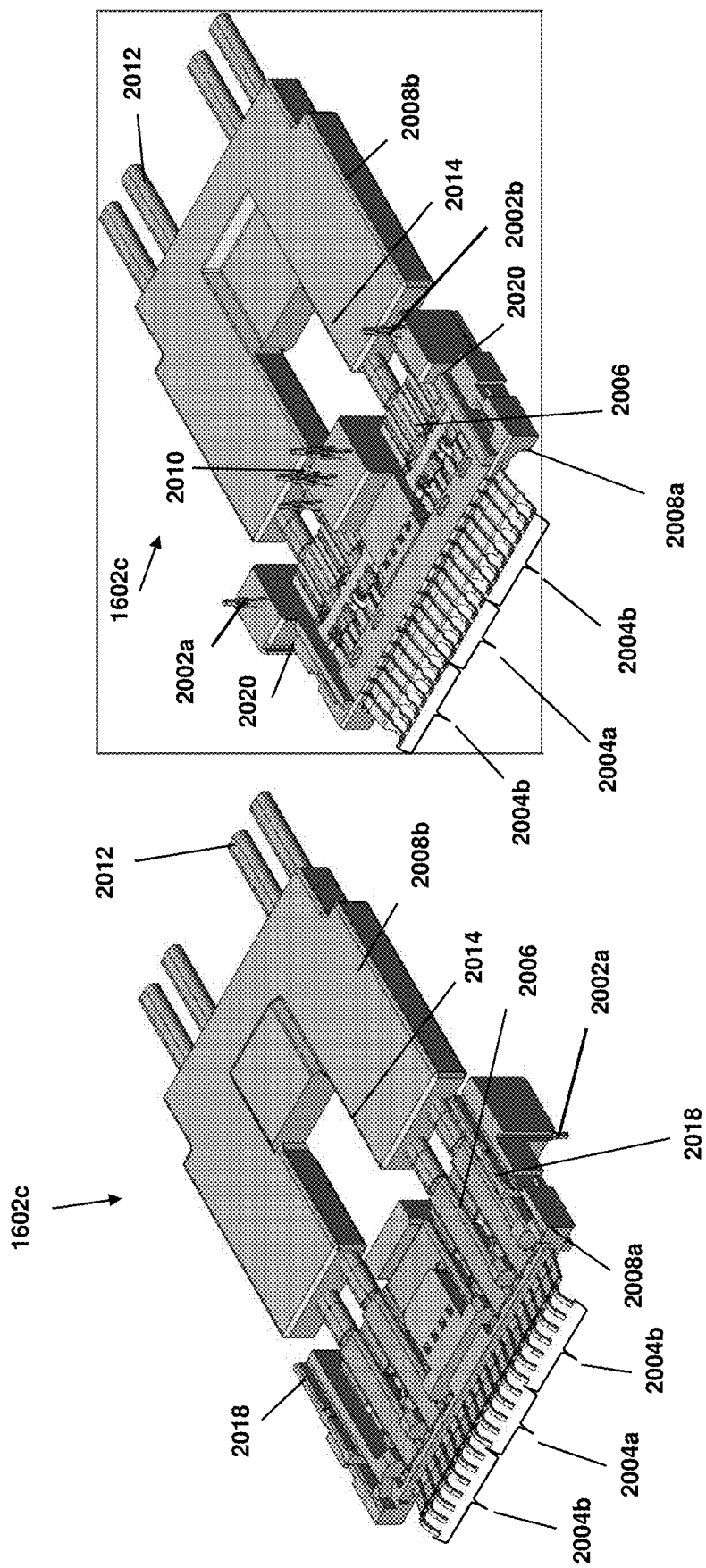

I/O CONNECTOR CONFIGURED FOR CABLE CONNECTION TO A MIDBOARD

CROSS-REFERENCE TO RELATED APPLICATIONS

This application is a continuation claiming the benefit of U.S. application Ser. No. 16/750,967, titled "I/O CONNECTOR CONFIGURED FOR CABLE CONNECTION TO A MIDBOARD," filed Jan. 23, 2020, which is herein incorporated by reference in its entirety. U.S. application Ser. No. 16/750,967 claims priority under 35 U.S.C. § 119(e) to U.S. Provisional Application Ser. No. 62/952,009, titled "I/O CONNECTOR CONFIGURED FOR CABLE CONNECTION TO A MIDBOARD," filed on Dec. 20, 2019, which is herein incorporated by reference in its entirety. U.S. application Ser. No. 16/750,967 claims priority under 35 U.S.C. § 119(e) to U.S. Provisional Application Ser. No. 62/796,913, titled "I/O CONNECTOR CONFIGURED FOR CABLE CONNECTION TO A MIDBOARD," filed on Jan. 25, 2019, which is herein incorporated by reference in its entirety.

BACKGROUND

This patent application relates generally to interconnection systems, such as those including electrical connectors, used to interconnect electronic assemblies.

Electrical connectors are used in many electronic systems. It is generally easier and more cost effective to manufacture a system as separate electronic assemblies, such as printed circuit boards (PCBs), which may be joined together with electrical connectors. A known arrangement for joining several printed circuit boards is to have one printed circuit board serve as a backplane. Other printed circuit boards, called "daughterboards" or "daughtercards," may be connected through the backplane.

A backplane is a printed circuit board onto which many connectors may be mounted. Conducting traces in the backplane may be electrically connected to signal conductors in the connectors so that signals may be routed between the connectors. Daughtercards may also have connectors mounted thereon. The connectors mounted on a daughtercard may be plugged into the connectors mounted on the backplane. In this way, signals may be routed among the daughtercards through the backplane. The daughtercards may plug into the backplane at a right angle. The connectors used for these applications may therefore include a right angle bend and are often called "right angle connectors."

Connectors may also be used in other configurations for interconnecting printed circuit boards. Sometimes, one or more smaller printed circuit boards may be connected to another larger printed circuit board. In such a configuration, the larger printed circuit board may be called a "motherboard" and the printed circuit boards connected to it may be called daughterboards. Also, boards of the same size or similar sizes may sometimes be aligned in parallel. Connectors used in these applications are often called "stacking connectors" or "mezzanine connectors."

Connectors may also be used to enable signals to be routed to or from an electronic device. A connector, called an "input/output (I/O) connector" may be mounted to a printed circuit board, usually at an edge of the printed circuit board. That connector may be configured to receive a plug at one end of a cable assembly, such that the cable is connected to the printed circuit board through the I/O connector. The other end of the cable assembly may be connected to another electronic device.

Cables have also been used to make connections within the same electronic device. The cables may be used to route signals from an I/O connector to a processor assembly that is located in the interior of a printed circuit board, away from the edge at which the I/O connector is mounted, for example. In other configurations, both ends of a cable may be connected to the same printed circuit board. The cables can be used to carry signals between components mounted to the printed circuit board near where each end of the cable connects to the printed circuit board.

Cables provide signal paths with high signal integrity, particularly for high frequency signals, such as those above 40 Gbps using an NRZ protocol. Cables are often terminated at their ends with electrical connectors that mate with corresponding connectors on the electronic devices, enabling quick interconnection of the electronic devices. Each cable may have one or more signal conductors embedded in a dielectric and wrapped by a conductive foil. A protective jacket, often made of plastic, may surround these components. Additionally the jacket or other portions of the cable may include fibers or other structures for mechanical support.

One type of cable, referred to as a "twinax cable," is constructed to support transmission of a differential signal and has a balanced pair of signal wires embedded in a dielectric and wrapped by a conductive layer. The conductive layer is usually formed using foil, such as aluminized Mylar.

The twinax cable can also have a drain wire. Unlike a signal wire, which is generally surrounded by a dielectric, the drain wire may be uncoated so that it contacts the conductive layer at multiple points over the length of the cable. At an end of the cable, where the cable is to be terminated to a connector or other terminating structure, the protective jacket, dielectric and the foil may be removed, leaving portions of the signal wires and the drain wire exposed at the end of the cable. These wires may be attached to a terminating structure, such as a connector. The signal wires may be attached to conductive elements serving as mating contacts in the connector structure. The drain wire may be attached to a ground conductor in the terminating structure. In this way, any ground return path may be continued from the cable to the terminating structure.

SUMMARY

In some aspects, embodiments of a midboard cable termination assembly are described.

According to various aspects of the present disclosure, there is provided an electrical connector comprising a terminal subassembly. The terminal subassembly comprises a plurality of conductive elements, wherein each conductive element of the plurality of conductive elements comprises a contact portion, a contact tail and an intermediate portion joining the contact portion and the contact tail. The contact portions of the plurality of conductive elements are positioned in a row. The plurality of conductive elements comprises conductive elements of a first type and a second type. The conductive elements of the first type have intermediate portions with a 90 degree bend and contact tails configured for attachment to a printed circuit board. The conductive elements of the second type have contact tails configured for a cable termination.

According to various aspects of the present disclosure, there is provided an electrical connector comprising a plurality of terminal subassemblies. Each of the plurality of terminal subassemblies comprises a plurality of conductive elements, wherein each conductive element of the plurality of conductive elements comprises a contact portion, a contact tail and an intermediate portion joining the contact portion and the contact tail. The contact portions of the plurality of conductive elements are positioned in a row. The plurality of conductive elements comprises conductive elements of a first type and a second type. The conductive elements of the first type have intermediate portions with a 90 degree bend and contact tails configured for attachment to a printed circuit board. The conductive elements of the second type have contact tails configured for a cable termination.

According to various aspects of the present disclosure, there is provided an electrical connector comprising a plurality of terminal subassemblies. Each of the plurality of terminal subassemblies comprises a plurality of conductive elements. Each conductive element of the plurality of conductive elements comprises a contact portion, a contact tail and an intermediate portion joining the contact portion and the contact tail. The contact portions of the plurality of conductive elements are positioned in a row extending in a direction from a first side of the terminal subassembly towards a second side of the terminal subassembly. The electrical connector comprises a first conductive member and a second conductive member. The first conductive member is disposed adjacent the first sides of the plurality of terminal subassemblies and engages conductive elements within the terminal subassemblies. The second conductive member is disposed adjacent the second sides of the plurality of terminal subassemblies and engages conductive elements within the terminal subassemblies.

According to various aspects of the present disclosure, there is provided an input/output (I/O) connector comprising a cage comprising a channel and at least one engagement feature and a plurality of terminal subassemblies. Each of the plurality of terminal subassemblies comprises a plurality of conductive elements. Each conductive element of the plurality of conductive elements comprises a contact portion, a contact tail and an intermediate portion joining the contact portion and the contact tail. The contact portions of the plurality of conductive elements are positioned in a row. Each of the plurality of terminal subassemblies comprises an insulative portion holding the plurality of conductive elements. The plurality of terminal subassemblies engage the at least one engagement feature of the cage such that the contact portions of the plurality of terminal subassemblies are positioned at predetermined locations within the at least one channel.

According to various aspects of the present disclosure, there is provided an electrical connector comprising a plurality of terminal subassemblies. Each of the plurality of terminal subassemblies comprises a plurality of conductive elements. Each conductive element of the plurality of conductive elements comprises a contact portion, a contact tail and an intermediate portion joining the contact portion and the contact tail. The contact portions of the plurality of conductive elements are positioned in a row extending in a direction from a first side of the terminal subassembly towards a second side of the terminal subassembly. The electrical connector comprises an alignment member comprising a first edge and a second edge and biasing members between the plurality of terminal subassemblies and the alignment member. The biasing members are configured to urge surfaces of the plurality of terminal subassemblies against the second edge of the alignment member such that the plurality of terminal subassemblies have a predetermined position with respect to the alignment member.

The foregoing features may be used separately or in any suitable combination. The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 20A and 20B are top and bottom views, respectively, of a lower inner terminal subassembly, providing a row of contact portions of conductive elements within the connector, such as might be used in the manufacture of the receptacle connector of FIG. 16A;

DESCRIPTION OF PREFERRED EMBODIMENTS

Figure 1:
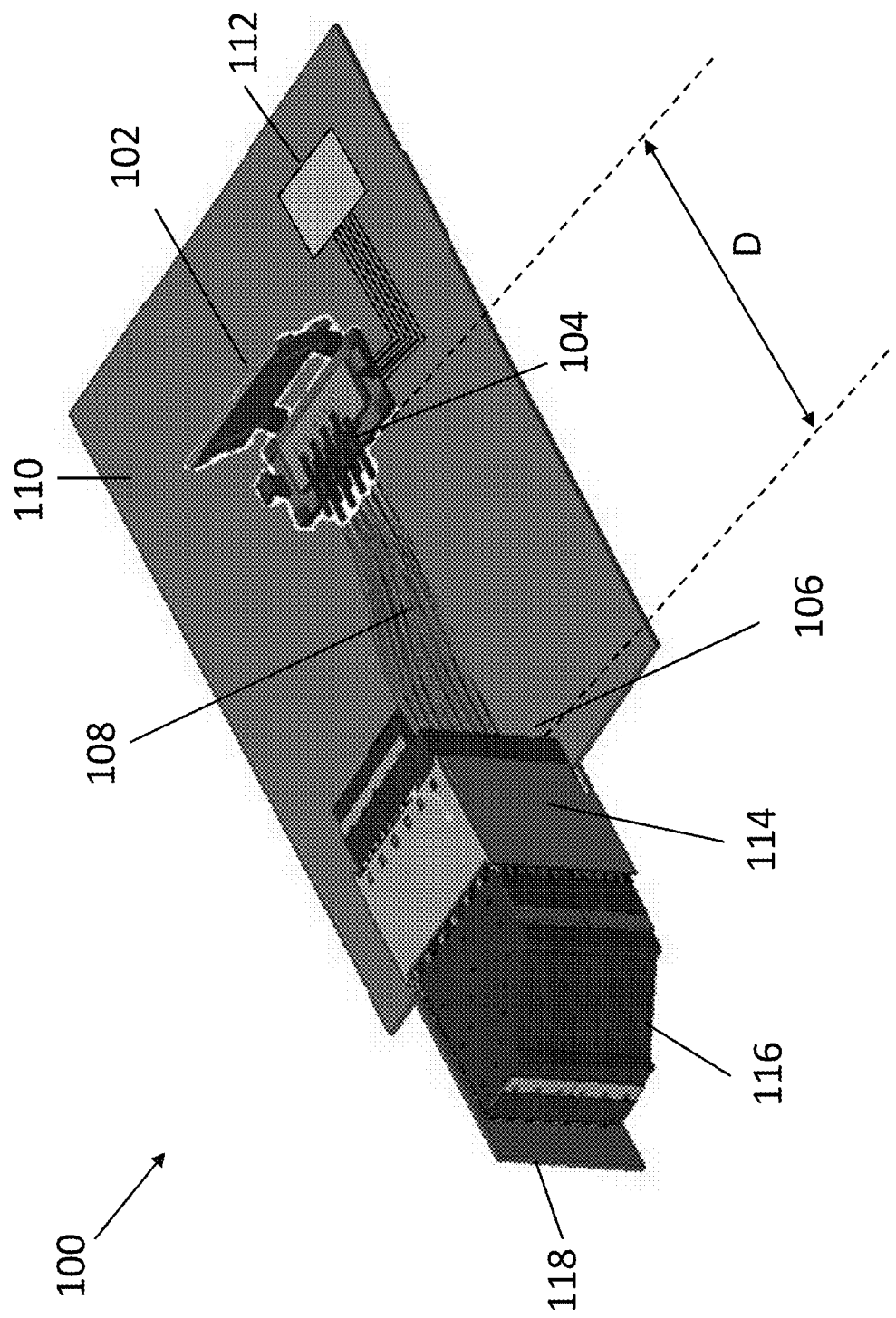
FIG. 1 is an isometric view of an illustrative midboard cable termination assembly disposed on a printed circuit board, in accordance with some embodiments.

The inventors have recognized and appreciated techniques that enable electrical connections with high signal integrity to be made from locations outside an electronic system to locations at the interior of a printed circuit board inside the system. Such connections may be made through an input/output (I/O) connector configured to receive a plug of an active optical cable (AOC) assembly or other external connection. That connector may be configured with terminations to cables that may route signals from the I/O connector to midboard locations. The I/O connector may also be configured to couple signals to or from the printed circuit board directly. Techniques as described herein may facilitate both types of connections being made with high signal integrity, but in a simple and low cost way.

In some embodiments, an I/O connector may be made from a stack of terminal subassemblies that include at least two types of conductive elements. A first type of conductive elements may have tails configured for direct attachment to a printed circuit board (PCB) to which the connector is mounted. A second type of conductive elements have tails configured to attachment to a cable. Cables attached to the tails of conductive elements of the second type may be routed out a cage enclosing the I/O connector to other locations within the electronic assembly, such as to a midboard portion of the PCB.

In some embodiments, high-speed signals (e.g., with data rates in excess of 1 Gbps) are transmitted through conductive elements having tails configured to attachment to cables while low-speed signals (e.g., with data rates less than 1 Gbps or electrical signals intended to provide power) may be transmitted via conductive elements having tails configured for direct attachment to a printed circuit board. Using conductive elements having tails configured to attachment to cables for at least some signals may allow for greater signal density and integrity to and from high-speed (for example, signals of 25 GHz or higher) components on the printed circuit board, such as in configurations where signal traces in printed circuit boards may not provide a required signal density and/or signal integrity, while using conductive elements having tails configured for direct attachment to a printed circuit board for at least some signals may reduce the number of cables required, which may in turn reduce system size and/or cost.

Further, techniques as described herein may improve signal integrity by reducing the tolerance between mating contact portions of conductive elements within the I/O connector and mating contact portions of conductive elements within a plug connector inserted into the I/O connector. The inventors have recognized and appreciated that these techniques for reducing tolerance may enable mating contact portions of the connectors to reliably function with reduced wipe during mating. Reduced wipe, in turn, may reduce the length of stubs in the mating interface of mated connectors, which may improve signal integrity.

In some embodiments, for example, terminal subassemblies may engage with a cage surrounding the I/O connector. The cage may be a stamped metal part such that the dimensions of the cage may be controlled by a stamping die used in forming the cage, which leads to low variation in the position of features of the cage. In some embodiments, forming parts by stamping metal may provide more accurately dimensioned parts than parts formed by other processes, for example, housings formed by plastic molding. By engaging the terminal subassemblies directly to features of the cage, rather than to a receptacle housing which is then positioned relative to the cage, the contact portions of the terminal subassemblies may be positioned with low variability relative to a predetermined location of the cage. The cage may have a channel, configured to receive a mating plug, that is elongated so as to establish the direction of insertion of the plug for mating. In some embodiments, the cage may have an engagement feature that establishes the position of the terminal subassemblies with respect to the direction of insertion of the plug. For example, the engagement feature may be a slot that is perpendicular to the direction of insertion of the plug that receives projections from the terminal subassemblies.

Alternatively or additionally, variability in position of the contact portions of conductive elements of the terminal subassemblies may be reduced by an alignment member engaging with the plurality of subassemblies. In some embodiments, the plurality of subassemblies may be pressed against the alignment member, thereby establishing the positions of all of the subassemblies relative to the alignment member. The alignment member may be produced with low variability, such as by stamping. Multiple terminal subassemblies may be positioned relative to the alignment member, and therefore with respect to each other, with low variability.

A block of terminal subassemblies aligned in this way may be incorporated into an I/O connector, such as by attaching the block to a cage and/or other components of the I/O connector. The position of a plug in a mated configuration may be established with respect to the block of terminal subassemblies by engaging the plug with features on the cage and/or other components of the I/O connector, leading to less variability from connector to connector in the position of contact portions of the conductive elements of the I/O connector and pads in the plug.

Less variability of the position of the contact portions and pads can improve electrical performance of the I/O connector, particularly at high frequencies. Connectors are conventionally designed to account for variability in the position of the contact portions and the pads. For reliable mating, it may be desirable that the contacts slide relative to each other over a minimum distance. When there is variability in the position of the contact surfaces, the plug may be designed with pads long enough that, when all components have nominal dimensions, the contact portions slide or "wipe" over the pads upon mating a distance equal to the minimum desired distance plus an amount to account for variability in the relative position in the contacts and pads. Designing for this amount of wipe ensures that the minimum desired wipe occurs for any connector, even if that connector has contact portions in positions that deviate from the nominal positions up to the full amount of the expected variability in position of the contact portions.

However, longer pads to accommodate variability means that, on average, when mated, the end of the pad will extend beyond the contact point by the minimum desired wipe plus the maximum expected variation in position of the contact portion. For some pads, the end of the pad will extend beyond the contact point by the minimum desired wipe plus twice the maximum expected variation in position of the contact portion.

With less variability in the position of the contact portions, a mating plug connector may be designed with shorter pads. On average, and worst case, there will be a shorter distance between the forward edge of the pad and the point of contact with the contact surfaces. This configuration is desirable for enhanced electrical performance because the portion of the pad between the forward edge and the point of contact can form stubs that support resonances at frequencies that are inversely related to the length of the portion.

Techniques reducing the variability in position of the contact portions with respect to a mated plug may be used in conjunction with design techniques that reduce the distance between the forward edge of the pad and the point of contact with the contact portions. As a result, stub lengths may be reduced and resonances may occur at frequencies that do not interfere with operation of the connector, even at relatively high frequencies, such as up to at least 25 GHz, up to at least 56 GHz or up to at least 112 GHz, up to at least 200 GHz, or greater, according to some embodiments.

Figure 27A:
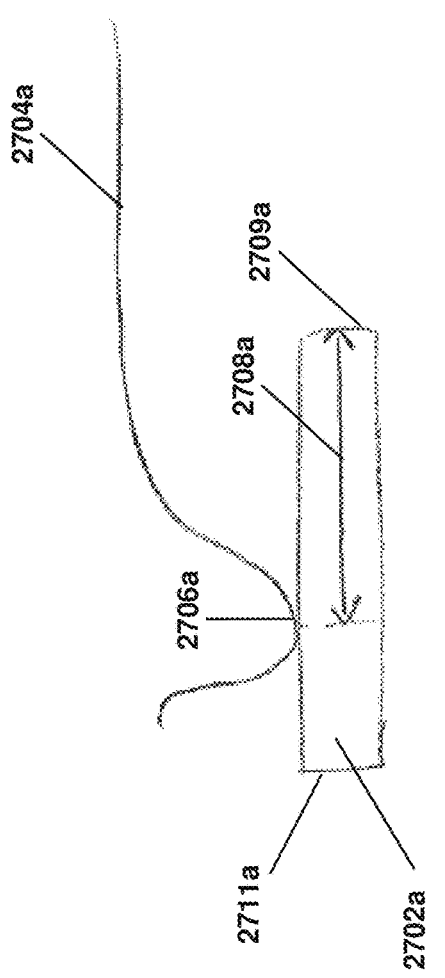
FIGS. 27A and 27B are side views of mating contact portions of receptacle connectors engaged with contact pads of plugs.

FIG. 27A shows a side view of a mating contact portion 2704a engaged with a contact pad 2702a. In some embodiments, mating contact portion 2704a may be a component of a receptacle connector similar to other receptacle connectors described herein. In some embodiments, contact pad 2702a may be a component of a plug similar to other plugs described herein. Contact mating portion 2704a mates with contact pad 2702a at contact point 2706a, forming a stub having stub length 2708a.

Figure 27B:
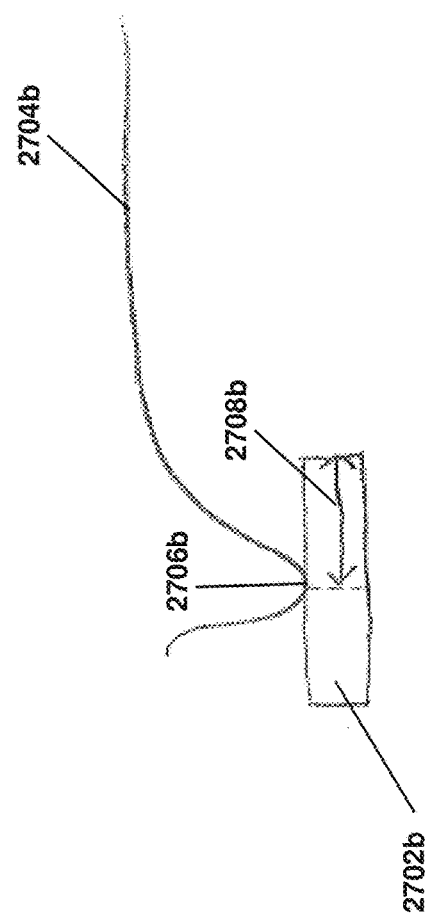

FIG. 27B shows a side view of a mating contact portion 2704b engaged with a contact pad 2702b. In some embodiments, mating contact portion 2704b may be a component of a receptacle connector similar to other receptacle connectors described herein. In some embodiments, contact pad 2702b may be a component of a plug similar to other plugs described herein. Contact mating portion 2704b mates with contact pad 2702b at contact point 2706b, forming a stub having stub length 2708b. Stub length 2708b is shorter than sub length 2708a. A reduced stub length 2708b may be achieved via reducing overall tolerance or increasing alignment precision using any of the techniques described herein.

Figure 27C:
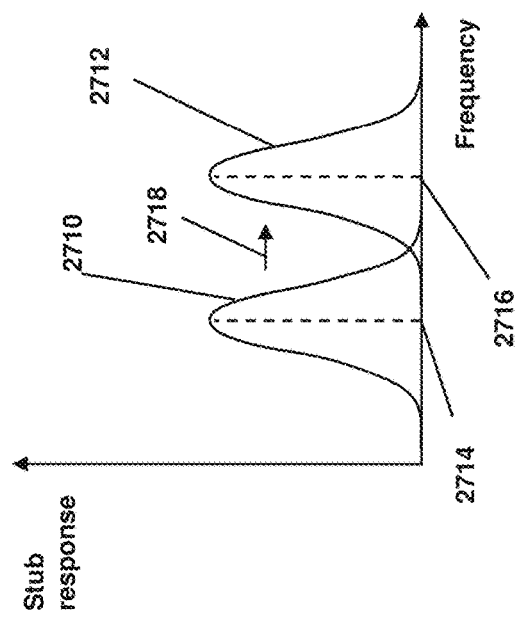
FIG. 27C shows an illustrative plot of stub response versus frequency for the mating contact portions of receptacle connectors engaged with the contact pads of plugs of FIGS. 27A and 27B.

FIG. 27C shows an illustrative plot of stub response versus frequency for the mating contact portion 2704a engaged with contact pad 2702a in FIG. 27A and contact mating portion 2704b engaged with contact pad 2704b in FIG. 27B. The horizontal axis shows frequency of signals transmitted through the contact mating portions and contact pads. The vertical axis shows the response of the stubs formed by the location of contact points 2706a and 2706b that results from the frequency of the signals transmitted through the contact mating portions and contact pads, at each frequency. The stub response may represent, for example, resonant frequencies arising in response to reflections in the stub. As signals propagate along a pad (for example from left to right in FIG. 27A), a portion of the signal couples to the contact mating portion and a portion of the signal couples to the stub. The energy that couples to the stub is eventually reflected back at forward edge 2709a. The reflected signal can further reflect at rear edge 2711*a* (and/or at contact point 2706*a*), thus giving rise to a resonator.

Stub length 2708*a* has a response illustrated by curve 2710. Curve 2710 has a peak at frequency 2714 and tends to zero on either side of frequency 2714. Stub length 2708*b* has a response illustrated by curve 2712. Curve 2712 has a peak at frequency 2716 and tends to zero on either side of frequency 2716. The peak at frequency 2716 occurs at a higher frequency than the peak at frequency 2714. By reducing stub length, such as be reducing stub length 2708*a* to stub length 2708*b*, using the techniques described herein for reducing overall tolerance or increasing alignment precision, a frequency shift 2718 to higher frequencies may be achieved. The frequency shift 2718 increases the operating frequency of signals that may be transmitted through contact mating portion 2704*b* and contact pad 2702*b* without the adverse electrical effects associated with stubs that occur at higher frequencies.

FIG. 1 shows an isometric view 100 of an illustrative electronic system in which a cabled connection is made between a connector mounted at the edge of a printed circuit board and a midboard cable termination assembly disposed on a printed circuit board. In the illustrated example, the midboard cable termination assembly is used to provide a low loss path for routing electrical signals between one or more components, such as component 112, mounted to printed circuit board 110 and a location off the printed circuit board. Component 112, for example, may be a processor or other integrated circuit chip. However, any suitable component or components on printed circuit board 110 may receive or generate the signals that pass through the midboard cable termination assembly.

In the illustrated example, the midboard cable termination assembly couples signals between component 112 and printed circuit board 118. Printed circuit board 118 is shown to be orthogonal to circuit board 110. Such a configuration may occur in a telecommunications switch or in other types of electronic equipment. However, a midboard cable termination assembly may be used in electronic equipment with other architectures. For example, a midboard cable termination assembly may be used to couple signals between a location in the interior of a printed circuit board and one or more other locations, such as a transceiver terminating an active optical cable assembly.

In the example of FIG. 1, the connector 114 is mounted at the edge of printed circuit board 110. Rather than being configured as an I/O connector, the connector 114 is configured to support connections between the two orthogonal printed circuit boards 110 and 118. Nonetheless, FIG. 1 illustrates cabled connections for at least some of the signals passing through connector 114, and this technique may be similarly applied in an I/O connector.

FIG. 1 shows a portion of an electronic system including midboard cable termination assembly 102, cables 108, component 112, right angle connector 114, connector 116, and printed circuit boards (PCBs) 110, 118. Midboard cable termination assembly 102 may be mounted on PCB 110 near component 112, which is also mounted on PCB 110. Midboard cable termination assembly 102 may be electrically connected to component 112 via traces in PCB 110. Other suitable connections techniques, however, may be used instead of or in addition to traces in a PCB. In other embodiments, for example, midboard cable termination assembly 102 may be mounted to a component package containing a lead frame with multiple leads, such that signals may be coupled between midboard cable termination assembly 102 and the component through the leads.

Cables 108 may electrically connect midboard cable termination assembly 102 to a location remote from component 112 or otherwise remote from the location at which midboard cable termination assembly 102 is attached to PCB 110. In the illustrated embodiment, a second end of cable 108 is connected to right angle connector 114. Connector 114 is shown as an orthogonal connector that can make separable electrical connections to connector 116 mounted on a surface of printed circuit board 118 orthogonal to printed circuit board 110. Connector 114, however, may have any suitable function and configuration, and may, for example, be an I/O connector as described below.

In the embodiment illustrated, connector 114 includes one type of connector unit mounted to PCB 110 and another type of connector unit terminating cables 108. Such a configuration enables some signals routed through connector 114 to connector 116 to be connected to traces in PCB 110 and other signals to pass through cables 108. In some embodiments, higher frequency signals, such as signals above 10 GHz or above 25 GHz above 56 GHz or above 112 GHz in some embodiments, may be connected through cables 108.

In the illustrated example, the midboard cable termination assembly 102 is electrically connected to connector 114. However, the present disclosure is not limited in this regard. The midboard cable termination assembly 102 may be electrically connected to any suitable type of connector or component capable of accommodating and/or mating with the second ends 106 of cables 108.

Cables 108 may have first ends 104 attached to midboard cable termination assembly 102 and second ends 106 attached to connector 114. Cables 108 may have a length that enables midboard cable termination assembly 102 to be spaced from second ends 106 at connector 114 by a distance D.

In some embodiments, the distance D may be longer than the distance over which signals at the frequencies passed through cables 108 could propagate along traces within PCB 110 with acceptable losses. In some embodiments, D may be at least six inches, in the range of one to 20 inches, or any value within the range, such as between six and 20 inches. However, the upper limit of the range may depend on the size of PCB 110, and the distance from midboard cable termination assembly 102 that components, such as component 112, are mounted to PCB 110. For example, component 112 may be a microchip or another suitable high-speed component that receives or generates signals that pass through cables 108.

Midboard cable termination assembly 102 may be mounted near components, such as component 112, which receive or generate signals that pass through cables 108. As a specific example, midboard cable termination assembly 102 may be mounted within six inches of component 112, and in some embodiments, within four inches of component 112 or within two inches of component 112. Midboard cable termination assembly 102 may be mounted at any suitable location at the midboard, which may be regarded as the interior regions of PCB 110, set back equal distances from the edges of PCB 110 so as to occupy less than 80% of the area of PCB 110.

Midboard cable termination assembly 102 may be configured for mounting on PCB 110 in a manner that allows for ease of routing signals coupled through connector 114. For example, the footprint associated with mounting midboard cable termination assembly 102 may be spaced from the edge of PCB 110 such that traces may be routed out of that portion of the footprint in all directions, such as toward component 112. In contrast, signals coupled through connector 114 into PCB 110 will be routed out of a footprint of connector 114 toward the midboard.

Further, connector 114 is attached with eight cables aligned in a column at second ends 106. The column of cables are arranged in a 2×4 array at first ends 104 attached to midboard cable termination assembly 102. Such a configuration, or another suitable configuration selected for midboard cable termination assembly 102, may result in relatively short breakout regions that maintain signal integrity in connecting to an adjacent component in comparison to routing patterns that might be required were those same signals routed out of a larger footprint.

The inventors have recognized and appreciated that signal traces in printed circuit boards may not provide the signal density and/or signal integrity required for transmitting high-speed signals, such as those of 25 GHz or higher, between high-speed components mounted in the midboard and connectors or other components at the periphery of the PCB. Instead, signal traces may be used to electrically connect a midboard cable termination assembly to a high-speed component at short distance, and in turn, the midboard cable termination assembly may be configured to receive termination ends of one or more cables carrying the signal over a large distance. Using such a configuration may allow for greater signal density and integrity to and from a high-speed component on the printed circuit board. In some embodiments, high-speed signals (e.g., with data rates in excess of 1 Gbps) are transmitted through cables while low-speed signals (e.g., with data rates less than 1 Gbps) may be transmitted via contact tails provided for attachment to a printed circuit board. The contact tails, for example, may be pressfits that are inserted into vias in the PCB or surface mount tails that are surface mount soldered to pads on the PCB. These contact tails may carry low-speed signals and/or, in some embodiments, power. Alternatively or additionally, low-speed signals or power may be routed through the cables.

FIG. 1 shows an illustrative midboard cable termination assembly 102. Other suitable termination assemblies may be used. Cables 108, for example, may be terminated at their midboard end with a plug connector, which may be inserted into a receptacle mounted to printed circuit board 110. Alternatively, the midboard end of cables 108 may be attached to pressfits or other conductive elements that may be directly attached to PCB 110 without a plug connector. Alternatively or additionally, the midboard end of cables 108 may be terminated to component 112, directly or through a connector.

The connector at the edge of printed circuit board 110 may similarly be formatted for other architectures and may, for example, be an I/O connector.

Figure 2:
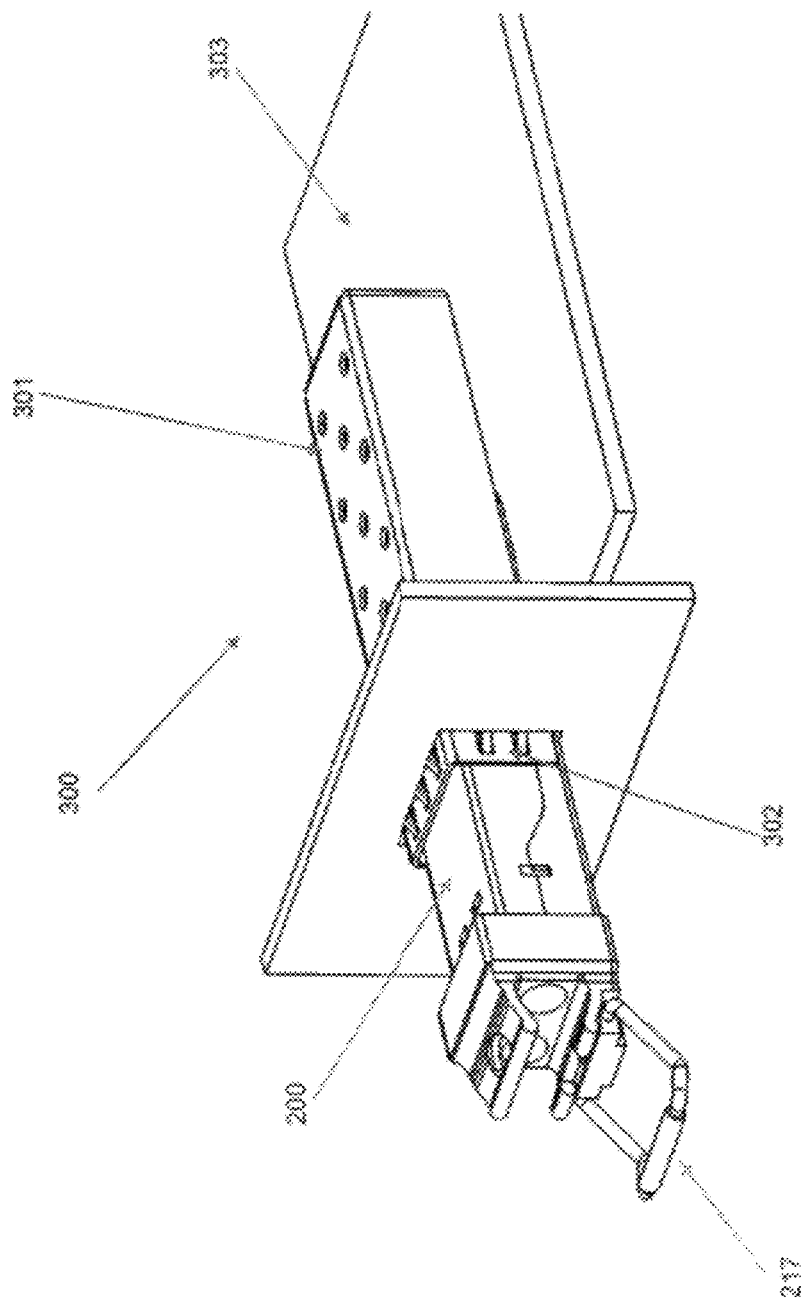
FIG. 2 is an isometric view of an electronic assembly, partially cut away, revealing a cage in closing a receptacle connector according to unknown design.

FIG. 2 illustrates a known I/O connector arrangement, which does not support cabled connections to a midboard. In the embodiment illustrated in FIG. 2, a cage 301 is mounted to a printed circuit board 303 site electronic assembly 300. A forward end 302 of cage 301 extends into an opening of a panel, which may be a wall of an enclosure containing circuit board 303. To make connections between components within electronic system 300 and external components, a plug may be inserted into the channel formed by cage 301. In this example, that plug is configured as a transceiver, such as may be used to terminate an optical cable to form an active optical cable assembly.

A transceiver 200 is shown partially inserted into the forward end 302 of cage 301. Transceiver 200 includes a bail 217, which may be grasped to insert and remove transceiver 200 from cage 301. Though not shown in FIG. 2, an end of transceiver 200 including bail 217 may be configured to receive optical fibers, which may be connected to other electronic devices.

Transceiver 200 may include circuitry that converts optical signals on the fibers to electrical signals and vice versa. Though not visible in FIG. 2, a receptacle connector may be mounted at the rear end of cage 301. That connector provides signal paths between transceiver 200 and traces within printed circuit board 303 such that electrical signals may be exchanged between the transceiver and components mounted to a printed circuit board 300.

Figure 3:
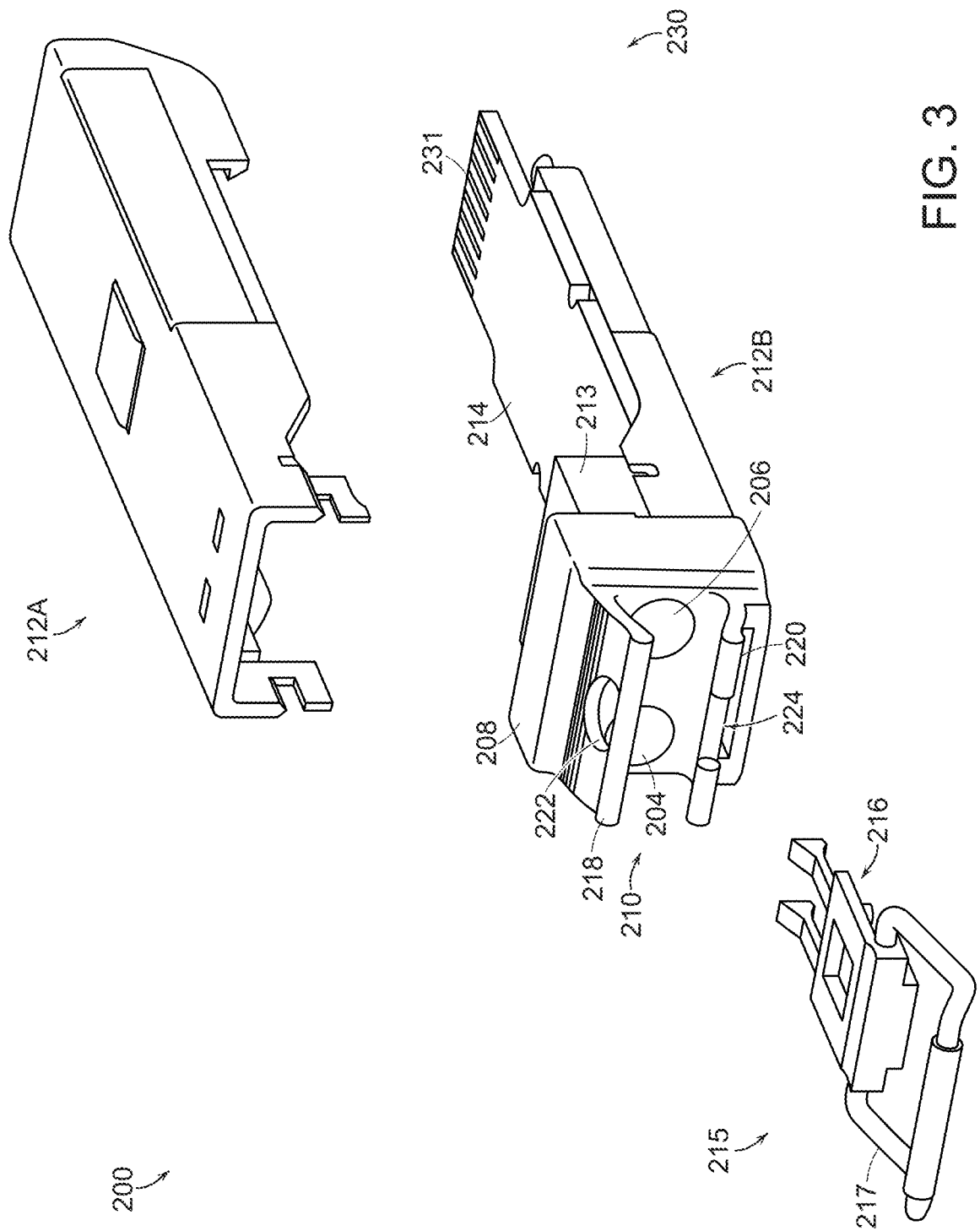
FIG. 3 is an exploded view of a transceiver configured for insertion into the cage of FIG. 2.

FIG. 3 shows an exploded view of transceiver 200. Internal to transceiver 200 is a printed circuit board 214, sometimes called a "paddle card". A forward mating end of paddle card 214 contains conductive pads 231. The mating end of paddle card 214 may be inserted into a receptacle connector and mating contacts of conductive elements within a connector may make contact to the conductive pads 231. FIG. 3 shows a row of conductive pads 231 on an upper surface of paddle card 214. A similar row of conductive pads may line the bottom side of paddle card 214. A transceiver with a paddle card in this configuration may mate with a receptacle connector that has a slot into which the forward mating end of the paddle card 214 is inserted. That slot may be lined top and bottom with mating contacts for conductive elements in the connector.

Figure 4A:
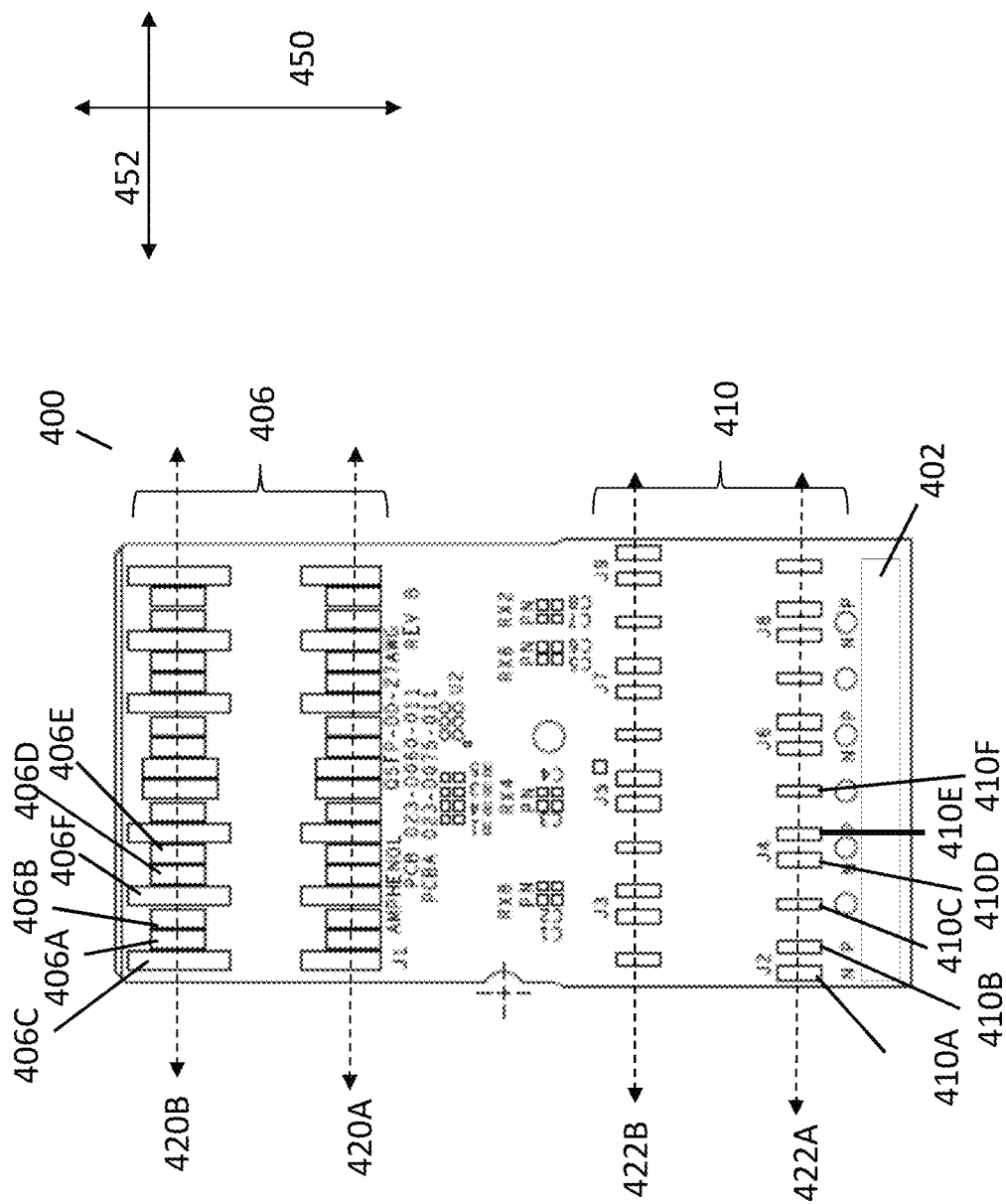
FIG. 4A is a top plan view of a paddle card for a double density plug, such as might be inserted into a receptacle connector as described herein.
Figure 4B:
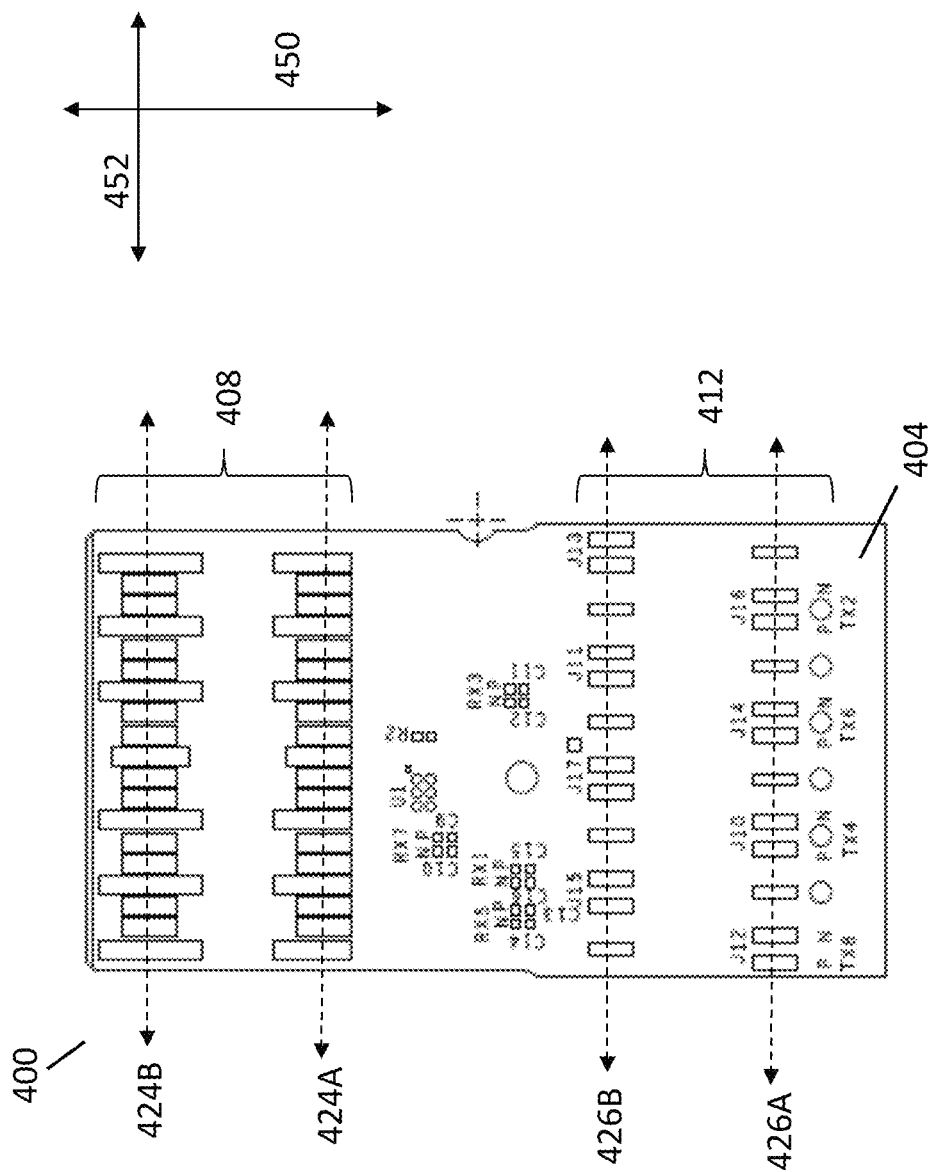
FIG. 4B is a bottom plan view of a paddle card of FIG. 4A.

FIG. 3 illustrates a paddle card for a single density connection, as a single row of paddle cards is shown. Some transceivers may employ a double density configuration in which two rows of pads are adjacent to a mating end of the paddle card. FIGS. 4A and 4B illustrate a paddle card that may be used in a transceiver figured in a double density configuration.

FIG. 4A is a plan view of a first side 402 of an exemplary paddle card 400, and FIG. 4B is a plan view of the opposite side 404 of the exemplary paddle card 400. The paddle card extends along a first direction 450 and a second direction 452. The width of the paddle card 4A (here shown as being in the second direction 452) may be specified by the associated standard, at least at the mating interface where contact pads 406 are located. For example, in some embodiments, the width may range between 13.25 and 19.75 millimeters, between 19.5 and 29 millimeters, and/or the like. In many commercial implications, the paddle card will have the same width over its entire length.

Each side 402 and 404 has contact pads 406 and 408 shown in FIGS. 4A and 4B. Each side 402 and 404 also has solder pads 410 or 412. The pads can be implemented in various ways, such as by a layer of metal disposed on the surface of the paddle card 400 over or otherwise connected to a via within the paddle card 400 or as the top of a via within the paddle card 400.

The solder pads 410 are arranged along two rows shown by dotted arrows 422A and 422B, and the solder pads 412 are similarly arranged along two rows shown by dotted arrows 426A and 426B. Like the contact pads 406 and 408 as discussed below, the solder pads 410 and 412 include sets of solder pads. There may be a set of solder pads per cable. FIG. 4A shows a first set of solder pads J2, which includes signal solder pads 410A and 410B and ground solder pad 410C disposed to the right of the signal solder pads 410A and 410B. In this exemplary embodiment, the solder pads 410A, 410B and 410C are used to electrically and physically connect to the pair of signal wires (denoted "n" and "p" in the figure) and the ground of an associated transmit cable (e.g., the first transmit cable), respectively. FIG. 4A also shows a second set of solder pads J4, which includes signal solder pads 410D and 410E and ground solder pad 410F disposed to the right of the signal solder pads 410A and 410B. In this exemplary embodiment, the solder pads 410D, 410E and 410F are used to electrically and physically connect to the n and p signal wires and the ground of an associated transmit cable (e.g., the third transmit cable), respectively. The ground solder pads and pairs of signal solder pads in each row may alternate. For example, the pair of signal solder pads 410D and 410E are disposed between ground solder pads 410C and 410F, and ground solder pad 410C is disposed between signal solder pad pairs 410A/410B and 410D/410E.

In some embodiments, paddle card 400 may be constructed such that at least one of the ground solder pads adjacent a pair of signal pads is attached to a portion of the ground structure within the paddle card to which the traces attached to the pair of signal pads are referenced. If there is a common mode signal on the pair of traces, for example, there will be a corresponding return current flow through the ground structure to which those traces are referenced. In a paddle card, for example, ground planes may be interleaved between layers carrying signal traces such that the traces are referenced to an adjacent ground plane, which may be the closest ground plane to the traces.

The contact pads 406 and 408 are in electrical communication with the solder pads 410 and 412, respectively, through the interior of the paddle card. For example, a trace within the paddle card connects solder pad 410A with contact pad 406A; a second trace within the paddle card connects solder pad 410B with contact pad 406B; and a ground plane within the paddle card may connect solder pad 410C with contact pad 406C. As another example, a third trace may connect solder pad 410D with contact pad 406D; a fourth trace may connect solder pad 410E with the contact pad 406E. The same, or a different ground plane, may connect solder pad 410F with contact pad 406F. Thus, like the contact pads 410 and 412, the contact pads 406 and 408 can be logically grouped into sets of contact pads associated with the cables terminated to the paddle card.

For example, each set of contact pads in the contact pads 406 may include a pair of signal pads and a ground pad, which facilitate connection of the signals from the associated cable to corresponding contacts of a mating connector. For example, FIG. 4A shows a first set of contact pads, which includes signal contact pads 406A and 406B and ground contact pad 406C. In the illustrated embodiment, the ground contact pads, such as 406C, are longer than the signal contact pads, such as contact pads 406A and 406B. FIG. 4A also shows a second set of contact pads, which includes signal contact pads 406D and 406E and ground contact pad 406F. FIGS. 4A and 4B show other contact pads that are not numbered for simplicity. The contact pads 406 are arranged along two rows shown by dotted arrows 420A and 420B, and the contact pads 408 are similarly arranged along two rows shown by dotted arrows 424A and 424B. Each row includes a plurality of sets of contact pads.

The ground contact pads and pairs of signal contact pads in each row may alternate. For example, the pair of signal contact pads 406A and 406B are disposed between ground contact pads 406C and 406F, and ground contact pad 406F is disposed between signal pairs 406A/406B and 406D/406E. As shown, there is a space between the contact pads 406 and 408 (e.g., the space between rows 420A and 420B in FIG. 4A).

While not shown in FIGS. 4A and 4B, components can be attached to the paddle card 400. For example, the paddle card 400 can be sized sufficiently such that active components can be attached to the paddle card 400 in the space between the row 420A of contact pads and the row 422B of contact pads shown in FIG. 4A. For example, filters, amplifiers, transceivers, and/or the like are examples of active components that can be attached to the paddle card 400. Similarly, non-volatile memory (NVM), for example, an electrically erasable programmable read-only memory (EEPROM), may be attached to the paddle card. For example, in some applications it can be desirable to convert from the communication protocol being used on the cable to a different communication protocol (e.g., to convert between different communication standards). Active components can be included on the paddle card 400 to perform the conversion on the paddle card 400, such that a different protocol is provided to a mating connector. Alternatively or additionally, one or more passive components—such as a resistor; capacitor; inductor; transformer; may also be attached to the paddle card.

FIGS. 5A-15B illustrate construction and assembling of a receptacle connector 500, in accordance with some embodiments. Such a receptacle connector may be an I/O connector.

Figure 5A:
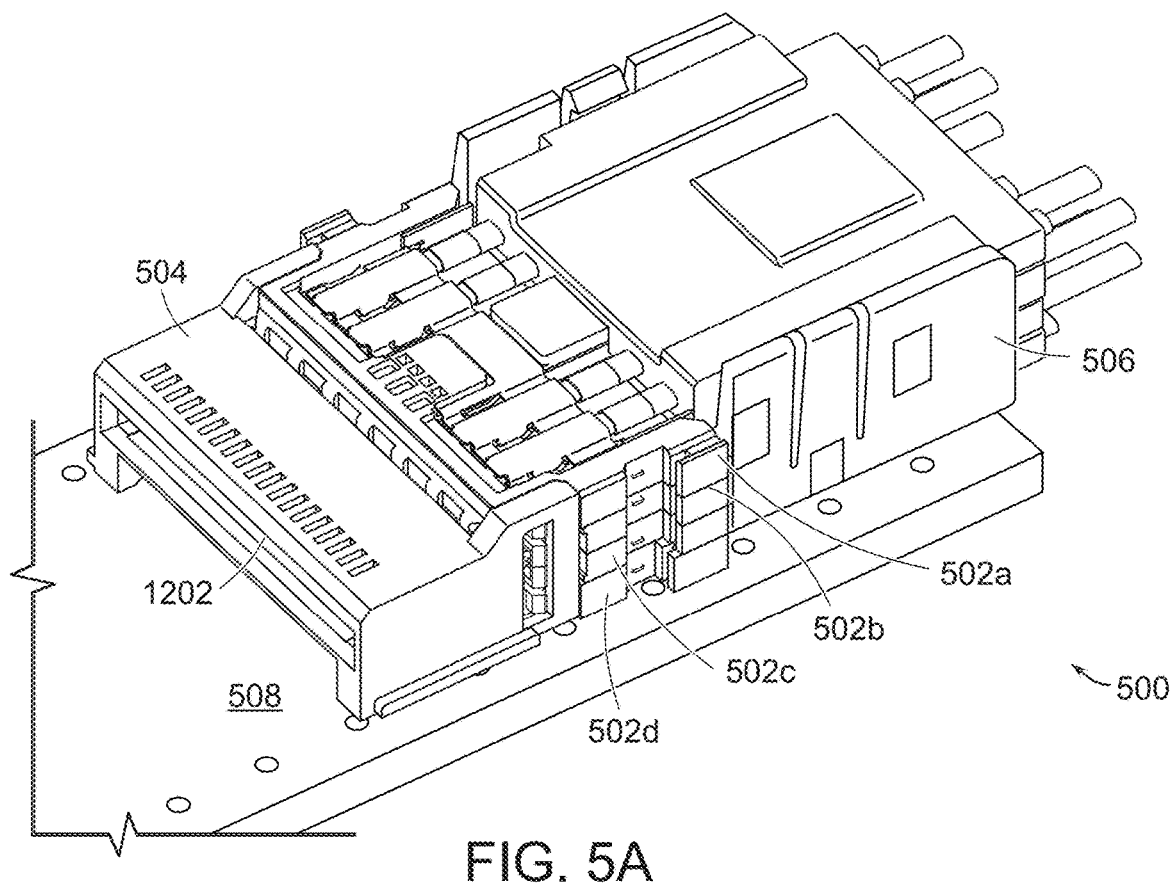
FIG. 5A is an isometric view of a receptacle connector configured for routing signals between a mating interface and both a printed circuit board and cables extending to the midboard of the printed circuit board.

FIG. 5A illustrates a receptacle connector 500 that may receive a double density paddle card. FIG. 5A shows the receptacle connector 500 without a cage. In this configuration, a slot (for example, slot 1202 formed in housing 504, as shown in of FIGS. 12A-12B), configured to receive the mating end of a paddle card, is visible. Though not visible in FIG. 5A, mating contacts of conductive elements inside the receptacle connector 500 may line the top and bottom of that slot 1202. Those mating contacts may be positioned in two rows, aligned to make contact to the two rows of pads as shown on the paddle cards in FIGS. 4A and 4B.

Some of those conductive elements have contact tails configured to be electrically connected to a printed circuit board, for example, printed circuit board 508, such as by being inserted into plated through holes in the circuit board to which the receptacle connector 500 is mounted. In this way, electrical signals may pass between a transceiver and the traces of the printed circuit board through the receptacle connector 500. FIG. 5A additionally shows cables (for example, cables 712, 812, 912, and/or 1012 described below) extending from a rear portion of the receptacle connector 500. As seen in the system configuration illustrated in FIG. 1, the other end of those cables (not visible in FIG. 5A) may be connected to a midboard cable termination assembly or otherwise connected at the midboard such that electrical signals may be routed from the plug of a cable assembly to the midboard without passing through the printed circuit board.

Figure 5B:
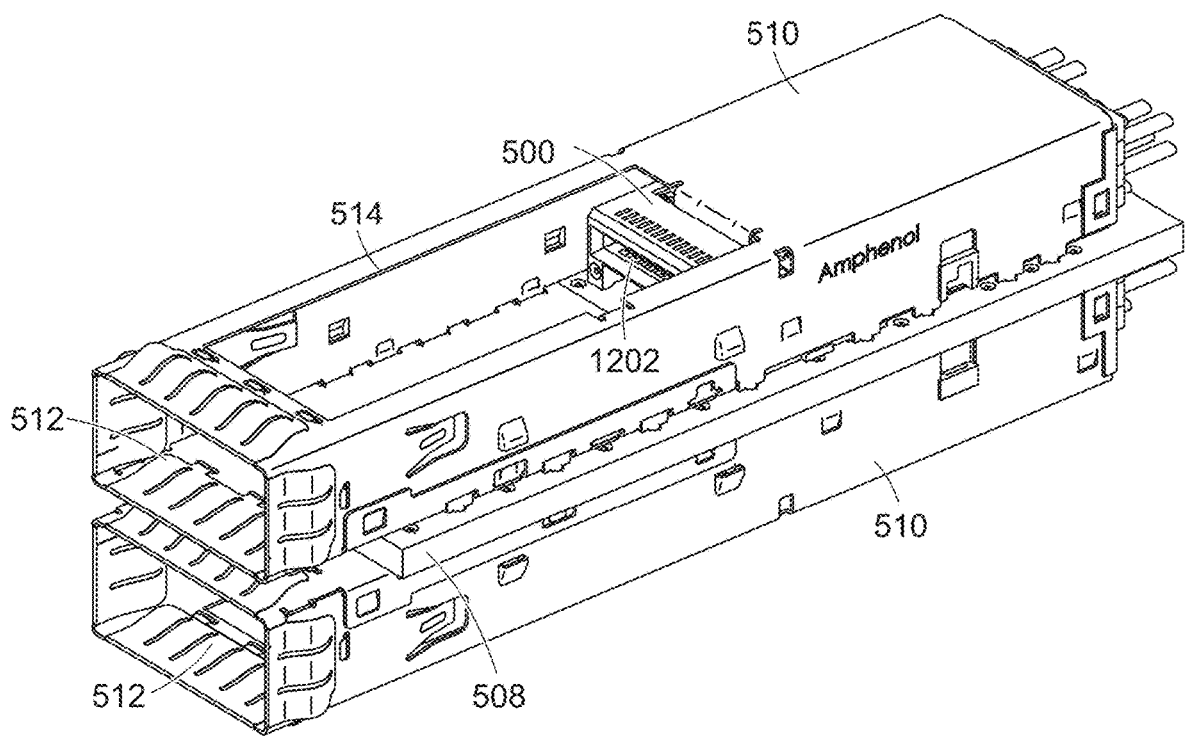
FIG. 5B is an isometric view of a cage such as might surround a receptacle connector in FIG. 5A, with a stack configuration.

FIG. 5B shows a cage 510 mounted around the receptacle connector 500. FIG. 5B also illustrates that the channels configured to receive transceivers may be stacked, one above the other. For example, a channel may be formed by front opening 512 in the cage 510, front opening 512 being configured to receive a transceiver. In the embodiment illustrated in FIG. 5B, the channels are stacked in the vertical direction by mounting a receptacle connector on the top and bottom of a printed circuit board. A cage 510 may include a top opening 514 configured such that a heat sink may extend through the opening 514 into the cage 510 to contact and/or cool a transceiver disposed in the cage 510.

In accordance with some embodiments, contact tails of conductive elements designated as signal conductors may be positioned such that when two connectors are mounted to printed circuit board 508 in the configuration shown in FIG. 5B, the signal contact tails are not aligned. Such a configuration enables a first set of holes to be drilled through the printed circuit board 508 to receive contact tails from a connector mounted to the top of the printed circuit board 508 and a second set of holes to be drilled through the printed circuit board 508 to receive contact tails from a connector mounted to the bottom of the printed circuit board 508. The first set and the second set of holes may be spaced so as not to interfere with each other. Such a configuration may result from positioning the tails associated signal conductors asymmetrically with respect to a centerline, extending in the mating direction, of the connector. Contact tails associated with ground conductors may similarly be asymmetrical, but may alternatively be symmetrical about the center line as the ground conductors from the top and bottom connectors may be inserted into the same set of holes.

In other configurations, stacking may be achieved by configuring one receptacle connector to receive two or more paddle cards. Such a connector, for example, may have two slots rather than one slot, as illustrated in FIG. 5A. In embodiments described herein, a receptacle connector is assembled from terminal subassemblies, each providing one row of mating contacts. For example, receptacle connector 500 shown in FIG. 5A includes terminal subassembly 502*a*, terminal subassembly 502*b*, terminal subassembly 502*c*, terminal subassembly 502*d* arranged in stacked configuration. Stacked terminal subassemblies may be engaged in an organizer 506. A stacked connector may be provided by inserting more terminal subassemblies into a housing with two or more slots.

Figure 6:
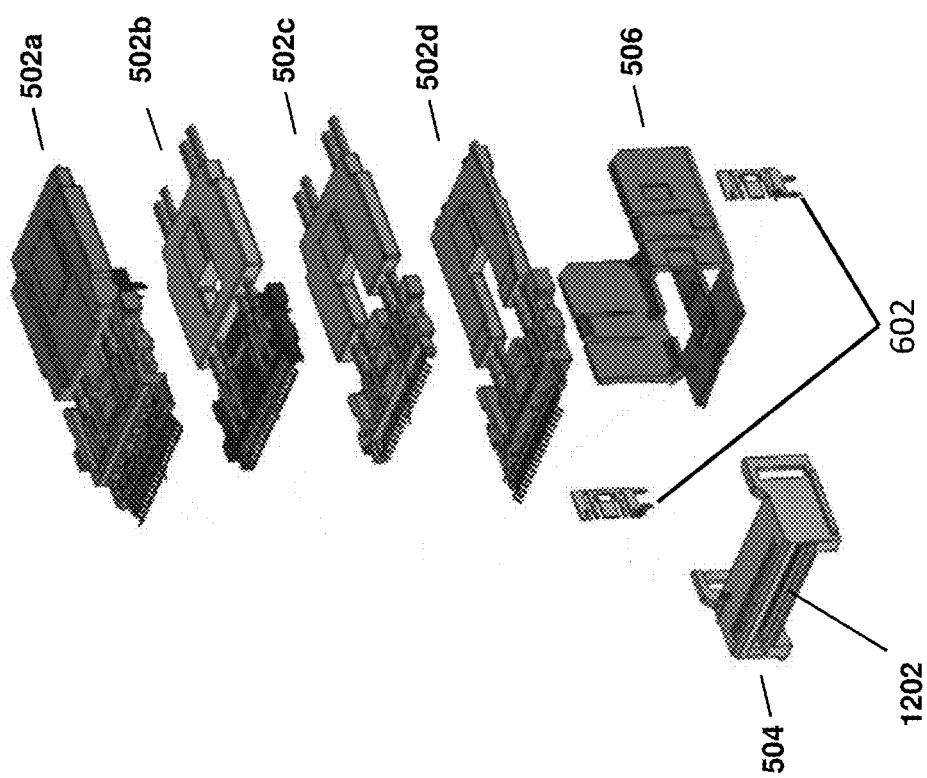
FIG. 6 is an exploded view of the receptacle connector of FIG. 5A.

FIG. 6 is an exploded view of the receptacle connector 500 shown in FIG. 5. In this example, a housing 504 with a single slot 1202 is shown. The housing 504 may be molded from insulative material.

Four terminal subassemblies, 502*a*, 502*b*, 502*c*, and 502*d*, are shown. Each terminal subassembly 502*a*, 502*b*, 502*c*, and 502*d* provides one row of mating contact portions of the conductive elements within the receptacle connector 500. In some embodiments, the row direction is parallel to a plane of the printed circuit board 508. Four terminal subassemblies 502*a*, 502*b*, 502*c*, and 502*d* are used to provide two rows lining the upper wall of the slot 1202 and two rows lining the lower wall of the slot 1202 for mating to a double density paddle card as shown in FIGS. 4A and 4B. As can be seen, the terminal subassemblies 502*a*, 502*b*, 502*c*, and 502*d* are generally planar and may be stacked one on top of another. The organizer 506, which may also be molded from insulative material, may be used to support contact tails of a first type of conductive element in the receptacle connector 500 that is configured for attachment to printed circuit board 508 to which the receptacle connector 500 is mounted.

Additionally, ground clips 602 may be provided to electrically connect the shields or other ground conductors within the separate terminal subassemblies 502*a*, 502*b*, 502*c*, and 502*d*. The ground clips 602 are configured to provide ground connections for each of the terminal subassemblies 502*a*, 502*b*, 502*c*, and 502*d*. In the illustrated embodiment, the ground conductors in each terminal subassembly 502*a*, 502*b*, 502*c*, and 502*d* are electrically connected to each other and to ground structures in the printed circuit board 508 through the ground clips 602.

As illustrated in FIG. 6, the ground clips 602 comprise a first ground clip and a second ground clip. The first ground clip and the second ground clip comprise a first member and a second member separate from the first member. In some embodiments, the ground clips 602 may be arranged in a plane defined by both a plugging direction of a transceiver and a direction normal to a printed circuit board. In such embodiments, the planes of the ground clips 602 are arranged may be normal to each of the rows of conductive elements 704*a*, 704*b*, 804*a*, 804*b*, 904*a*, 904*b*, 1004*a*, and 1004*b*.

Figure 7A:
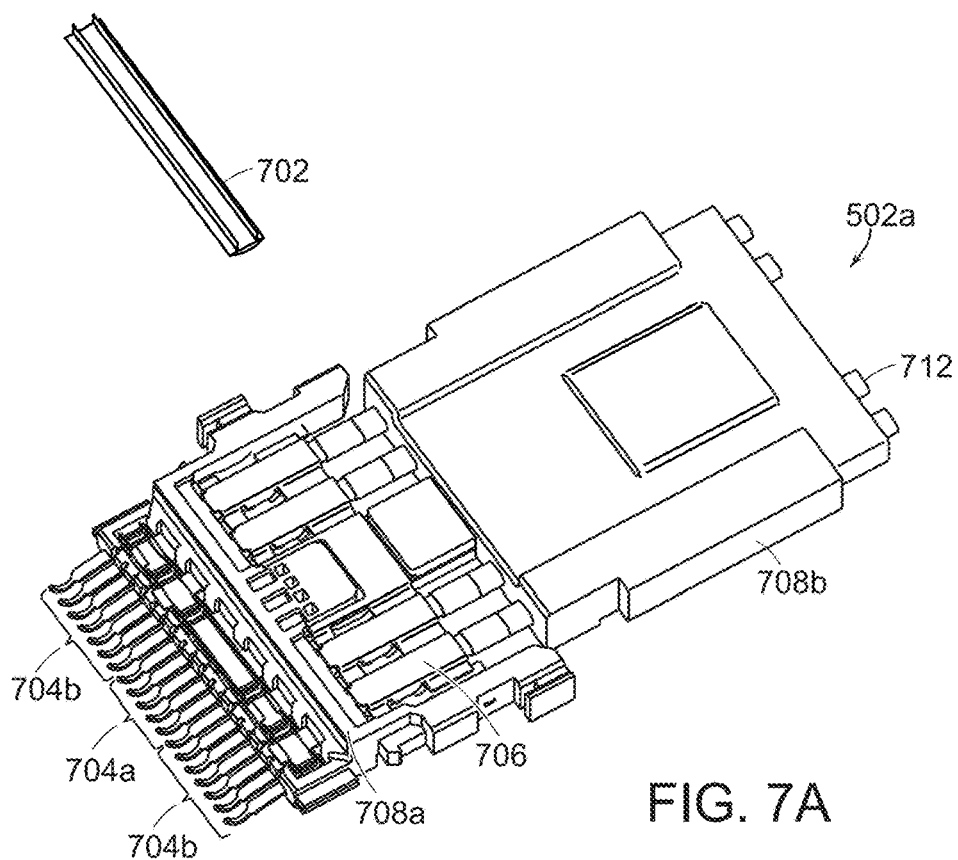
FIGS. 7A and 7B are top and bottom views, respectively, of an upper outer terminal subassembly, providing a row of contact portions of conductive elements within the connector, such as might be used in the manufacture of the receptacle connector of FIG. 5A.
Figure 7B:
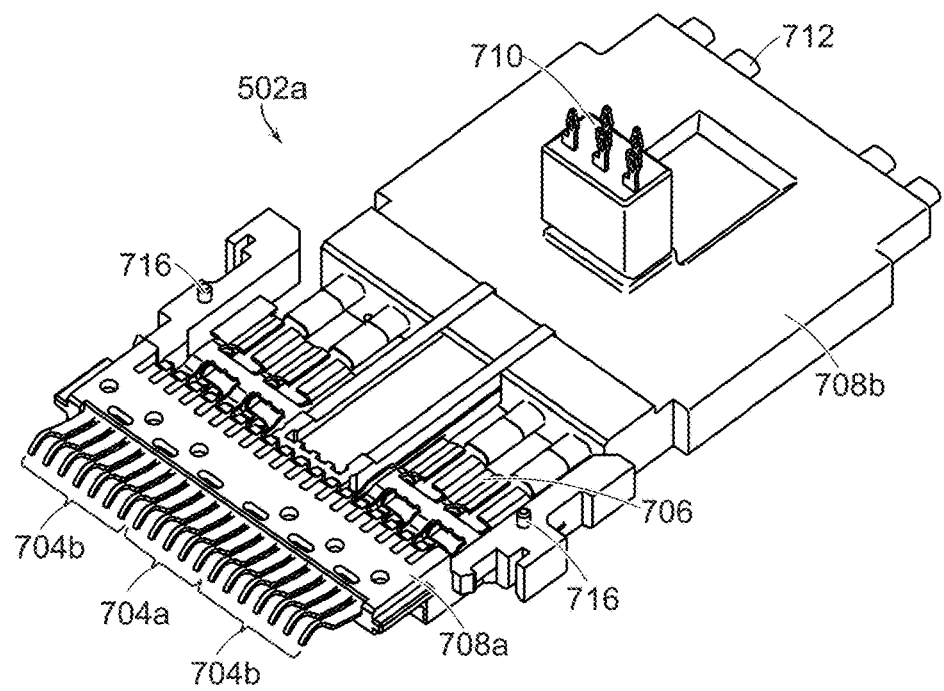

FIGS. 7A and 7B illustrate upper and lower views of a terminal subassembly 502*a*. The terminal subassembly 502*a* illustrated in these figures is configured with conductive elements 704*a* and 704*b* that provide the outer row of contact elements at the top of the slot 1202 in the connector housing 504. The terminal subassembly 504*a* illustrated in FIG. 7A may be formed by stamping a row of conductive elements 704*a* and 704*b* from a sheet of metal.

In some embodiments, a row direction of a row of conductive elements, (the direction along which different conductive elements of the row are spaced from each other), is arranged in a plane that is parallel to a plane of a printed circuit board 508 (FIG. 5A). In some embodiments, a row direction is arranged perpendicular to a plugging direction by which a transceiver is inserted into a cage enclosing the receptacle connector, via a front opening.

The conductive elements 704*a* and 704*b* may be shaped to have mating contact portions at one end. In some embodiments, the conductive elements 704*a* and 704*b* may be disposed in an insulative overmold 708*a*. For example, intermediate portions of the conductive elements 704*a* and 704*b* may be overmolded with an insulative material, such as plastic. The plastic holds the conductive elements 704*a* and 704*b* with their mating contact portions in a row. Both the contact portions and details of the conductive elements may extend from the insulative material.

In accordance with some embodiments, conductive elements in a row, such as conductive elements 704*a* and 704*b*, may be stamped from a sheet of metal, but initially held in position with tie bars. The housing, such as insulative overmold 708*a*, may be overmolded on those conductive elements so as to hold the conductive elements in the position. Then the tie bars may be severed to create electrically insulated conductive elements. The positions of the conductive elements may be set by the stamping die used to cut the conductive elements from the sheet of metal, even after the tie bars are severed.

The terminal subassembly 502*a* may include a first type of the conductive elements 704*a* and a second type of the conductive elements 704*b*. In some embodiments, such as illustrated in FIGS. 7A-7B, contact portions of the first type of the conductive elements 704*a* may be arranged between contact portions of the second type of the conductive elements 704*b*, such as between two groups contact portions of the second type of the conductive elements 704*b*. In some embodiments, low-speed signals (e.g., with data rates less than 1 Gbps) may be transmitted via the first type of the conductive elements 704*a*, which may have tails configured for direct attachment to a printed circuit board. In some embodiments, high-speed signals (e.g., with data rates in excess of 1 Gbps) are transmitted through the second type of the conductive elements 704*b*, which may have tails configured to attachment to cables. Using the first type of the conductive elements 704*a* having tails configured for direct attachment to a printed circuit board for at least some signals may allow for greater signal density and integrity to and from high-speed (for example, signals of 25 GHz or higher) components on the printed circuit board, such as in configurations where signal traces in printed circuit boards may not provide a required signal density and/or signal integrity. Using the second type of the conductive elements 704*b* having tails configured to attachment to cables for at least some signals may reduce the number of cables required, which may in turn reduce system size and/or cost.

The insulative overmold 708a may have two portions. One, adjacent the contact portions, may hold all of the conductive elements 704a and 704b in the terminal subassembly 502a. The second portion of the insulative overmold 708a may hold only a first type of conductive element, for example, first type of conductive elements 704a, configured with tails 710 for attachment to a printed circuit board 508. The first portion of the insulative overmold 708a is visible in both FIGS. 7A and 7B. The second portion of the insulative overmold 708a is visible in FIG. 7B adjacent the pressfits on the contact tails 710 of the first type of conductive elements 704a. In some embodiments, the first portion and the second portion of the insulative overmold 708a may be overmolded when the intermediate portions of the first type of conductive elements 704a are straight. The intermediate portions may subsequently be bent into a 90° angle, creating the positioning of the second portion of the overmold as shown in FIG. 7B. The intermediate portions may be bent to a 90° angle to configure tails 710 to be mounted to printed circuit board 508.

The insulative portion may be molded to include features that provide desirable electric and/or mechanical properties. One such feature is a channel near the mating contact portions. This channel may be molded to expose intermediate portions of the conductive elements 704a and 704b via an elongated recess. In the illustrated embodiment, exposing the conductive elements 704 a and 704b allows connections between selected ones of the conductive elements 704a and 704b to be made. In the example illustrated, certain ones of the conductive elements 704a and 704b are designated as ground conductors. Specifically, the conductive elements 704a and 704b may be arranged in a pattern, over all or a portion of the row, in which adjacent pairs of conductive elements 704a and 704b designated as signal conductors are separated by conductive elements 704a and 704b designated as ground conductors. The channels may be molded to expose the ground conductors and one or more members may be inserted into the channel to electrically connect the ground conductors, while leaving the signal conductors electrically insulated from the inserted members.

In the illustrated embodiment, a shorting bar 702 is inserted into the channel. The shorting bar 702 is made of a metal strip, extending in the row direction. The metal strip may have features designed to couple to the ground conductors such as by pressing against the ground conductors or being sufficiently close to the ground conductors to provide capacitive coupling to the ground conductors. In the illustrated embodiment, the shorting bar 702 is partially enclosed in a lossy material, here formed with conductive plastic (as described below). However, it should be appreciated that what is inserted into the channel could be either a metal strip alone or a strip of lossy material alone, in other embodiments.

In the illustrative embodiment of FIG. 7A, a shorting bar subassembly comprises a single shorting bar 702 arranged across the ground conductors of the terminal subassembly 502a illustrated in FIG. 7A. However, shorting bars subassemblies may be provided having alterative arrangements. For example, a shorting bar subassembly may comprises a plurality (for example, two or more) of shorting bars that, in totality, are arranged across each of the ground conductors of a single terminal subassembly.

FIGS. 7A and 7B illustrates that cables 712 may be terminated to a second type of the conductive elements 704b. Such cables 712 are shown in FIG. 7. The cables 712 are twinax cables, each with two wires (though other number of wires are also possible), each of which is terminated to one of a pair of signal conductors. The terminations are not visible in FIG. 7A because they are covered by a ground shield 706, which has concave sections partially surrounding the terminations. That ground shield 706 also has flat portions, which may be welded or otherwise attached to the ground conductors on either side of the pairs of signal conductors.

FIG. 7B, showing the lower side of the terminal subassembly 502a, reveals that the tails of the ground conductors are both connected together and include tabs that may wrap around the cables 712. Each of the twinax cables 712 may include a shield wrapped around an insulated pair of wires. At the cable 712 termination, that cable shield may be exposed. The tabs of the ground conductors when wrapped around the cable 712 may make electrical contact to the shield of the cables 712. In this example, the twinax cables 712 are drainless cables such that connection is made to the wrapped shield. However, it should be appreciated that other techniques may be used for making a connection between the ground conductors in the terminal subassembly 502a and the shields of the cables 712, including tabs or other structures on the common ground shield 706 shown in FIG. 7A.

FIGS. 7A and 7B also illustrate a second overmolding, forming a strain relief overmold 708b. The strain relief overmold 708b is formed around the cables 712 extending from the rear of the terminal subassembly 502a. The strain relief overmold 708b may be formed of the same type of material as the insulative overmold 708a of the terminal subassembly 502a. However, different materials may be used. For example, the insulative material of the lead frame overmold 708a may be selected to have a suitable dielectric constant, such as greater than 3, while the material for the strain relief overmold 708b may be selected for mechanical properties, such as flexibility and/or durability.

In the illustrated embodiment, the strain relief overmold 708b is molded after the insulative overmold 708a around the conductive elements 704a and 704b. As shown in FIG. 7B, the first formed insulative overmold 708a may have projections around which the strain relief overmold 708b is overmolded, such that both overmolds are held together once formed. The strain relief overmold 708b may be molded after the intermediate portions of the first type of conductive elements 704a are bent at a 90° angle. Accordingly, both overmolds have shapes, including features as illustrated in the figures, that may be readily formed via a molding operation.

Figure 8A:
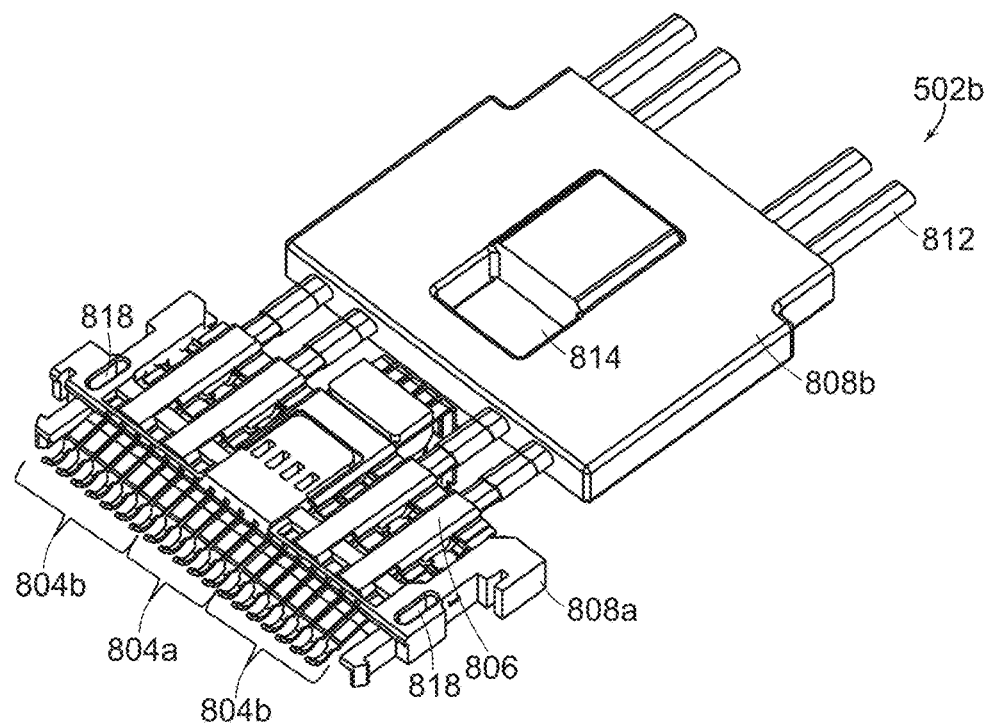
FIGS. 8A and 8B are top and bottom views, respectively, of an upper inner terminal subassembly, providing a row of contact portions of conductive elements within the connector, such as might be used in the manufacture of the receptacle connector of FIG. 5A.
Figure 8B:
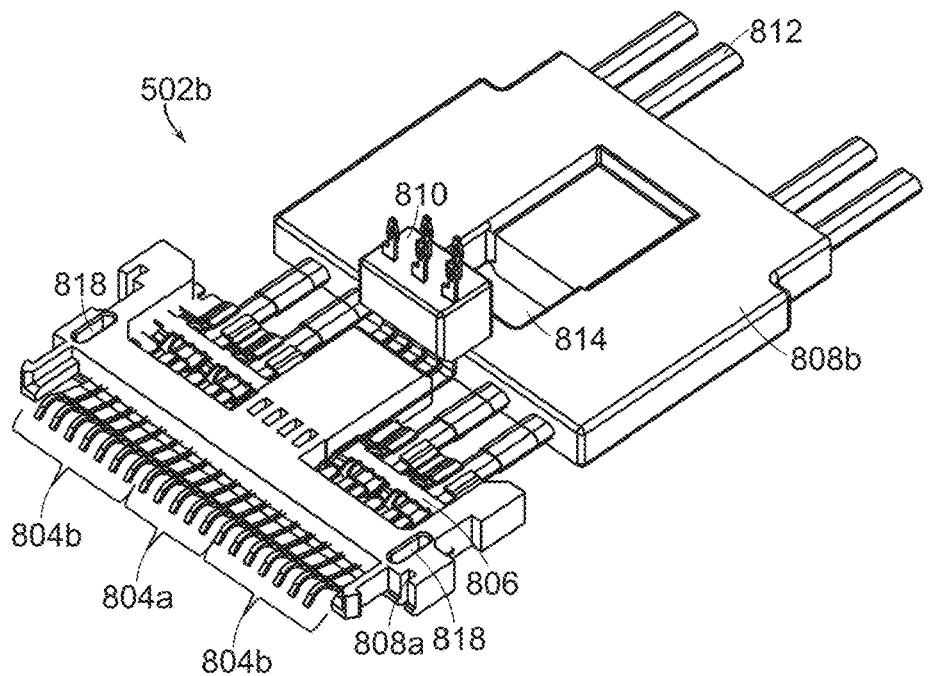
Figure 9A:
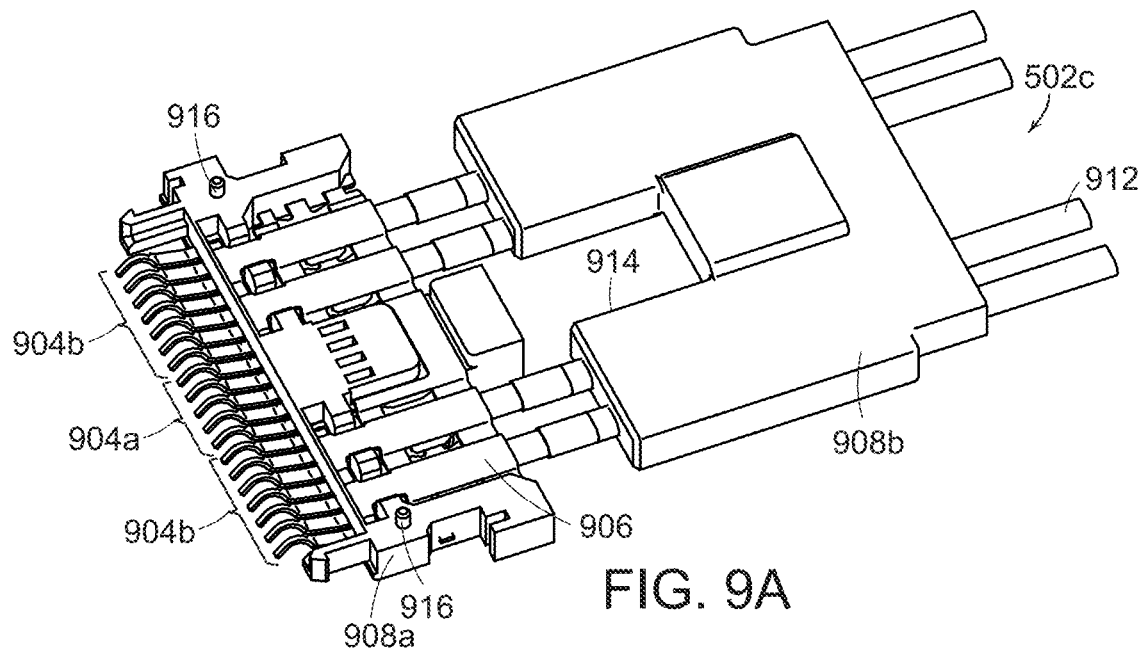
FIGS. 9A and 9B are top and bottom views, respectively, of a lower inner terminal subassembly, providing a row of contact portions of conductive elements within the connector, such as might be used in the manufacture of the receptacle connector of FIG. 5A.
Figure 9B:
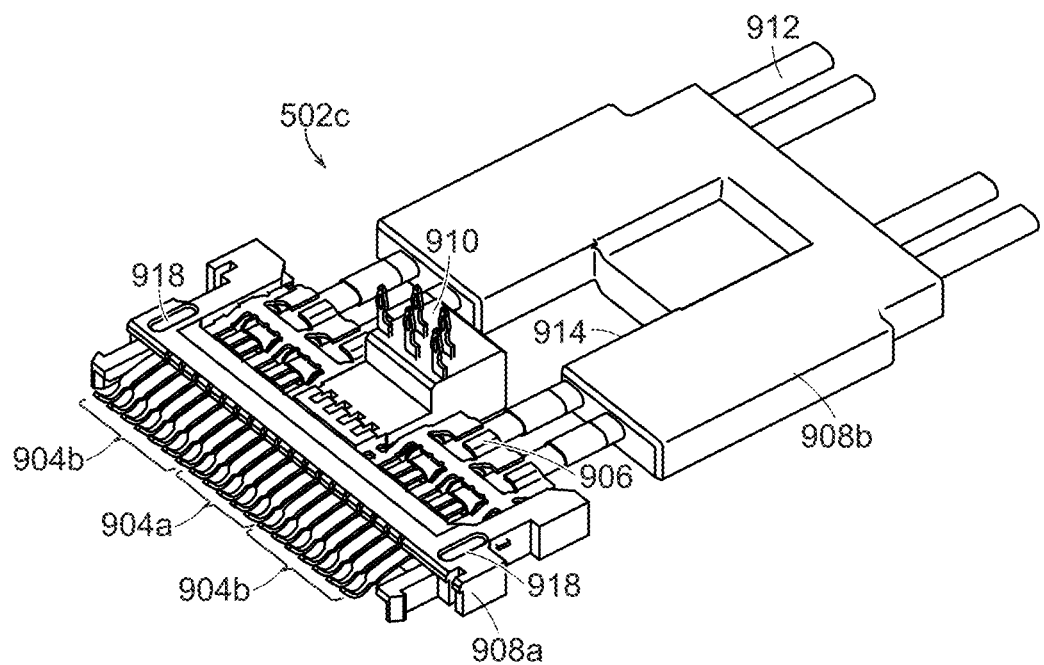
Figure 10B:
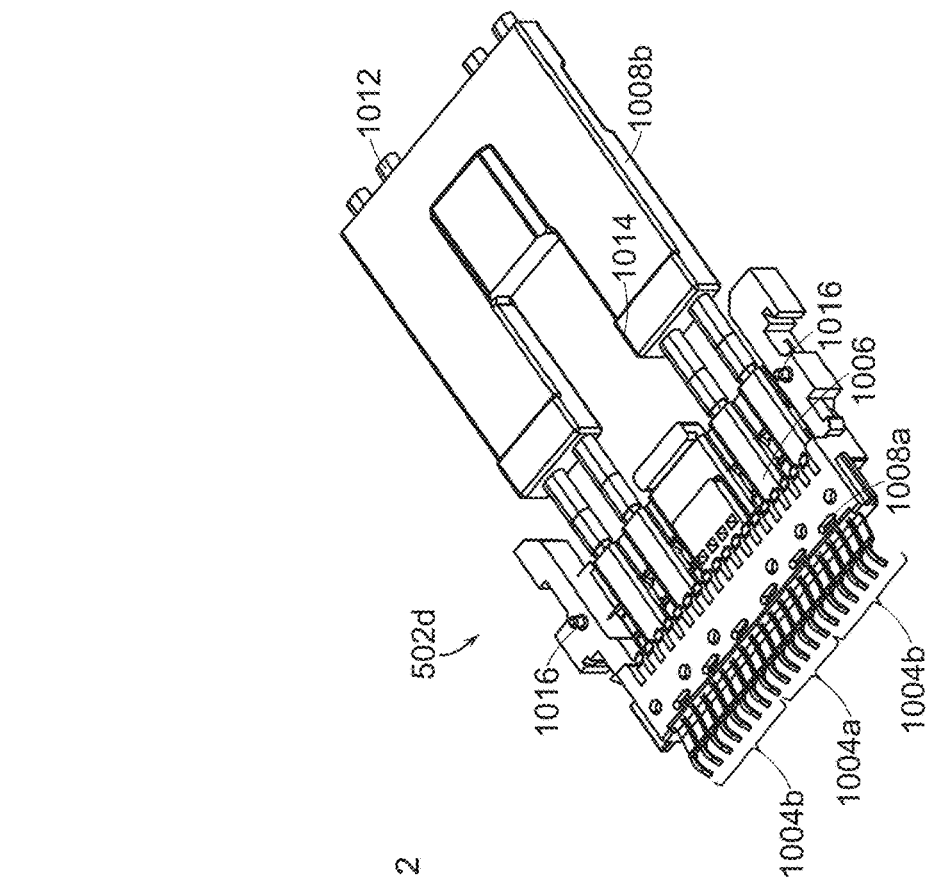
FIGS. 10A and 10B are top and bottom views, respectively, of a lower outer terminal subassembly, providing a row of contact portions of conductive elements within the connector, such as might be used in the manufacture of the receptacle connector of FIG. 5A.
Figure 10A:
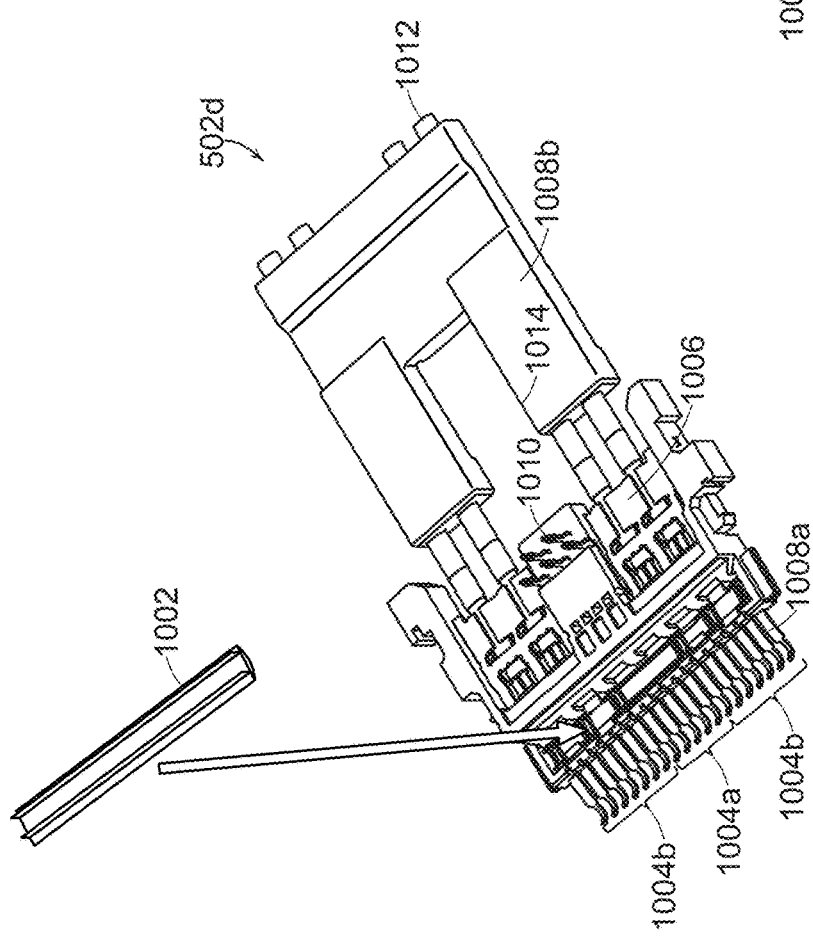

The midboard ends of the cables 712 are not visible in FIGS. 7A and 7B, nor are the midboard ends of the cables 812 visible in FIGS. 8A and 8B, nor are the midboard ends of the cables 912 visible in FIGS. 9A and 9B, nor are the midboard ends of the cables 1012 visible in FIGS. 10A and 10B. In some embodiments, a plug connector may be attached to the midboard end of the cables 712, 812, 912 or 1012. The plug may be configured to mate with a low-profile connector installed at the midboard. That plug connector may be attached at any suitable time, including before the cables 712, 812, 912, or 1012 are terminated to the terminal subassemblies 502a, 502b, 502c, or 502d, after the cables 712, 812, 912, or 1012 are terminated to the terminal subassemblies 502a, 502b, 502c, or 502d and before the terminal subassemblies 502a, 502b, 502c, or 502d are stacked into a receptacle connector 500 or after the receptacle connector 500 is formed.

FIG. 8A illustrates a top perspective view of and FIG. 8B illustrates a bottom perspective view of terminal subassembly 502b. FIG. 9A illustrates a top perspective view of and FIG. 9B illustrates a bottom perspective view of terminal subassembly 502c. FIG. 10A illustrates a bottom perspective view of and FIG. 10B illustrates a top perspective view of terminal subassembly 502d. FIGS. 8A, 8B, 9A, 9B, 10A, and 10B illustrate additional terminal subassemblies 502b, 502c, and 502d, each holding first types of conductive elements 804a, 904a, and 1004a and second types of conductive elements 804b, 904b, and 1004b with contact portions in a row. Each of the second types of conductive elements 804b, 904b, and 1004b may be configured with tails 810, 910, or 1010 for attachment to printed circuit board 508.

Figure 15A:
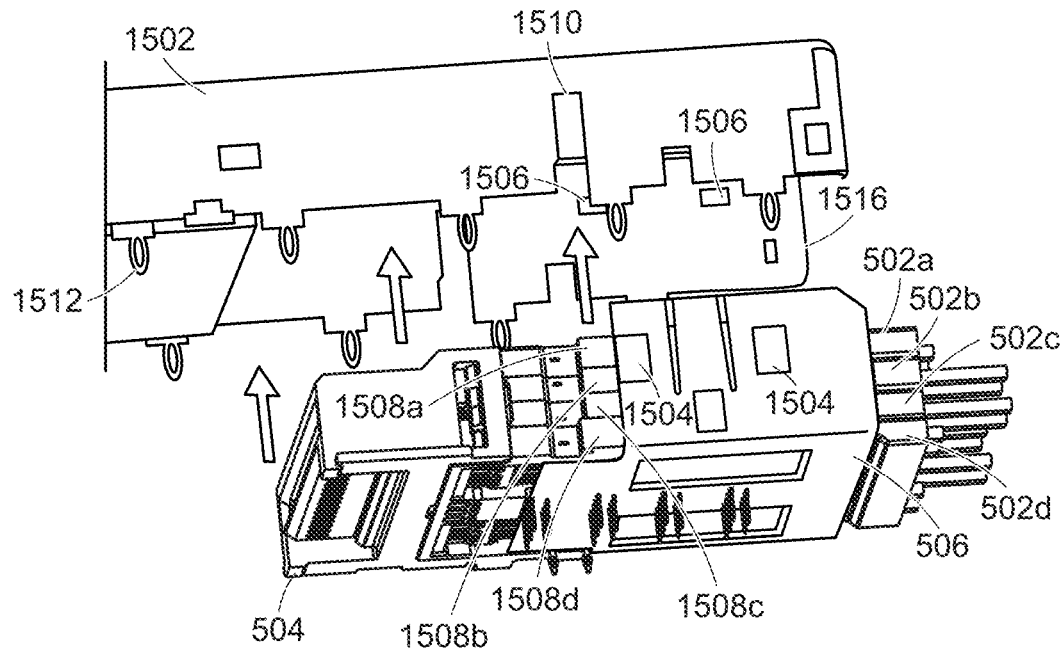
FIGS. 15A and 15B illustrate a step of inserting the receptacle connector, as shown in FIG. 14B into a cage and attaching the terminal subassemblies directly to the cage
Figure 15B:
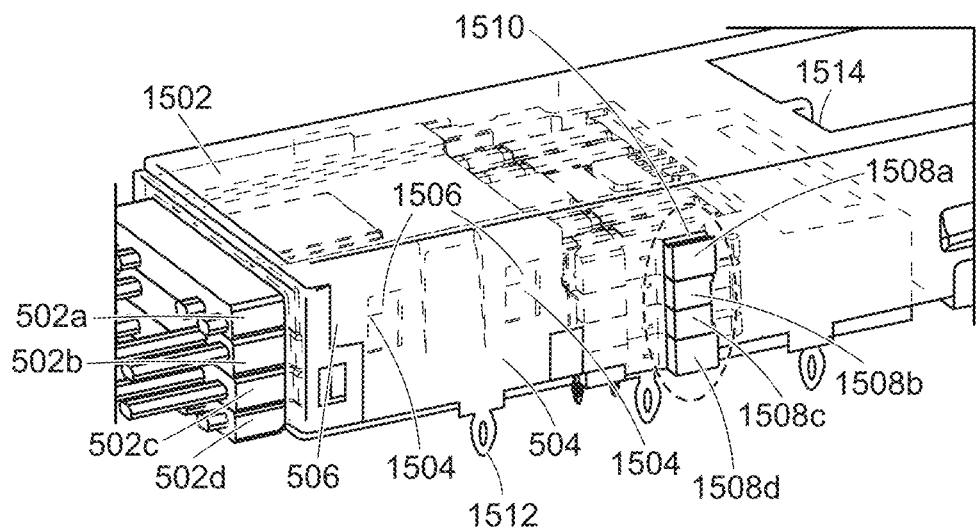

As shown in FIGS. 15A and 15B, terminal subassembly 502a is configured to be arranged adjacent terminal subassembly 502b, at the top of the terminal subassembly stack, and at the top of the channel formed by the cage. Terminal subassembly 502b is configured to be arranged between terminal subassemblies 502a and 502c, towards the top of the terminal subassembly stack, and towards the top of the channel formed by the cage. Terminal subassembly 502c is configured to be arranged between terminal subassemblies 502b and 502d, towards the bottom of the terminal subassembly stack, and towards the bottom of the channel formed by the cage. Terminal subassembly 502d is configured to be arranged between terminal subassembly 502c and printed circuit board 508, at the bottom of the terminal subassembly stack, and at the bottom of the channel formed by the cage.

The shape and relative position of the contact portions may vary from subassembly to subassembly, as different subassemblies provide an inner or an outer row of contact portions and a row at the top or bottom of the slot. Each of the terminal subassemblies may be formed using the same constructions techniques, with a set of conductive elements stamped from a sheet of metal and then overmolded with one or more housing portions 808a, 908a, and 1008a and/or stress relief portions 808b, 908b, and 1008b. A shield such as ground shields 806, 906 or 1006 may be attached, and may be electrically connected to other grounded structures in the subassembly. A shorting bar, such as shorting bar 1002, with or without lossy material may be connected, such as via laser welding, to some or all of the ground conductors in the subassembly. The shape of the additional terminal subassemblies, however, may be adapted based on the position of the terminal subassembly within the stack of subassemblies.

In the illustrative embodiment of FIG. 10A, a shorting bar subassembly comprises a single shorting bar 1002 arranged across the ground conductors of the terminal subassembly 502d illustrated in FIG. 10A

Figure 11C:
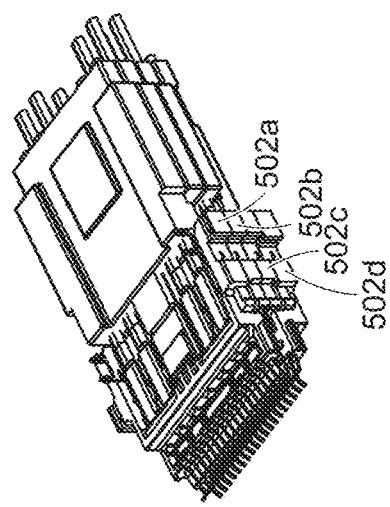
FIGS. 11A, 11B, and 11C are a series of figures showing steps of aligning and engaging the terminal subassemblies of FIGS. 7A and 7B, FIGS. 8A and 8B, FIGS. 9A and 9B, and FIGS. 10A and 10B during manufacture of a receptacle connector.
Figure 11B:
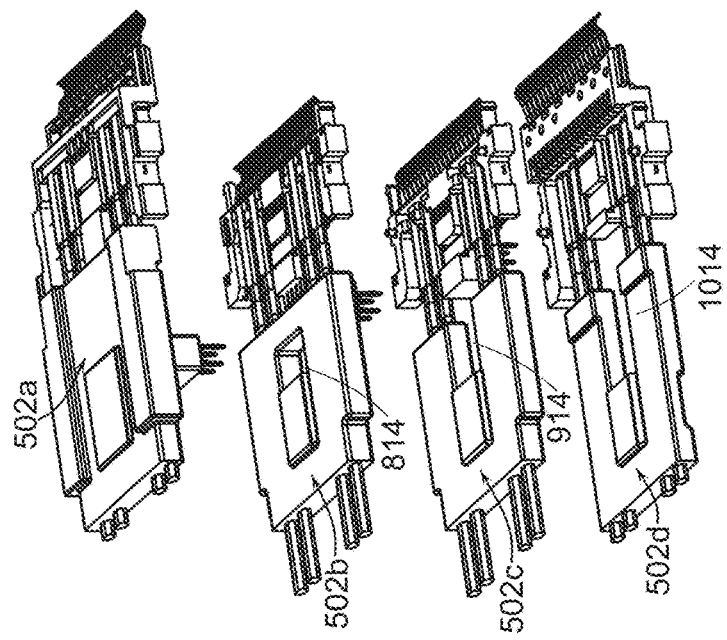
Figure 11A:
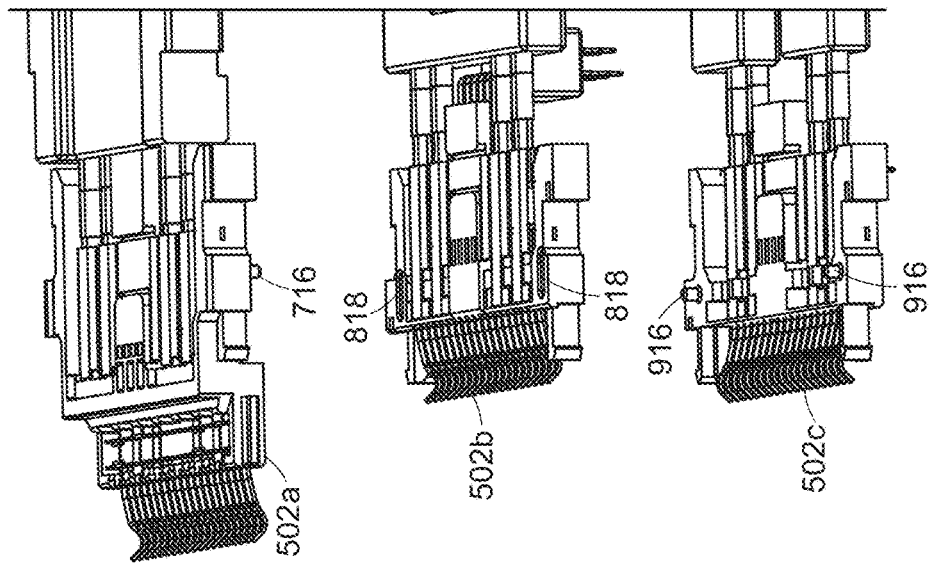

Additionally, the position of the tails of the first type of the conductive elements 704a, 804a, 904a, and 1004a varies from subassembly to subassembly. This variation enables the terminal subassemblies 502a, 502b, 502c, and 502d to be stacked in a nested fashion, such as is illustrated in FIGS. 11A, 11B, and 11C. FIG. 11A shows a exploded detail view of stacking features of terminal subassemblies 502a, 502b, and 502c. FIG. 11B shows an exploded view of a stacking arrangement of terminal subassemblies 502a, 502b, and 502c. FIG. 11C shows an assembled stacked arrangement of terminal subassemblies 502a, 502b, and 502c. Other features to support stacking, are illustrated in the figures. For example, each terminal subassembly may include at least one alignment member at a top or bottom surface, such as dowels, for example, dowels 716, 816, 916, or 1016, in one subassembly that engage holes, for example, holes 818 or 918, in another subassembly. The alignment members may be positioned at a top or bottom surface of a terminal subassembly. Terminal subassemblies stacked between two other terminal subassemblies, such as terminal subassemblies 502b or 502c, may include alignment members at both top and bottom surfaces while terminal subassemblies stacked adjacent only a single other terminal subassembly, such as terminal subassemblies 502a or 502d, may include alignment members at only one of the top or bottom surface.

An additional feature of the terminal subassemblies 502a, 502b, 502c, and 502d configured to support nesting and stacking of the terminal subassemblies 502a, 502b, 502c, and 502d may include at least one opening formed in an insulative overmold 708a, 808a, 908a, or 1008a or formed in a strain relief overmold 708b, 808b, 908b, or 1008b. For example, strain relief overmold 808b includes an opening 814 aligned with and configured to receive the second portion of the insulative overmold 708a and tails 710. Strain relief overmold 908b includes an opening 914 (larger than opening 814 in some embodiments) aligned with and configured to receive the second portion of the insulative overmold 708a and tails 710 as well as the second portion of the insulative overmold 808a and tails 810. Strain relief overmold 1008b includes an opening 1014 (larger than opening 914 in some embodiments) aligned with and configured to receive the second portion of the insulative overmold 708a and tails 710 as well as the second portion of the insulative overmold 808a and tails 810 and also the second portion of the insulative overmold 908a and tails 910. In this manner, the terminal subassemblies 502a, 502b, 502c, and 502d may be stacked in a nested fashion. This configuration configures each of the tails 710, 810, 910, and 1010 to be mounted to printed circuit board 508 even when the terminal subassemblies 502a, 502b, 502c, and 502d are arranged in a stacked configuration.

As shown in FIGS. 11A-11B, second portions of insulative overmolds and tails of terminal subassemblies arranged lower in the stack may be arranged more proximate the slot 1202 of housing 504, along the plugging direction of a transceiver. For example, second portion of the insulative overmold 1008a and tails 1010 are arranged most proximate the slot 1202, while second portion of the insulative overmold 908a and tails 910 are arranged second most proximate the slot 1202, the second portion of the insulative overmold 808a and tails 810 are arranged third most proximate the slot 1202, and finally, second portion of the insulative overmold 708a and tails 710 are arranged least proximate the slot 1202.

Figure 12A:
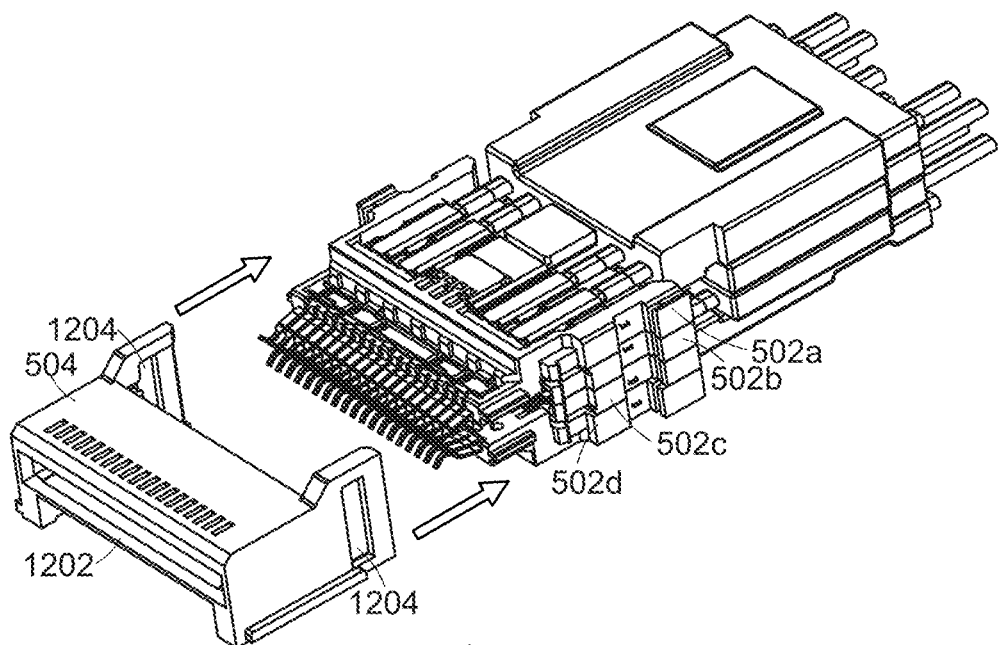
FIGS. 12A and 12B illustrate a subsequent step in the manufacture of the receptacle connector in which the contact portion of the conductive elements in the terminal subassemblies as shown in FIG. 11C are inserted into a housing so as to line two walls of the slot for engagement to a paddle card, as illustrated in FIGS. 4A and 4B, when the paddle card is inserted in that slot.
Figure 12B:
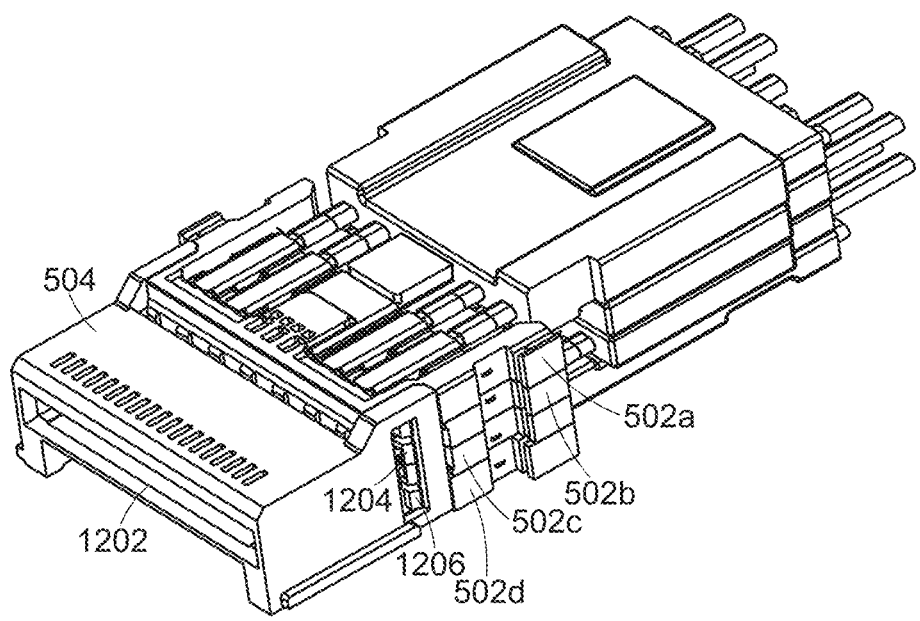

FIG. 12A shows an exploded view of a stack of the terminal subassemblies 502a, 502b, 502c, and 502d and a housing 504. FIG. 12B shows the stack of the terminal subassemblies 502a, 502b, 502c, and 502d assembled with the housing 504. FIGS. 12A and 12B illustrate that the contact portions of the terminal subassemblies 502a, 502b, 502c, and 502d may be inserted into a housing 504 having a slot 1202 so as to align the upper and lower walls of a slot. The housing 504 may comprise at least one retention member 1204, such as an opening formed in housing 504, configured to engaged with at least one retention member 1206 of the terminal subassemblies 502a, 502b, 502c, and 502d, such as a projection from terminal subassemblies 502a, 502b, 502c, and 502d configured to be inserted into such an opening.

Figure 13C:
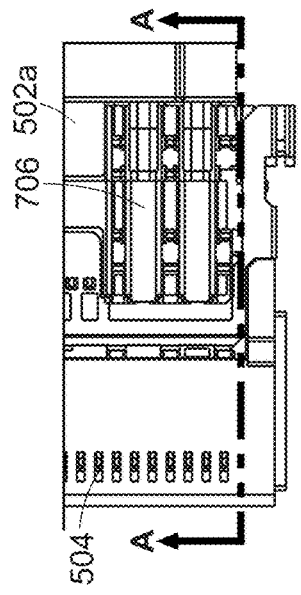
FIGS. 13A, 13B, 13C, and 13D illustrate a step of attaching ground clips to the terminal subassemblies as shown in FIG. 12B, so as to electrically connect the ground conductors in the terminal subassemblies to each other and to provide for a connection to grounding structures within the printed circuit board to which the receptacle connector is attached.
Figure 13D:
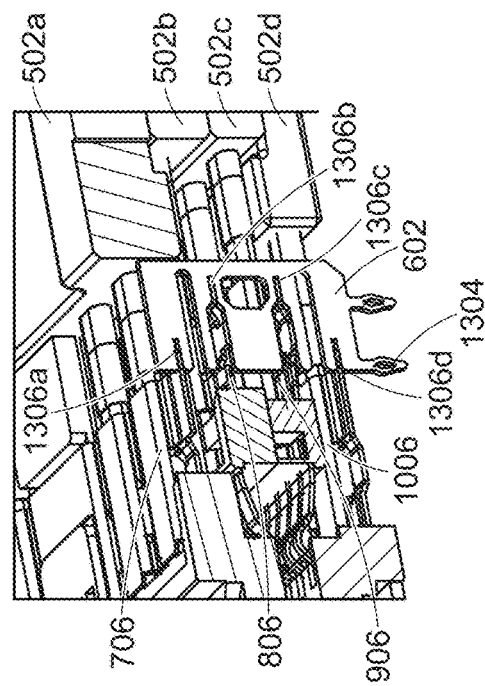
Figure 13B:
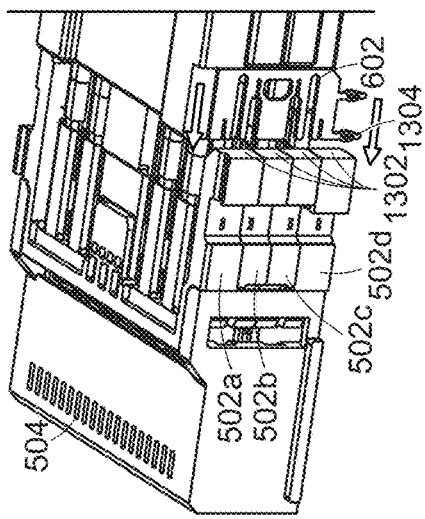
Figure 13A:
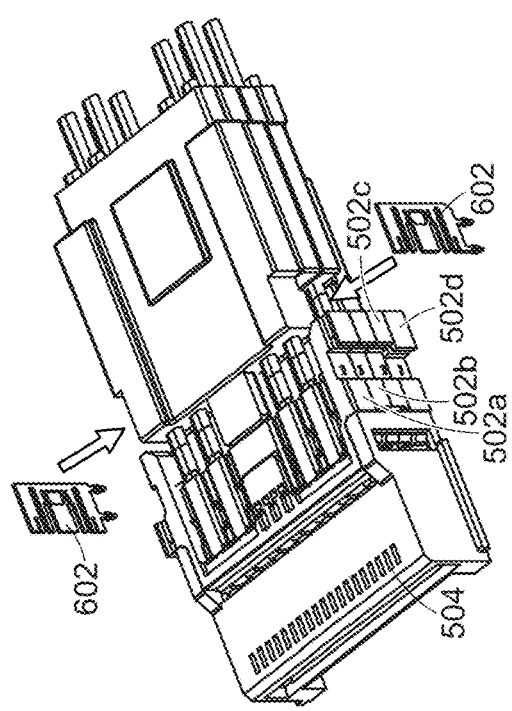

FIG. 13A shows an exploded view of ground clips 602 and a stack of the terminal subassemblies 502a, 502b, 502c, and 502d. FIG. 13B shows a detail view of a step of assembling ground clips 602 with the stack of the terminal subassemblies 502a, 502b, 502c, and 502d. FIG. 13C shows a top view of the of ground clips 602 assembled with the stack of the terminal subassemblies 502a, 502b, 502c, and 502d. FIG. 13D shows a cutaway view of the of ground clips 602 assembled with the stack of the terminal subassemblies 502a, 502b, 502c, and 502d.

FIGS. 13A 13B, 13C, and 13D illustrates attaching a member to provide a common ground for ground terminals of the terminal subassemblies 502a, 502b, 502c, and 502d. In the illustrative embodiment, a ground member comprises a ground clip 602, which connects together ground conductors in all of the terminal subassemblies 502a, 502b, 502c, and 502d. The ground clips 602 may be configured to electrically couple each of the terminal subassemblies 502a, 502b, 502c, and 502d together and to ground each of the terminal subassemblies 502a, 502b, 502c, and 502d to a printed circuit board 508.

In the illustrative embodiments of FIGS. 13A, 13B, 13C, and 13D, there are two ground clips 602, one on each end of the rows of conductive elements 704a, 704b, 804a, 804b, 904a, 904b, 1004a, and 1004b within each terminal subassembly 502a, 502b, 502c, and 502d. In this manner, the ground clips 602 may provide a first conductive member and a second conductive member adjacent the terminal subassemblies 502a, 502b, 502c, and 502d. However, the technology of present disclosure is not limited by the number of group clips used, and various configurations may include more than two ground clips, for example, three, four, or more than four ground clips.

In embodiments where two or more ground clips 602 are employed, the ground clips may be electrically coupled together. In some embodiments, a plurality of ground clips 602 may be electrically coupled to each other via internal electrical conductors of one or more terminal subassemblies 502a, 502b, 502c, or 502d, such as a ground shield 706, 806, 906, or 1006. In such embodiments each ground clip 602 may be, coupled to a ground conductor of each terminal subassembly 502a, 502b, 502c, and 502d.

Ground clip 602 is illustrated with a plurality of slots 1306a, 1306b, 1306c, and 1306d into which a ground conductor of a respective terminal subassembly 502a, 502b, 502c, and 502d may be pressed so as to make electrical connection. For example, slot 1306a of the ground clip 602 may be configured to couple to ground shield 706 of terminal subassembly 502a, slot 1306b of the ground clip 602 may be configured to couple to ground shield 806 of terminal subassembly 502b, slot 1306c of the ground clip 602 may be configured to couple to ground shield 906 of terminal subassembly 502c, and slot 1306d of the ground clip 602 may be configured to couple to ground shield 1006 of terminal subassembly 502d.

Alternatively or additionally, the ground clip 602 may be electrically coupled to each other via conductors of a printed circuit board 508 or other conductors external to the terminal subassemblies 502a, 502b, 502c, and 502d. To support connections to a ground structure in a printed circuit board 508, each ground clip 602 may include at least one tail 1304. The tail 1304 may be configured to connected to a corresponding conductive element of a printed circuit board 508 in order to couple the terminal subassemblies 502a, 502b, 502c, and 502d to the conductive element of the printed circuit board 508.

Tails 1304 of ground clip 602 may comprise pressfit tails. In embodiments in which tails 1304 of ground clip 602 comprise pressfit tails, a pressfit tail of the ground clip 602 may be inserted into a corresponding conductive hole of a printed circuit board 508 in order to couple the terminal subassemblies 502a, 502b, 502c, and 502d to the conductive hole of the printed circuit board 508. While FIGS. 13A, 13B, 13C, and 13D illustrate the tails 1304 of ground clips 602 as pressfit tails, other configurations are possible. For example tails 1304 of ground clip 602 may be configured to be coupled to a printed circuit board 508 via soldering and other methods.

In embodiments that include a ground clip 602 with tails 1304 for making ground connections to a printed circuit board 508, ground tails of ground clip 602 may be the sole ground tails extending from the terminal subassemblies 502a, 502b, 502c, and 502d. In other embodiments, the terminal subassemblies 502a, 502b, 502c, and 502d may include other ground tails than ground tails of ground clips 602. For example, some of the conductive elements 704a, 704b, 804a, 804b, 904a, 904b, 1004a, (in some embodiments, some of the first types of the conductive elements 704a, 804a, 904a, and 1004a) designated as ground conductors in a row may have intermediate portions bent at 90 degrees, with tails extending from the terminal subassemblies 502a, 502b, 502c, and 502d so as to provide additional ground tails, for example, at least some of tails 710, 810, 910, or 1010.

Electrical coupling between the terminal subassemblies 502a, 502b, 502c, and 502d and ground clips 602 may result from mechanical coupling of the terminal subassemblies 502a, 502b, 502c, and 502d. As shown in FIG. 13B, a ground clip 602 may fit within features 1302 of each of the terminal subassemblies 502a, 502b, 502c, and 502d. In the illustrative embodiment of FIG. 13B, the features 1302 are openings of the housing of the terminal subassemblies 502a, 502b, 502c, and 502d into which the ground clips 602 are inserted. The openings of the terminal subassemblies 502a, 502b, 502c, and 502d may expose the respective ground conductors (such as ground shields 706, 806, 906, or 1006), or conductive members coupled to the ground conductors, of each of the terminal subassemblies 502a, 502b, 502c, and 502d. The clips 602, for example, may be coupled to the ends of the shields.

The ground clip 602 may be configured to slide into the feature 1302 in an insertion direction perpendicular to a stacking direction of the terminal subassemblies 502a, 502b, 502c, and 502d. This insertion direction of the ground clip 602 may provide additional mechanical coupling of the stack of terminal subassemblies 502a, 502b, 502c, and 502d. The insertion direction may be antiparallel to a plugging direction of a transceiver configured to be inserted into the receptacle connector 500.

Figure 14B:
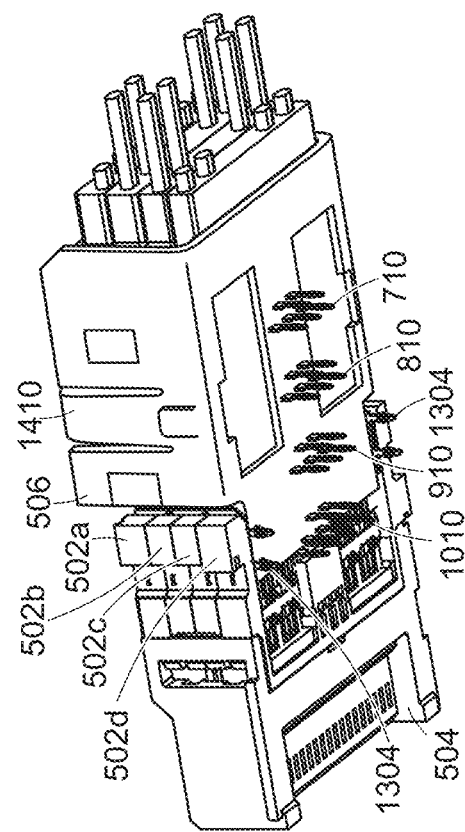
FIGS. 14A and 14B illustrate a step of attaching an insulative organizer to the terminal subassemblies as shown in FIG. 13D, so as to provide mechanical support to the pressfit contact tails of a first type of conductive element within the receptacle connector and to mechanically support the terminal subassemblies.
Figure 14A:
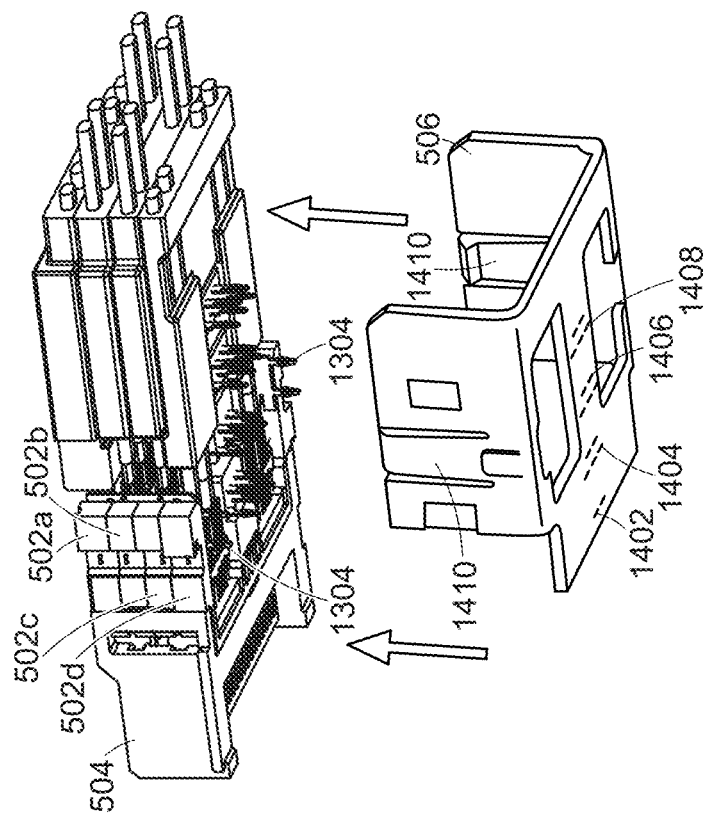

FIG. 14A shows a step of assembling organizer 506 with the stack of the terminal subassemblies 502a, 502b, 502c, and 502d. FIG. 14B shows the organizer 506 assembled with the stack of the terminal subassemblies 502a, 502b, 502c, and 502d. FIGS. 14A and 14B show attaching an organizer 506 to the terminal subassemblies 502a, 502b, 502c, and 502d. In the illustrated embodiment, the organizer 506 is an insulative component, such as molded plastic. The floor of the organizer has slots 1402, 1404, 1406, and 1408 configured to receive the contact tails 710, 810, 910, and 1010 of the first type of conductive elements 704a, 804a, 904a, and 1004a. For example, tails 710 may be engaged with slots 1408, tails 810 may be engaged with slots 1406, tails 910 may be engaged with slots 1404, and tails 1010 may be engaged with slots 1402. The organizer 506 provides mechanical support to the contact tails 710, 810, 910, and 1010, which reduces the risk of damage upon insertion of those contact tails 710, 810, 910, and 1010 into holes in a printed circuit board 508 for making electrical connections between the receptacle connector 500 and signal traces within the printed circuit board 508.

Additionally, the organizer 506 has walls, extending perpendicularly to the floor, on either side of the stack of terminal subassemblies 502a, 502b, 502c, and 502d. The walls of the organizer 506 may be formed having attachment features 1410 configured to attach the organizer 506 to the stack of terminal subassemblies 502a, 502b, 502c, and 502d. In some embodiments, the attachment features 1410 comprise spring fingers formed from the insulative component. Such spring fingers may deflect away from the stack of terminal subassemblies 502a, 502b, 502c, and 502d when the organizer is engaged with the stack of terminal subassemblies. The spring fingers may then return to an undeflected position after engagement with the stack of terminal subassemblies 502a, 502b, 502c, and 502d and include angled surfaces which prevent removal of the organizer.

FIG. 15A shows a step of assembling cage 1502 with the stack of the terminal subassemblies 502a, 502b, 502c, and 502d. FIG. 15B shows the cage 1502 assembled with the stack of the terminal subassemblies 502a, 502b, 502c, and 502d. In FIG. 15B, the cage 1502 is illustrated as partially translucent to illustrate the exterior and the interior of the cage 1502. As shown in FIGS. 15A and 15B, the walls may be shaped with attachment features 1504, which attach the organizer 506 to attachment features 1506 of a cage 1502. Because of the generally U-shape of the organizer 506 (though different shapes are also possible), attaching the walls of the organizer 506 to the cage 1502 enables the floor of the organizer 506 to also support the terminal subassemblies 502a, 502b, 502c, and 502d within the cage 1502.

The organizer 506 may additionally prevent removal of the ground clips 602, for example, along a direction antiparallel to the insertion direction of the ground clips 602. The organizer 506 may prevent the removal of the ground clips 602 by physical interference. For example, the organizer may prevent the ground clips 602 from being removed from the stack of terminal subassemblies 502a, 502b, 502c, and 502d by physically blocking any removal of the ground clips 602.

As discussed above, techniques described herein may improve signal integrity by reducing the tolerance between mating contact portions of conductive elements within a receptacle connector and mating contact portions of conductive elements within a plug connector configured to be inserted into the receptacle connector. Techniques for reducing tolerance may enable mating contact portions of connectors to reliably function with reduced wipe during mating, which in turn, may reduce the length of stubs in the mating interface of mated connectors, which may improve signal integrity.

For example, terminal subassemblies may engage with a cage, where the cage is stamped by a die and therefore has low variation in dimensions. By engaging the terminal subassemblies directly to features of the cage, contact portions of the terminal subassemblies may be positioned with low variability. The position of a plug mated with the receptacle connector may also be established by engaging the plug with features on the cage, leading to less variability from connector to connector.

By reducing variability of the relative position of connectors, the plug configured for mating with the receptacle connector may be designed with shorter pads, in turn reducing stub lengths. By reducing stub lengths, resonances may occur at frequencies that do not interfere with operation of the connector, even at relatively high frequencies, such as up to at least 25 GHz, up to at least 56 GHz or up to at least 112 GHz, up to at least 200 GHz, or greater, according to some embodiments.

FIGS. 15A and 15B illustrate the receptacle connector 500 being inserted into the cage 1502. Cage 1502 may be formed from similar materials and according to similar techniques as cage 510. Cables 712, 812, 912, and 1012 may extend through rear opening 1516 of cage 1502. In some embodiments, cage 1502 includes a top opening 1514 configured such that a heat sink may extend through the opening 1514 into the cage 1502 to contact and/or cool a transceiver disposed in the cage 1502.

In the illustrated embodiment, the terminal subassemblies 502a, 502b, 502c, and 502d are positioned by engagement between features on the cage 1502 and features on the terminal subassemblies 502a, 502b, 502c, and 502d. Accordingly, the position of the terminal subassemblies 502a, 502b, 502c, and 502d may be established directly relative to cage 1502, which may be stamped by a die with low variation in dimensions. In this case, the terminal subassemblies 502a, 502b, 502c, and 502d are attached directly to the cage 1502 by an interference fit of projections 1508a, 1508b, 1508c, and 1508d of an insulative portion of respective terminal subassemblies 502a, 502b, 502c, and 502d that extend into slots 1510 in the cage 1502. In other embodiments, mechanisms other than the exemplary projections 1508a, 1508b, 1508c, and 1508d and slots 1510 may be used to engage the cage 1502 so as to position the terminal subassemblies 502a, 502b, 502c, and 502d. In the illustrated embodiment, the slots 1510 in the cage 1502 are perpendicular to the insertion direction such that engagement between the terminal subassemblies 502a, 502b, 502c, and 502d and cage 1502 fixes the position of the terminal subassemblies 502a, 502b, 502c, and 502d with respect to the insertion direction. The slots 1510 may be elongated perpendicular to the insertion direction.

As noted above, the position of a plug mated with the receptacle connector 500 may also be established with low variability by engaging the mating plug with features on the cage 1502. When both the stack of terminal subassemblies 502a, 502b, 502c, and 502d and a mating plug are positioned directly with respect to the cage 1502, there may be less variability from connector to connector, leading to shorter pads, in turn reducing stub lengths and increasing operating frequency.

As illustrated, the insulative portions of the overmold around the conductive elements 704a, 704b, 804a, 804b, 904a, 904b, 1004a, and 1004b are shaped with projections 1508a, 1508b, 1508c, and 1508d that engage with a feature of the cage 1502, holding the receptacle connector 500 in the cage 1502. Those projections 1508a, 1508b, 1508c, and 1508d, for example, may form an interference fit with a slot 1510 in the cage 1502. Additional mechanical support for the receptacle connector 500 may be provided by engaging features 1504 of the organizer 506 with complementary features 1506 of the cage 1502. For example, tabs of the organizer 506 may function as latches, engaging openings in that cage 1502. Conversely, tabs projecting from the walls of the cage 1502 may engage with the edges of openings or other surfaces molded into the organizer 506.

In the illustrated embodiment, the cage 1502 includes a channel into which a plug may be inserted for mating with the illustrated I/O connector. Positioning the terminal subassemblies 502a, 502b, 502c, and 502d with respect to the cage 1502 may position the contact portions of the conductive elements 704a, 704b, 804a, 804b, 904a, 904b, 1004a, and 1004b within the terminal subassemblies 502a, 502b, 502c, and 502d at a predetermined location within the channel for mating with pads on a plug connector. This positioning may be achieved with small variability from connector to connector as a result of the accurate positioning of the conductive elements 704a, 704b, 804a, 804b, 904a, 904b, 1004a, and 1004b within the terminal subassemblies 502a, 502b, 502c, and 502d and the engagement of the terminal subassemblies 502a, 502b, 502c and 502d with the cage 1502 to provide accurate positioning of the terminal subassemblies 502a, 502b, 502c, and 502d with respect to the cage 1502. As a result, a plug for mating with such a receptacle connector 500 may be designed to provide only a small amount of wipe, which improves high frequency performance of the connector system.

As shown in FIGS. 15A and 15B, the cage 1502 may have pressfit tails 1512 extending from a lower edge or other portion of the cage 1502 for insertion into corresponding holes in the printed circuit board 508. In some embodiments, the pressfits 1512 of the cage 1502 position the cage 1502 relative to the printed circuit board 508. The pressfits 1512 of the cage 1502 may be larger than pressfits (such as tails 710, 810, 910, or 1010) of the conductive elements 704a, 704b, 804a, 804b, 904a, 904b, 1004a, and 1004b ending from the receptacle connector 500 in some embodiments. The pressfits 1512 of the cage 1502 may provide substantially more retention force than pressfits (such as tails 710, 810, 910, or 1010) of the receptacle connector 500 such as a multiple of 1.5 or more greater retention force. Accordingly, securing the receptacle connector 500 to the cage 1502 may provide substantial robustness to the overall I/O connector assembly.

Additional robustness may be provided by engaging the strain relief overmolds 708b, 808b, 908b, and 1008b to that cage 1502 as well. As shown in FIGS. 15A and 15B, the strain relief overmolds 708b, 808b, 908b, and 1008b extend past the rear edge of the organizer 506. The strain relief overmolds 708b, 808b, 908b, and 1008b also extend through the rear wall of the cage 1502 at the rear opening 1516 of the cage 1502. In some embodiments, the strain relief overmolds 708b, 808b, 908b, and 1008b may be sized to make an interference fit when inserted into the cage 1502.

FIGS. 16A-26B illustrate an alternative embodiment of a receptacle connector 1600. In the illustrated embodiments of FIGS. 16A-26B, similar elements may be formed using materials and techniques as described above in connection with FIGS. 5A-15B.

Figure 16B:
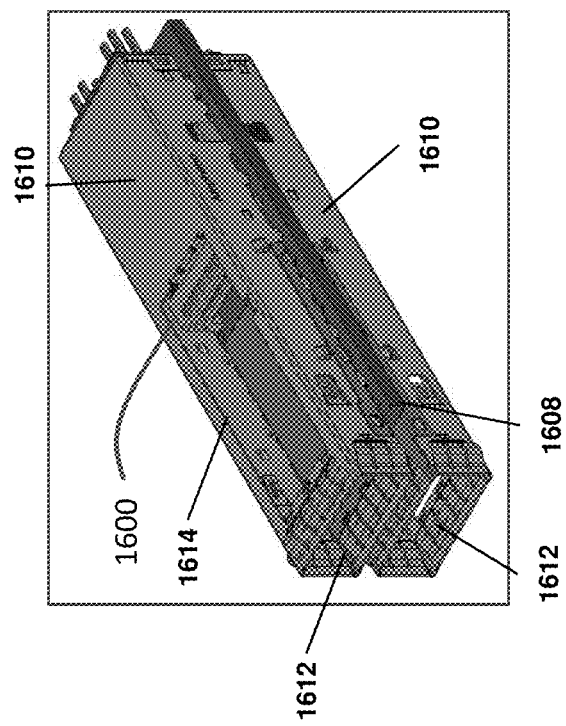
FIG. 16B is an isometric view of a cage such as might surround a receptacle connector in FIG. 16A, with a stack configuration.
Figure 16A:
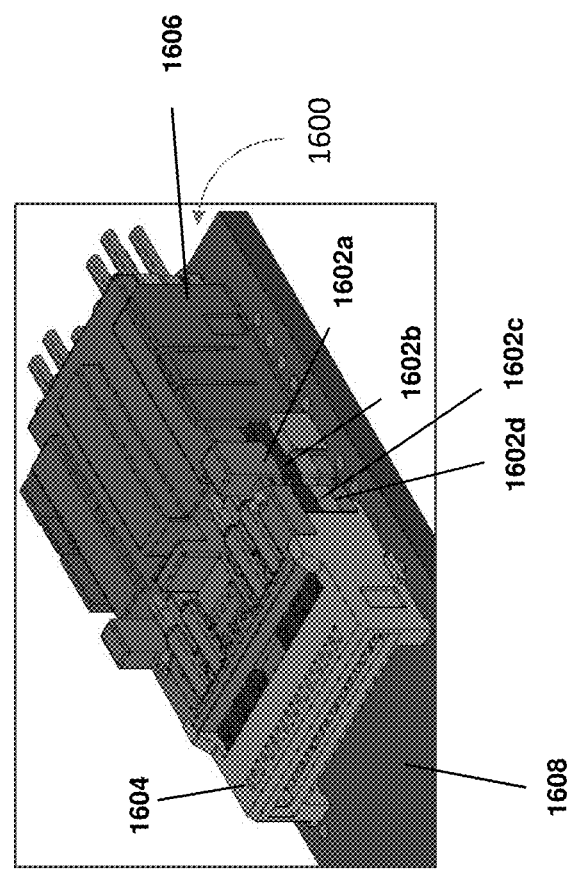
FIG. 16A is an isometric view of a receptacle connector configured for routing signals between a mating interface and both a printed circuit board and cables extending to the midboard of the printed circuit board.
Figure 17:
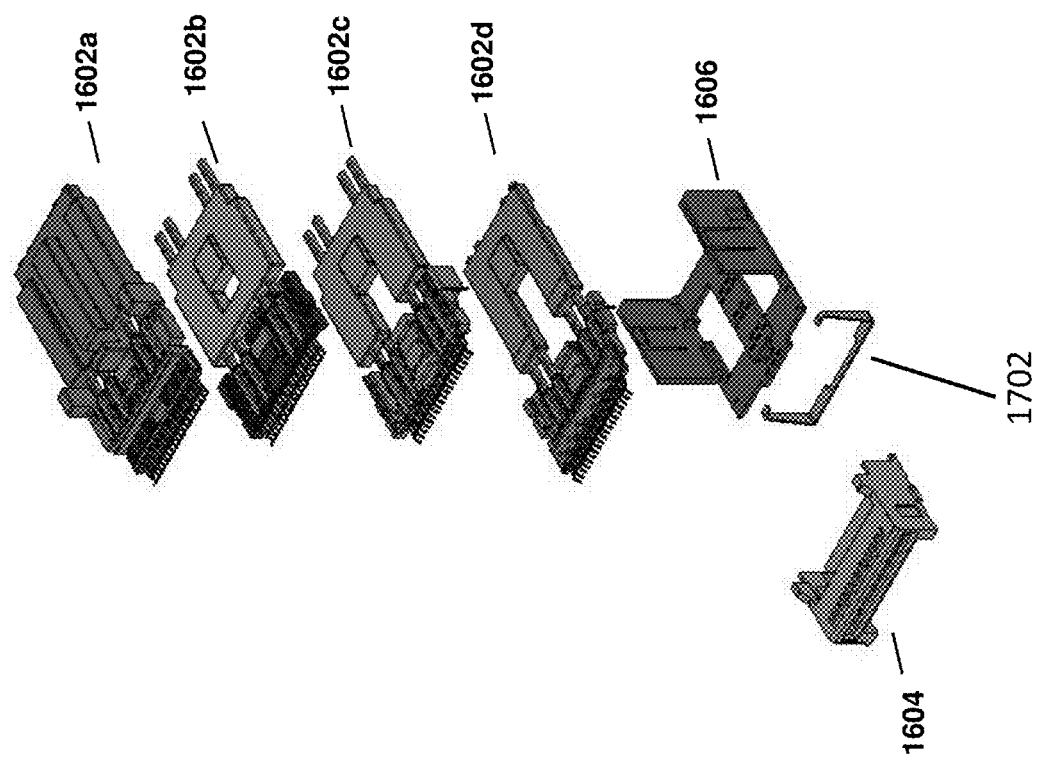
FIG. 17 is an exploded view of the receptacle connector of FIG. 16A.

FIG. 16A illustrates a receptacle connector 1600 configured for routing signals between a mating interface as well as both a printed circuit board 1608 and cables (for example, cables 1812, 1912, 2012, and 2112 described below) extending to the midboard of the printed circuit board 1608. FIG. 16B illustrates a cage 1610 such as might surround a receptacle connector 1600 in FIG. 16A, with a stack configuration. A channel may be formed by front opening 1612 in the cage 610, front opening 1612 being configured to receive a transceiver along a plugging direction. FIG. 17 illustrates the receptacle connector 1600 of FIG. 16A. The receptacle connector 1600 and cage 1610 of FIGS. 16A, 16B, and 17 differ from the receptacle connector 500 and cage 510 of FIGS. 5A, 5B, and 6 at least in that the receptacle connector 1600 and cage 1610 of FIGS. 16A 16B, and 17 are formed to accommodate a different arrangement of a ground member, ground staple 1702, and a different arrangement of pressfit tails of the terminal subassemblies 1602a, 1602b, 1602c, and 1602d. Cage 1610 may include a top opening 1614 configured such that a heat sink may extend through the opening 1614 into the cage 1610 to contact and/or cool a transceiver disposed in the cage 1610.

Figure 18B:
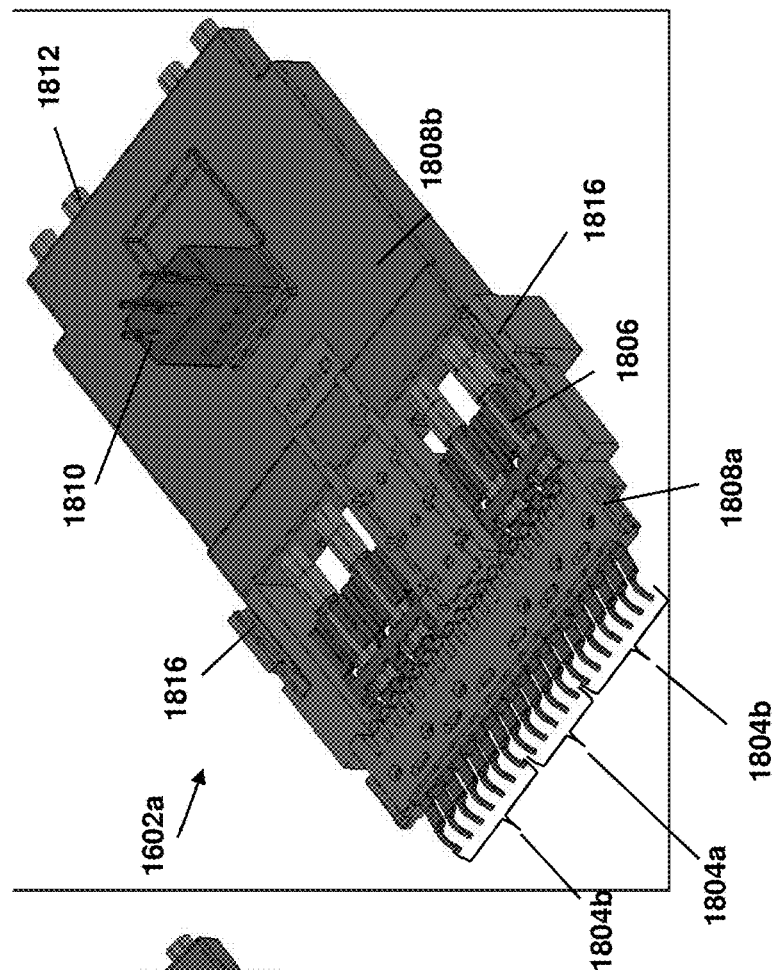
FIGS. 18A and 18B are top and bottom views, respectively, of an upper outer terminal subassembly, providing a row of contact portions of conductive elements within the connector, such as might be used in the manufacture of the receptacle connector of FIG. 16A.
Figure 18A:
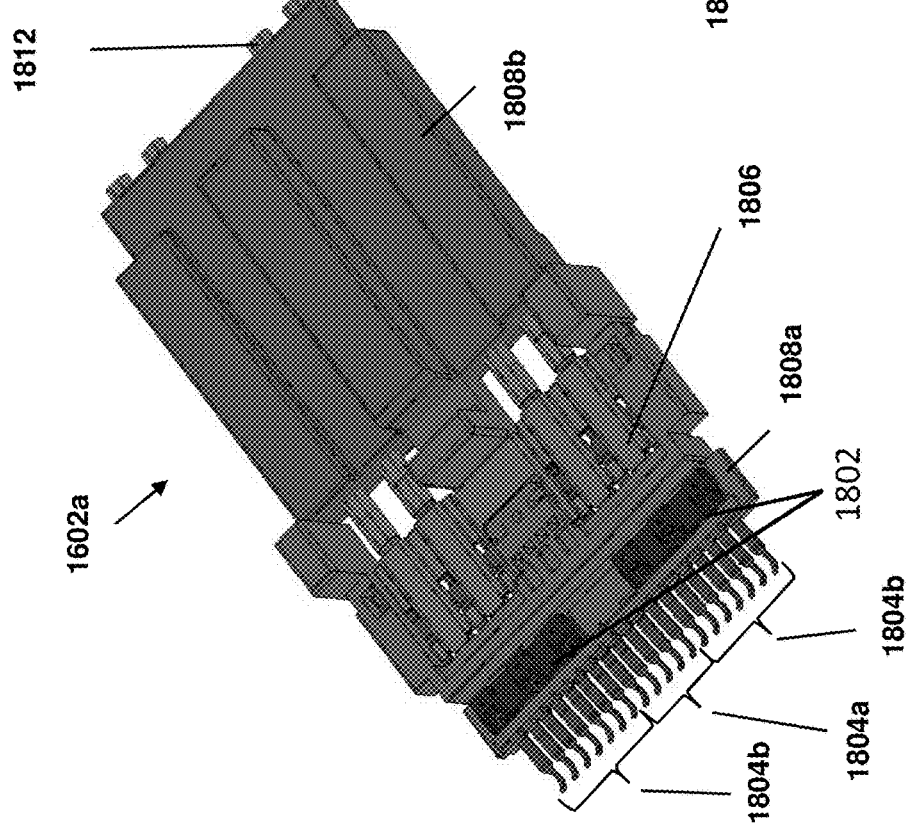
Figures 19A, 19B:
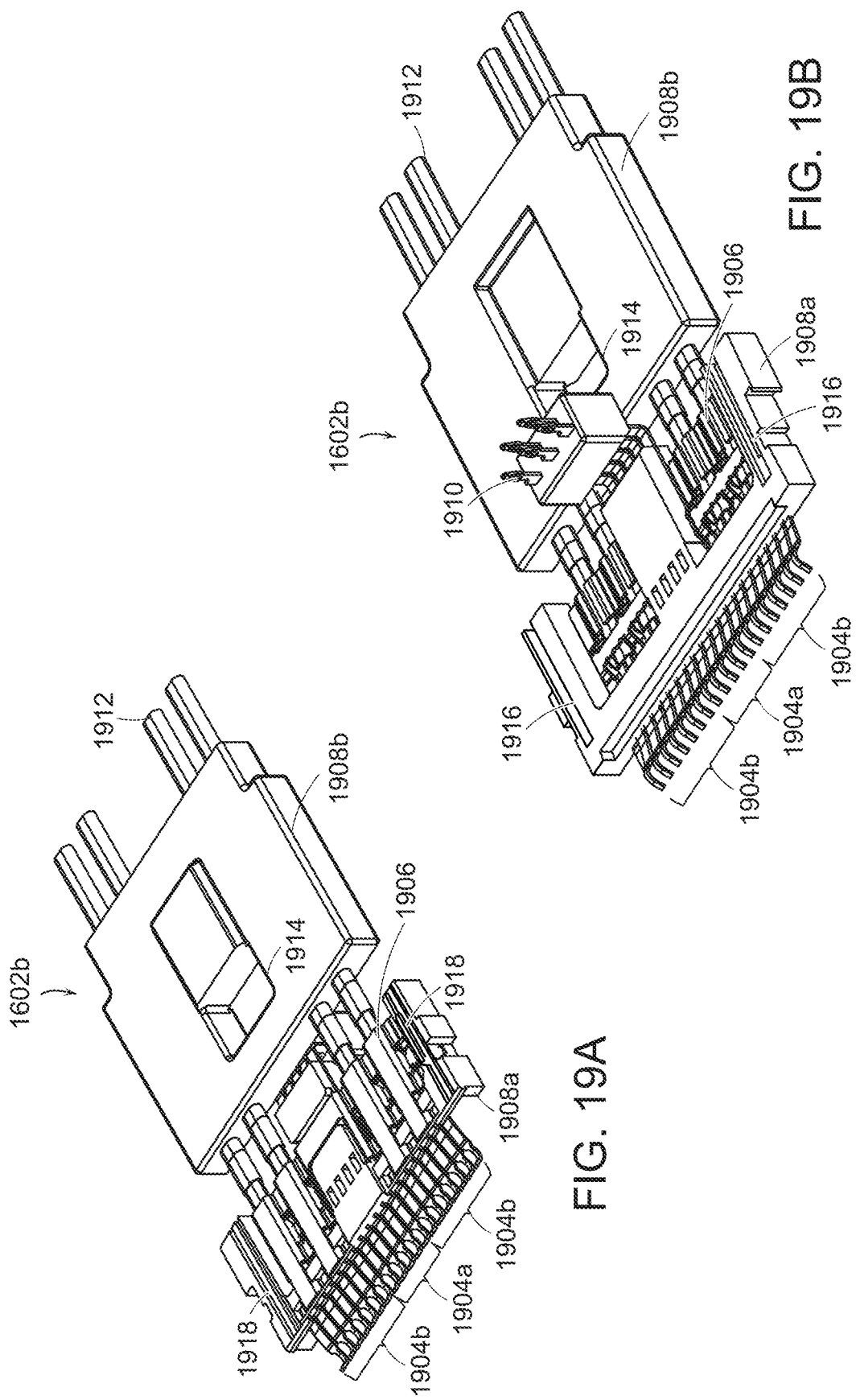
FIGS. 19A and 19B are top and bottom views, respectively, of an upper inner terminal subassembly, providing a row of contact portions of conductive elements within the connector, such as might be used in the manufacture of the receptacle connector of FIG. 16A.
Figures 21A, 21B:
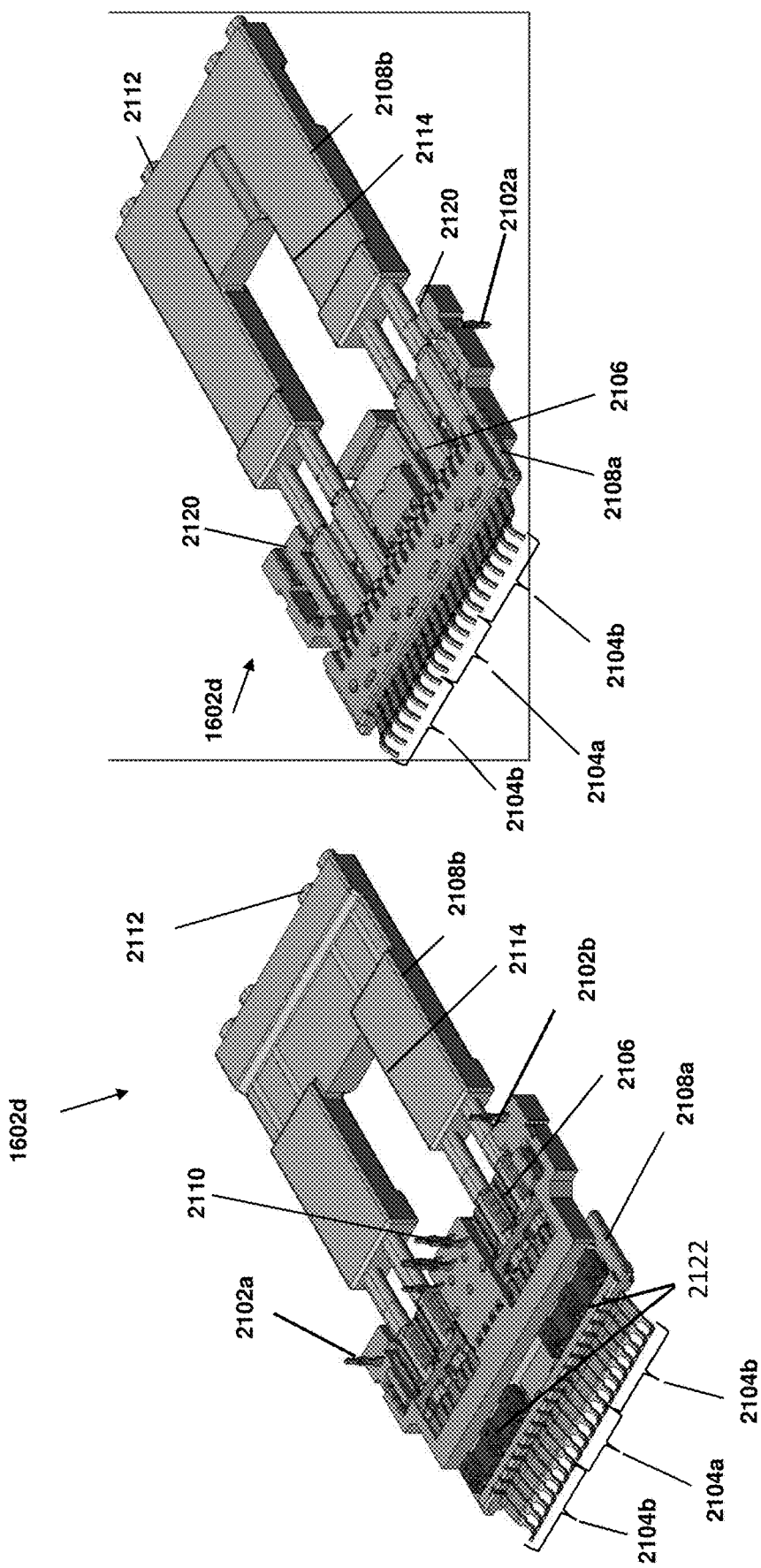
FIGS. 21A and 21B are top and bottom views, respectively, of a lower outer terminal subassembly, providing a row of contact portions of conductive elements within the connector, such as might be used in the manufacture of the receptacle connector of FIG. 16A.

FIGS. 18A and 18B illustrate an upper outer terminal subassembly 1602a, providing a row of contact portions for first conductive elements 1804a and second conductive elements 1804b, disposed in an insulative overmold 1808a, within the receptacle connector 1600 of FIG. 16A. FIGS. 19A and 19B illustrate an upper inner terminal subassembly 1602b, providing a row of contact portions for first conductive elements 1904a and second conductive elements 1904b, disposed in an insulative overmold 1908a, within the receptacle connector 1600 of FIG. 16A. FIGS. 20A and 20B illustrate a lower inner terminal subassembly 1602c, providing a row of contact portions for first conductive elements 2004a and second conductive elements 2004b, disposed in an insulative overmold 2008a, within the receptacle connector 1600 of FIG. 16A. FIGS. 21A and 21B illustrate a lower outer terminal subassembly 1602d, providing a row of contact portions for first conductive elements 2104a and second conductive elements 2104b, disposed in an insulative overmold 2108a, within the receptacle connector 1600 of FIG. 16A.

Each terminal subassembly may include additional features. Strain relief overmolds 1808b, 1908b, 2008b, and 2108b, may respectively be formed around cables 1812, 1912, 2012, and 2112. Respective portions of the insulative overmolds 1808a, 1908a, 2008a, and 2108a may hold only the first types of conductive elements 1804a, 1904a, 2004a, and 2104a, respectively configured with tails 1810, 1910, 2010, and 2110 for attachment to printed circuit board 1608

The terminal subassemblies 1602a, 1602b, 1602c, and 1602d of FIGS. 18A-21B differ from the terminal subassemblies 502a, 502b, 512c, and 502d of FIGS. 7A-10B in one or several ways. For example, the terminal subassembly 1602a illustrated in FIG. 18A includes a shorting bar subassembly that includes two respective shorting bars 1802. The terminal subassembly 1602d illustrated in FIG. 21A includes two respective shorting bars 2122 that each connects a portions of the ground conductors in a row, rather than one shorting bar, such as 702, spanning the entire row.

In addition or in alternative, the terminal subassemblies 1602a, 1602b, 1602c, and 1602d of FIGS. 18A-21B include features that accommodate a different ground member that connects together the grounds in adjacent rows. In the illustrated embodiment, the ground member is implemented as a ground staple 1702. In the illustrated embodiment, ground staple 1702 does not include contact tails for making connection to a ground structure within a printed circuit board 1608. Rather, the two lowermost terminal subassemblies include additional tails. Second lowermost terminal subassembly 1602c illustrated in FIGS. 20A-20B includes outer tails 2002a and 2002b, and the lowermost terminal subassembly 1602d illustrated in FIGS. 21A-21B include outer tails 2102a and 2012b. Ground staple 1702 contacts these outer tails 2002a, 2002b, 2102a and 2012b, so as to complete a conducting path to the ground structures of the printed circuit board 1608 to which a receptacle connector 1600 as illustrated is mounted.

Outer tails 2002a, 2002b, 2102a, and 2102b are illustrated in this example as pressfit tails. In embodiments where the tails comprise pressfit tails, a pressfit tail may be configured to be inserted into a corresponding conductive hole of a printed circuit board 1608 in order to couple the terminal subassemblies 1602a, 1602b, 1602c, and 1602d to the conductive hole of the printed circuit board 1608. While FIGS. 20A-20B and 21A-21B illustrate the tails 2002a, 2002b, 2102a, and 2102b as pressfit tails, other configurations are possible. For example, tails 2002a, 2002b, 2102a, and 2102b may be configured to be coupled to a printed circuit board 1608 via soldering and other methods.

In some embodiments, outer pressfits are configured to ground each of the terminal subassemblies 1602a, 1602b, 1602c, and 1602d to a printed circuit board 1608 as a result of a connection to ground staple 1702 which is in turn connected to the ground structure within each terminal subassembly 1602a, 1602b, 1602c, and 1602d. In some embodiments, outer pressfits may be portions of the ground conductors of the terminal subassemblies 1602a, 1602b, 1602c, and 1602d. In some embodiments, outer pressfits are electrically coupled to ground terminals of the terminal subassemblies 1602a, 1602b, 1602c, and 1602d via electrical conductors internal to the terminal subassemblies, such as one of the illustrated ground shields 1806, 1906, 2006, or 2106. Alternatively or additionally, the ground structures within the terminal subassemblies 1602a, 1602b, 1602c, and 1602d may be connected to ground structures within the printed circuit board 1608 in other ways. For example, ground staple 1702 may press against a ground pad on a surface of the printed circuit board 1608. Ground staple 1702 may include spring fingers or other compliant structures to facilitate such a connection.

In embodiments that include a ground tail, when the terminal subassemblies are stacked, ground outer tails 2002a, 2002b, 2102a, and 2102b may act as the sole ground tails of the terminal subassemblies 1602a, 1602b, 1602c, and 1602d. In other embodiments, the terminal subassemblies may include other ground tails than outer tails 2002a, 2002b, 2102a, and 2102b, for example, at least some of tails 1810, 1910, 2010, or 2110.

Figure 22A:
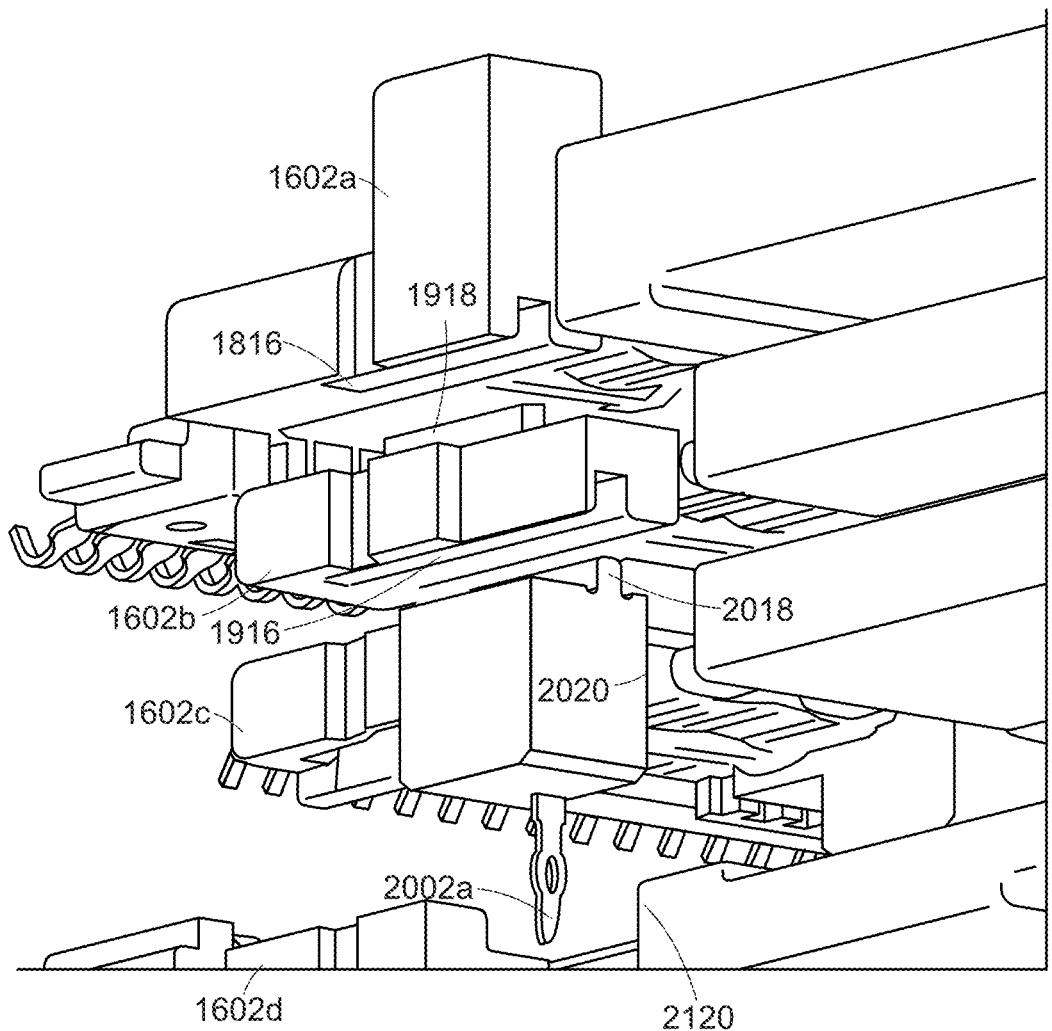
FIGS. 22A, 22B, and 22C are a series of figures showing steps of aligning and engaging the terminal subassemblies of FIGS. 18A and 18B, FIGS. 19A and 19B, FIGS. 20A and 20B, and FIGS. 21A and 21B during manufacture of a receptacle connector.
Figure 22C:
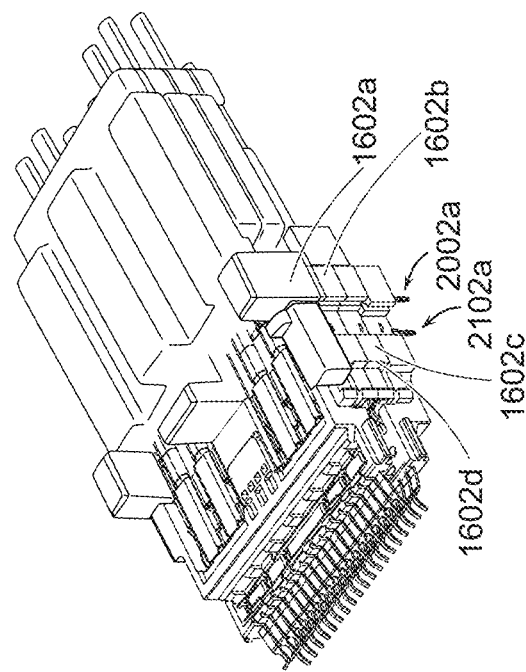
Figure 22B:
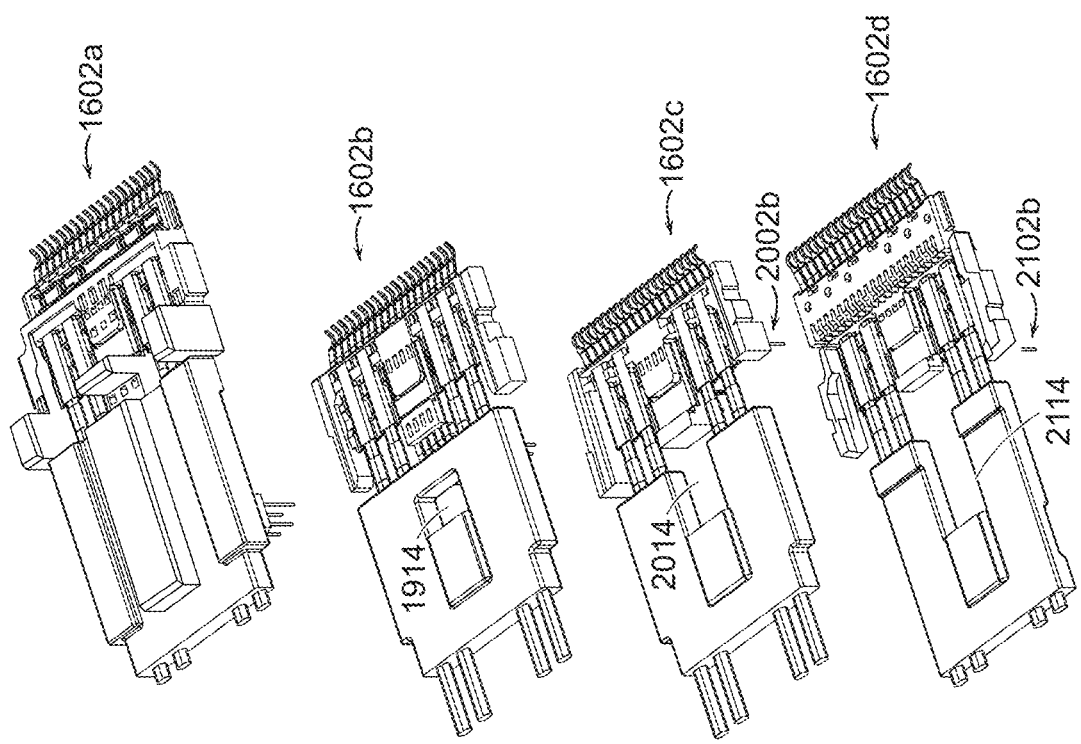

FIGS. 22A, 22B, and 22C illustrate steps of aligning and engaging the terminal subassemblies of FIGS. 18A-21B during manufacture of a receptacle connector. The terminal subassemblies illustrated therein may vary from the terminal subassemblies illustrated in FIGS. 11A, 11B, and 11C in that they include an alternative arrangement of aligning members. The aligning members of FIGS. 22A, 22B, and 22C comprise rib (for example ribs 1918 or 2018) and slot (for example, slots 1816 or 1916) arrangements rather than the dowel arrangements illustrated in FIGS. 11A, 11B, and 11C. The rib and slot arrangements provide coarse alignment of the terminal subassemblies. In some embodiments, engagement features 2020 formed from insulative overmold 2008a of terminal subassembly 1602c may be configured to nest with complementary engagement features 2120 formed from insulative 2108a of terminal subassembly 1602d to provide coarse alignment of terminal subassembly 1602c with terminal subassembly 1602d rather than or in addition to a rib and slot arrangement. In embodiments utilizing such coarse alignment techniques, the ground staple 1702, and/or features on cage 2602 (described in further detail below) and/or other structures may provide a fine alignment. In the illustrated embodiment, the alignment members enable relative sliding of the terminal subassemblies 1602a, 1602b, 1602c, and 1602d in a direction parallel to the mating direction of the receptacle connector 1600. Fine alignment may set the position of the terminal subassemblies 1602a, 1602b, 1602c, and 1602d in this direction. As a result, fine alignment features may determine the position of the terminal subassemblies 1602a, 1602b, 1602c, and 1602d in the mating direction relative to each other and/or relative to a channel in a cage 2602 where a plug connector may be inserted.

A feature of the terminal subassemblies 1602a, 1602b, 1602c, and 1602d configured to support stacking of the terminal subassemblies 1602a, 1602b, 1602c, and 1602d may include at least one opening formed in an insulative overmold 1808a, 1908a, 2008a, or 2108a or formed in a strain relief overmold 1808b, 1908b, 2008b, or 2108b. For example, strain relief overmold 1908b includes an opening 1914 aligned with and configured to receive a portion of the insulative overmold 1808a and tails 1810. Strain relief overmold 2008b includes an opening 2014 (larger than opening 1914) aligned with and configured to receive a portion of the insulative overmold 1808a and tails 1810 as well as a portion of the insulative overmold 1908a and tails 1910. Strain relief overmold 2108b includes an opening 2114 (larger than opening 2014) aligned with and configured to receive 1 portion of the insulative overmold 1808a and tails 1810 as well as a of the insulative overmold 1908a and tails 1910 and also a portion of the insulative overmold 2008a and tails 2010. In this manner, the terminal subassemblies 1602a, 1602b, 1602c, and 1602d may be stacked in a nested fashion. This configuration configures each of the tails 1810, 1910, 2010, and 2110 to be mounted to printed circuit board 1608 even when the terminal subassemblies 1602a, 1602b, 1602c, and 1602d are arranged in a stacked configuration.

As shown in FIG. 22B, portions of insulative overmolds and tails of terminal subassemblies arranged lower in the stack may be arranged more proximate a slot 2402 (described in further detail below) of housing 1604, along the plugging direction of a transceiver. For example, a portion of the insulative overmold 2108a and tails 2110 are arranged most proximate the slot 2402, while a portion of the insulative overmold 2008a and tails 2010 are arranged second most proximate the slot 2402, a portion of the insulative overmold 1908a and tails 1910 are arranged third most proximate the slot 2402, and finally, a portion of the insulative overmold 1808a and tails 1810 are arranged least proximate the slot 2402.

Figure 23B:
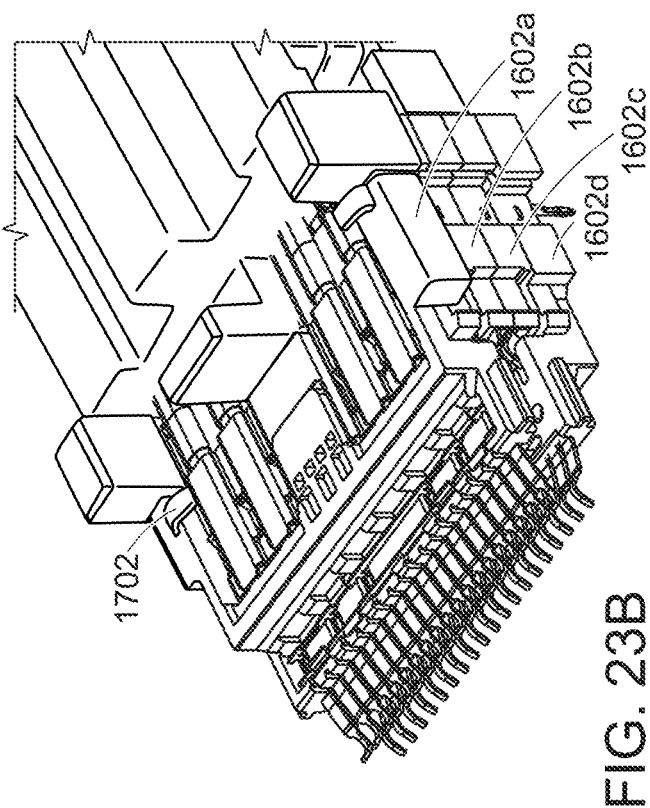
FIGS. 23A, 23B, 23C, 23D, and 23E illustrate a step of attaching a ground staple to the terminal subassemblies as shown in FIG. 22C, so as to electrically connect the ground conductors in the terminal subassemblies to each other and to align the terminal subassemblies.
Figure 23A:
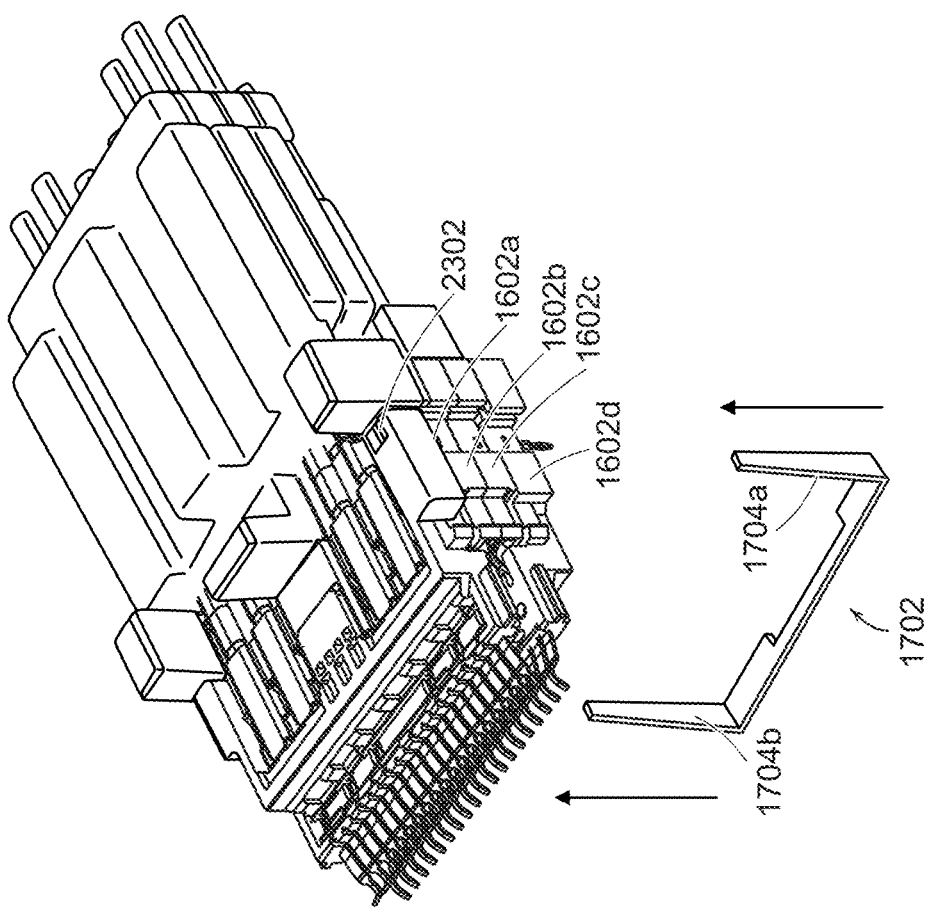
Figure 23E:
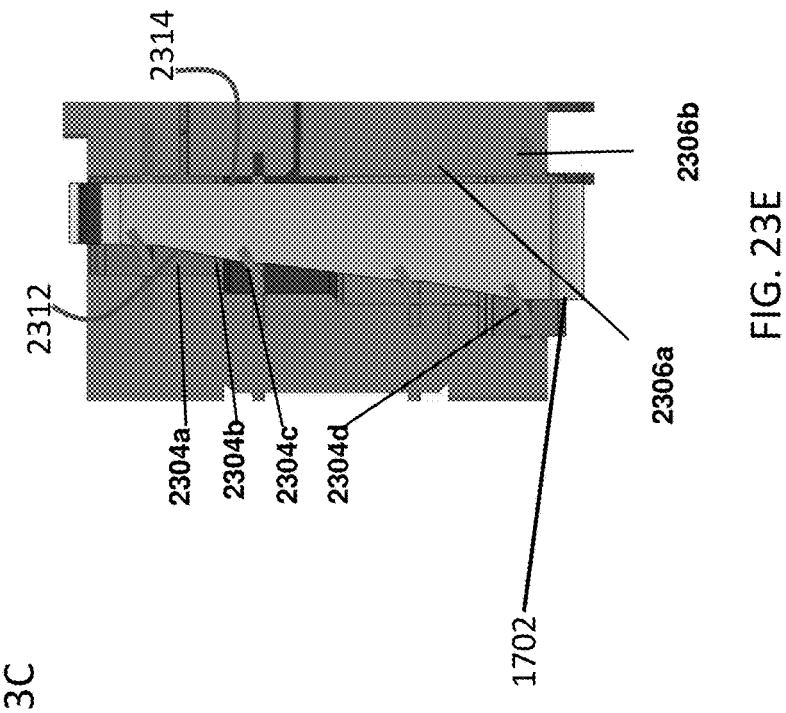
Figure 23C:
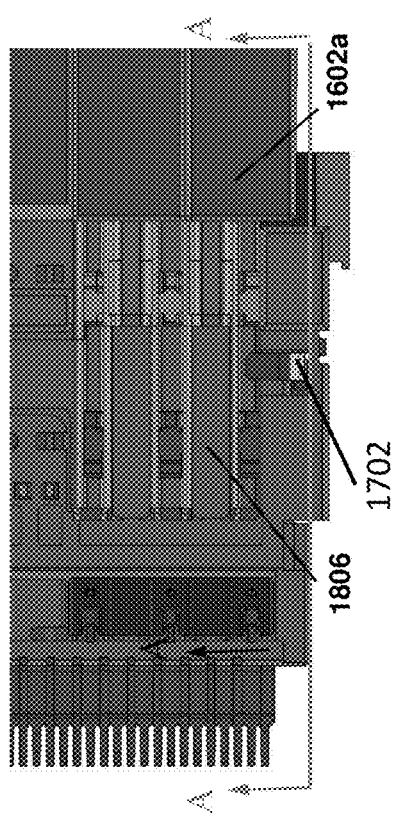
Figure 23D:
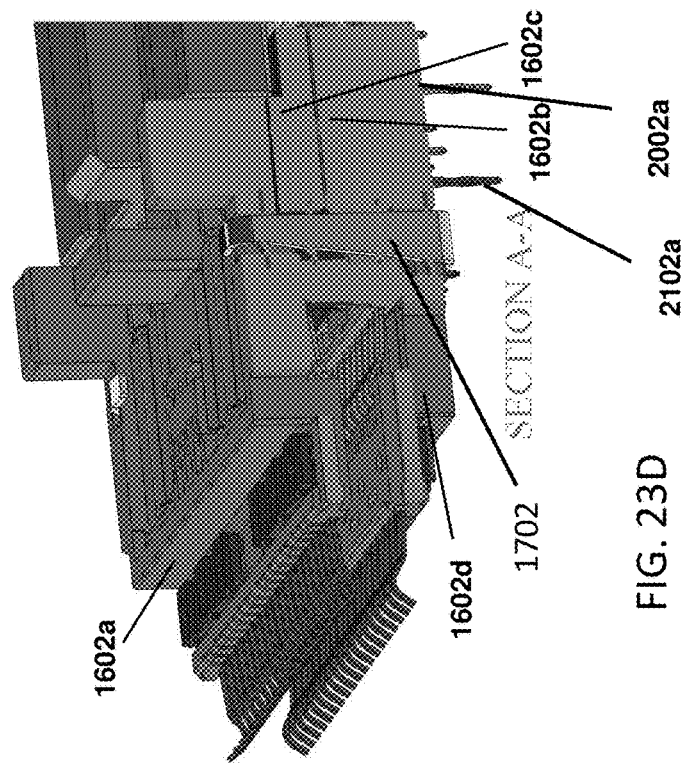

FIG. 23A shows an exploded view of ground staple 1702 and a stack of the terminal subassemblies 1602a, 1602b, 1602c, and 1602d. FIG. 23B shows the ground staple 1702 assembled with the stack of the terminal subassemblies 1602a, 1602b, 1602c, and 1602d. FIG. 23C shows a top view of the of ground staple 1702 assembled with the stack of the terminal subassemblies 1602a, 1602b, 1602c, and 1602d. FIG. 23D shows a cutaway view of the of ground staple 1702 assembled with the stack of the terminal subassemblies 1602a, 1602b, 1602c, and 1602d. FIG. 23E shows a detail cutaway view of the of ground staple 1702 assembled with the stack of the terminal subassemblies 1602a, 1602b, 1602c, and 1602d.

FIGS. 23A, 23B, 23C, and 23D illustrate a step of attaching a ground staple 1702 to the terminal subassemblies 1602a, 1602b, 1602c, and 1602d as shown in FIG. 22C. The ground staple 1702 may electrically connect the ground conductors in the terminal subassemblies 1602a, 1602b, 1602c, and 1602d to each other and provide for a connection to grounding structures within the printed circuit board 1608 to which the receptacle connector 1600 is attached. The step of attaching the ground staple 1702 differs from the step of attaching the ground clips 602 in that the step of attaching the ground staple 1702 occurs before a step of inserting the terminal subassemblies 1602a, 1602b, 1602c, and 1602d into a housing 1604, whereas the step of attaching the ground clips 602 occurs after a step of inserting the terminal subassemblies 502a, 502b, 502c, and 502d into a housing 504. Moreover, the ground staple 1702 is inserted in a direction perpendicular to the mating direction, rather than antiparallel with the mating direction.

In the illustrated embodiment, ground staple 1702 is implemented as a single member with two arms 1704a and 1704b that are inserted into respective channels 2302 on the terminal subassemblies 1602a, 1602b, 1602c, and 1602d. The channels 2302 are shown at opposing ends of the rows of conductive elements 1804a, 1804b, 1904a, 1904b, 2004a, 2004b, 2104a, and 2104b within the terminal subassemblies 1602a, 1602b, 1602c, and 1602d. In such embodiments, the ground staple 1702 may be made of metal such that the inserted members may be electrically coupled together. In other embodiments, a plurality of ground members, each of which may be shaped as one arm of ground staple 1702 may be inserted channels 2302 in the terminal subassemblies 1602a, 1602b, 1602c, and 1602d separately. The inserted members may be separately connected to grounds within the receptacle connector 1600 and within the printed circuit board 1608 to which the receptacle connector 1600 is mounted. In this manner, at least one ground staple 1702, or another ground member may provide a first conductive member and a second conductive member adjacent the terminal subassemblies 1602a, 1602b, 1602c, and 1602d.

In some embodiments, the arms 1704a and 1704b of the ground staple 1702 may be arranged in a plane defined by both a plugging direction of a transceiver and a direction normal to a printed circuit board. In such embodiments, the plane that arms 1704a and 1704b of the ground staple 1702 are arranged in may be normal to each of the row directions of each of the rows of conductive elements 1804a, 1804b, 1904a, 1904b, 2004a, 2004b, 2104a, and 2104b.

Ground staple 1702 may be connected to the ground structure of a printed circuit board 1608 to which the receptacle connector 1600 is mounted through outer tails 2002a, 2002b, 2102a, and 2102b. In the illustrated embodiment, outer tails 2002a, 2002b, 2102a, and 2102b have an edge or surface exposed in the channels 2302 into which ground staple 1702 is inserted. In the embodiment illustrated, outer tails 2002a, 2002b, 2102a, and 2102b have a portion exposed at the reward side of the channel 2302, such as edge 2306a corresponding to tail 2002a or edge 2306b corresponding to tail 2102a. As described below in connection with the fine alignment function of the ground staple 1702, the ground staple 1702 may be biased so that an edge of the ground staple 1702 presses against the rearward side of the channel 2302. Thus, an electrical connection may be made between the ground staple 1702 and tails 2002a, 2002b, 2102a, and 2102b that may be connected to the ground structure of a printed circuit board 1608.

While the ground staples 1702 illustrated in FIGS. 23A, 23B, 23C, and 23D are not depicted as having a tail, a ground staple 1702 may include at least one tail. The tail may be configured to make connection to a corresponding conductive element of a printed circuit board 1608 in order to couple the terminal subassemblies 1602a, 1602b, 1602c, and 1602d to the ground structure of the printed circuit board 1608. Tails of ground staple 1702 may be formed using materials and techniques as described above in connection with the ground clips 602 illustrated in FIGS. 13A, 13B, 13C, and 13D. In some embodiments, ground staple 1702 may be stamped from a sheet of metal such that the relative position of the features of ground staple 1702 may be established with high precision by a stamping die.

In addition to providing electrical coupling of the terminal subassemblies 1602a, 1602b, 1602c, and 1602d, the ground staples 1702 may aid in fine alignment of the terminal subassemblies 1602a, 1602b, 1602c, and 1602d. As shown in FIG. 23A, a ground staple 1702 may be coupled with corresponding ground conductors of each of the terminal subassemblies 1602a, 1602b, 1602c, and 1602d. In the illustrative embodiment of FIG. 23A, the terminal subassemblies 1602a, 1602b, 1602c, and 1602d have openings that are aligned to form channels 2302 into which the ground staple 1702 is inserted.

FIG. 23B illustrates such biasing members 2304a, 2304b, 2304c, and 2304d pressing against one leg of ground staple 1702. Similar biasing members may press against the other legs. Biasing members 2304a, 2304b, 2304c, and 2304d from the terminal subassemblies 1602a, 1602b, 1602c, and 1602d may extend into the channel 2302 and press against edge 2312 of the of ground staple 1702. As a result of force exerted by the biasing members 2304a, 2304b, 2304c, and 2304d on edge 2312, edge 2314 may be urged towards the back wall of the channel 2302. The portions of the terminal subassemblies 1602a, 1602b, 1602c, and 1602d forming the back wall of the channel 2302 will be urged into engagement with edge 2314 such that the terminal subassemblies 1602a, 1602b, 1602c, and 1602d may be aligned by that edge 2314. Edge 2312 may be arranged not parallel, (as illustrated, having an acute angle measured internal to ground staple 1702) relative to the edge 2314. Edge 2312 having such an angle may ensure that the ground staple 1702 is urged towards the back of channel 2302. When the ground staple 1702 is inserted, biasing portions 2304a, 2304b, 2304c, and 2304d will react on the ground staple 1702 along a direction normal to edge 2312. A component of that normal reactive force will be along a direction normal the insertion direction, urging ground staple 1702 towards the back of channel 2302. Because edge 2314 may be formed by stamping and has a shape that is precise, the relative positions of the terminal subassemblies 1602a, 1602b, 1602c, and 1602d may be precisely set.

In the embodiment illustrated, the biasing members 2304a, 2304b, 2304c, and 2304d are tabs extending from the terminal subassemblies 1602a, 1602b, 1602c, and 1602d into the channel 2302. Those tabs act as spring fingers, exerting a force on edge 2312. Those tabs may be formed as portions of the stamping of a metal sheet that forms the conductive elements 1804a, 1804b, 1904a, 1904b, 2004a, 2004b, 2104a, and 2104b of the terminal subassemblies 1602a, 1602b, 1602c, and 1602d. In embodiments in which the staple 1702 serves both to position and ground the terminal subassemblies 1602a, 1602b, 1602c, and 1602d, the tabs may be electrically coupled to conductive elements 1804a, 1804b, 1904a, 1904b, 2004a, 2004b, 2104a, and 2104b serving as ground conductors in the terminal subassemblies 1602a, 1602b, 1602c, and 1602d or as a result of connection between the tabs and ground conductors, such as through the ground shields 1808, 1908, 2008, or 2108, or shorting bars. That coupling may result, for example, from the tabs being integrally formed with the ground conductors and/or the common ground shields 1808, 1908, 2008, or 2108.

The ground clip 1702 may be configured to slide into the channels 2302 in an insertion direction aligned with a stacking direction of the terminal subassemblies 1602a, 1602b, 1602c, and 1602d. The ground staple 1702 may then be bent around an upper one of the terminal subassemblies 1602a or a lower one of the terminal assemblies 1602d to retain the terminal subassemblies 1602a, 1602b, 1602c, and 1602d in a stacked arrangement. The insertion direction may be perpendicular to a plugging direction of a transceiver configured to be inserted into the receptacle connector 1600.

Figure 24B:
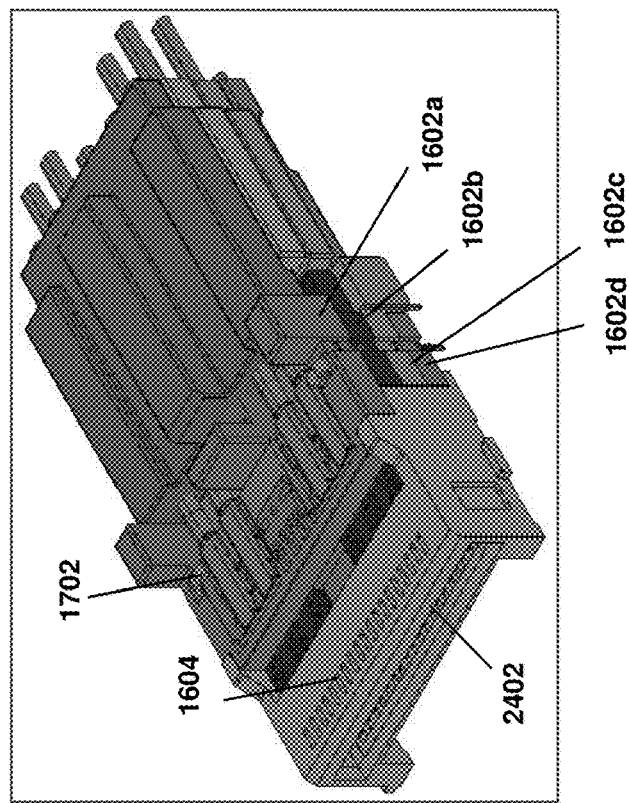
FIGS. 24A and 24B illustrates a subsequent step in the manufacture of the receptacle connector in which the contact portions of the conductive elements in the terminal subassemblies as shown in FIG. 23A are inserted into a housing so as to line two walls of the slot for engagement to a paddle card, as illustrated in FIGS. 4A and 4B, when the paddle card is inserted in that slot.
Figure 24A:
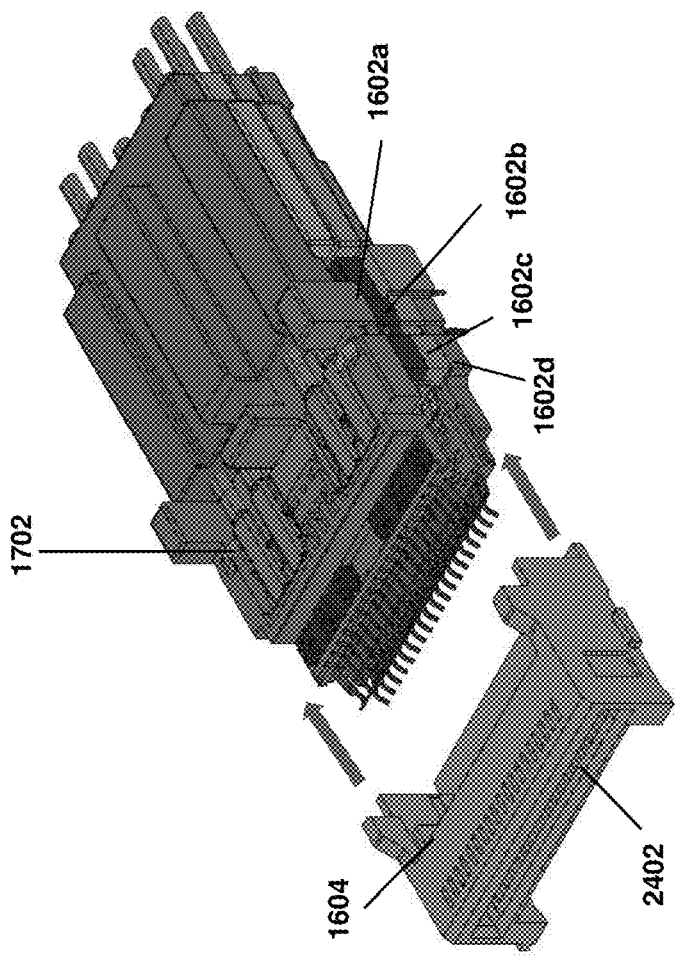

FIG. 24A shows an exploded view of a stack of the terminal subassemblies 1602a, 1602b, 1602c, and 1602d and a housing 1604. FIG. 24B shows the stack of the terminal subassemblies 1602a, 1602b, 1602c, and 1602d assembled with the housing 1604. FIGS. 24A and 24B show a step of manufacturing the receptacle connector where the contact portion of the conductive elements 1804a, 1804b, 1904a, 1904b, 2004a, 2004b, 2104a, and 2104b in the terminal subassemblies 1602a, 1602b, 1602c, and 1602d are inserted into a housing 1604, where a slot 2402 is formed in the housing 1604. By inserting the contact portion of the conductive elements 1804a, 1804b, 1904a, 1904b, 2004a, 2004b, 2104a, and 2104b in the terminal subassemblies 1602a, 1602b, 1602c, and 1602d, two walls of the slot 2402 are lined with contacts so as to engage a paddle card, such as the paddle card of FIGS. 4A and 4B, when the paddle card is inserted in the slot 2402.

Figure 25A:
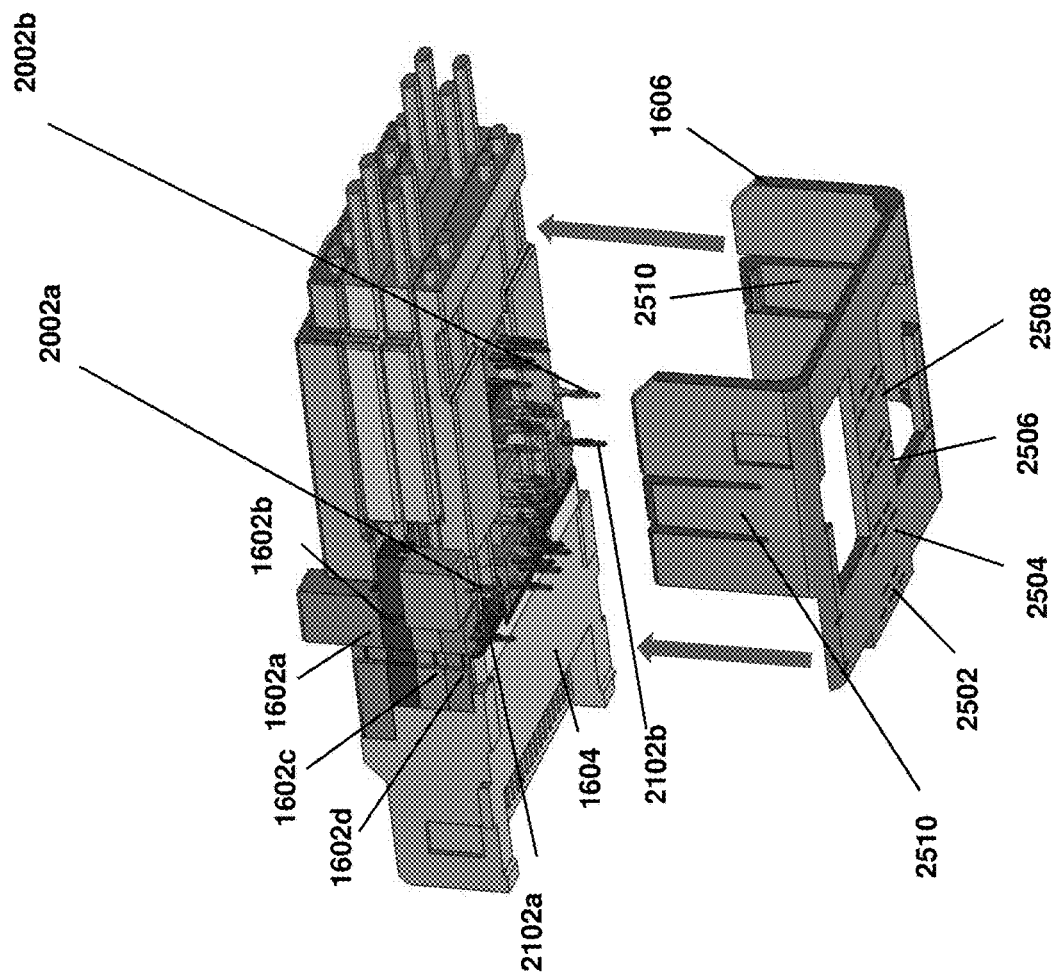
FIGS. 25A and 25B illustrate a step of attaching an insulative organizer to the terminal subassemblies as shown in FIG. 24B, so as to provide mechanical support to the pressfit contact tails of the receptacle connector and to mechanically support the terminal subassemblies.
Figure 25B:
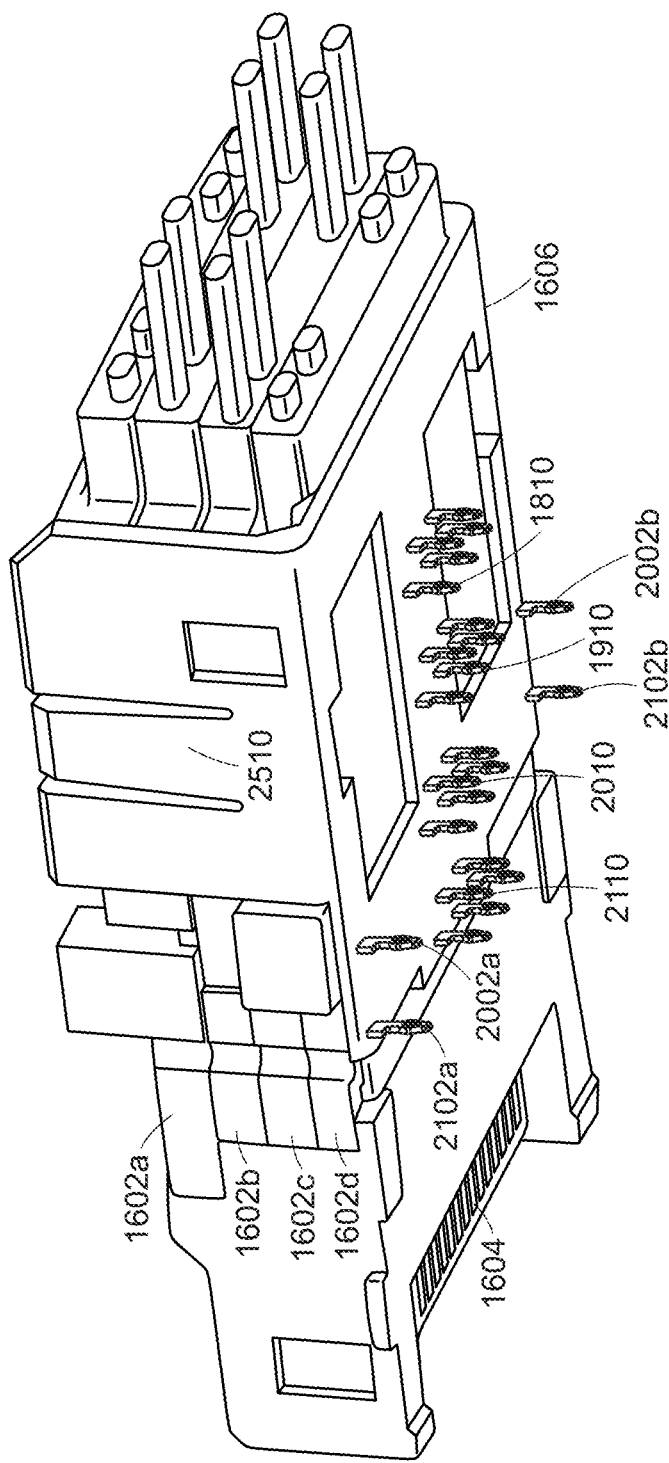

FIG. 25A shows a step of assembling organizer 1606 with the stack of the terminal subassemblies 1602a, 1602b, 1602c, and 1602d. FIG. 25B shows the organizer 1606 assembled with the stack of the terminal subassemblies 1602a, 1602b, 1602c, and 1602d. FIGS. 25A and 25B show a step of manufacturing the receptacle connector where an insulative organizer 1606 is attached to the terminal subassemblies 1602a, 1602b, 1602c, and 1602d. The insulative organizer 1606 may provide mechanical support to pressfit contact tails 1810, 1910, 2010, and 2110 extending from the terminal subassemblies 1602a, 1602b, 1602c, and 1602d and extending through the insulative organizer 1606. By supporting the pressfit contact tails, the insulative organizer 1606 provides mechanical support to the terminal subassemblies 1602a, 1602b, 1602c, and 1602d. For example, tails 1810 may be engaged with slots 2508, tails 1910 may be engaged with slots 2506, tails 2010 may be engaged with slots 2504, and tails 2110 may be engaged with slots 2502. The organizer 1606 may be formed having attachment features 2510 (in some embodiments spring fingers) configured to attach the organizer 1606 to the stack of terminal subassemblies 1602a, 1602b, 1602c, and 1602d.

As discussed above, techniques described herein may improve signal integrity by reducing the tolerance between mating contact portions of conductive elements within a receptacle connector and mating contact portions of conductive elements within a plug connector configured to be inserted into the receptacle connector. Techniques for reducing tolerance may enable mating contact portions of connectors to reliably function with reduced wipe during mating, which in turn, may reduce the length of stubs in the mating interface of mated connectors, which may improve signal integrity.

For example, terminal subassemblies may engage with a cage, where the cage is stamped by a die and therefore has low variation in dimensions. By engaging the terminal subassemblies directly to features of the cage, contact portions of the terminal subassemblies may be positioned with low variability. The position of a plug mated with the receptacle connector may also be established by engaging the plug with features on the cage, leading to less variability from connector to connector.

Alternatively or additionally, variability in position of the contact portions of terminal subassemblies may be reduced by an alignment member engaging with the terminal subassemblies. Terminal subassemblies may be pressed against the alignment member, thereby establishing the positions of each terminal subassembly relative to the alignment member. Multiple terminal subassemblies may be positioned relative to the alignment member, and therefore with respect to each other, with low variability. The alignment member may be produced with low variability, such as by stamping metal.

By reducing variability of the relative position of connectors, the plug configured for mating with the receptacle connector may be designed with shorter pads, in turn reducing stub lengths. By reducing stub lengths, resonances may occur at frequencies that do not interfere with operation of the connector, even at relatively high frequencies, such as up to at least 25 GHz, up to at least 56 GHz or up to at least 112 GHz, up to at least 200 GHz, or greater, according to some embodiments.

Figure 26A:
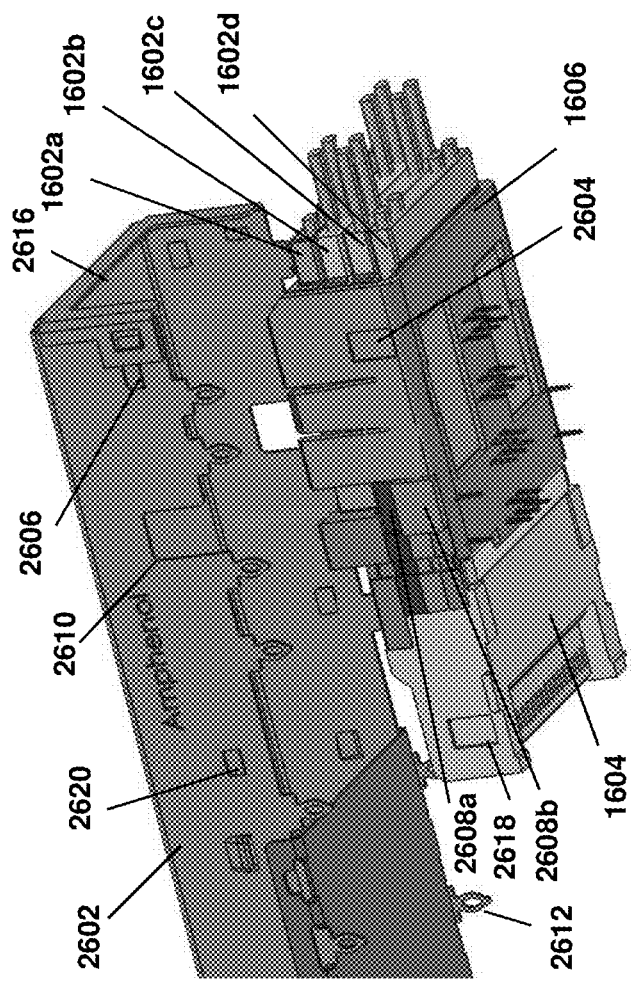
FIGS. 26A and 26B illustrate a step of inserting the receptacle connector, as shown in FIG. 25B into a cage and attaching the terminal subassemblies directly to the cage.
Figure 26B:
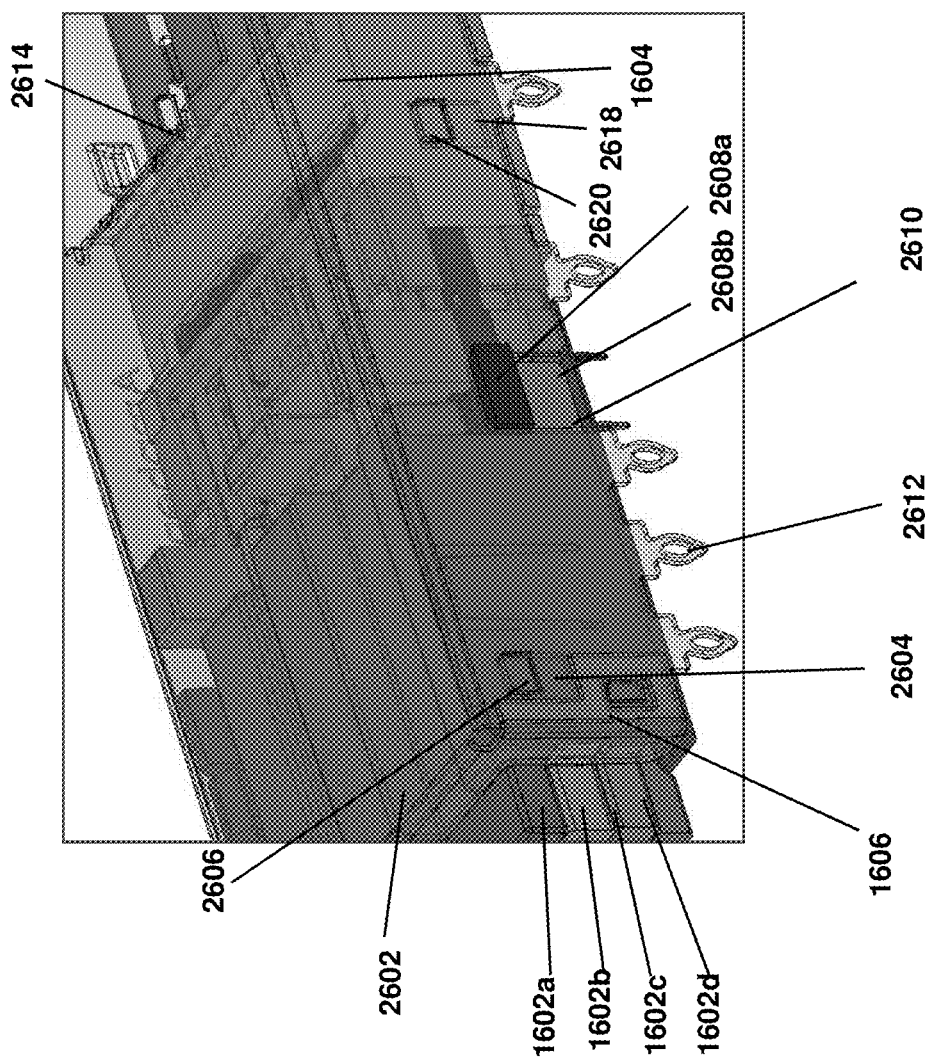

FIG. 26A shows a step of assembling cage 2602 with the stack of the terminal subassemblies 1602a, 1602b, 1602c, and 1602d. FIG. 26B shows the cage 1602 assembled with the stack of the terminal subassemblies 1602a, 1602b, 1602c, and 1602d. In FIG. 26B, the cage 1602 is illustrated as partially translucent to illustrate the exterior and the interior of the cage 1602. FIGS. 26A and 26B show a step of manufacturing the receptacle connector 1600 where receptacle connector is inserted into a cage. Cage 2602 may be formed from similar materials and according to similar techniques as cage 1610. Cables 1812, 1912, 2012, and 2112 may extend through rear opening 2616 of cage 2602. In some embodiments, cage 2602 includes a top opening 2614 configured such that a heat sink may extend through the opening 2614 into the cage 2602 to contact and/or cool a transceiver disposed in the cage 2602. Cage 1602 may comprise pressfit tails 2612 constructed from the same materials and according to the same techniques as pressfit tails 1512. For example, the pressfits 2612 of the cage 2602 may be larger than pressfits (such as tails 1810, 1910, 2010, or 2110) of receptacle connector 1600, so as to provide substantially more retention force than the pressfits (such as tails 1810, 1910, 2010, or 2010) of the receptacle connector 1600 (such as a multiple of 1.5 or more greater retention force).

The terminal subassemblies 1602a, 1602b, 1602c, and 1602d may be attached directly to the cage 2602. In this configuration, engagement between the stack of terminal subassemblies 1602a, 1602b, 1602c, and 1602d and cage 2602 is by an interference fit, or by otherwise engaging, projections of an insulative portion of the terminal subassemblies 1602a, 1602b, 1602c, and 1602d, for example, projection 2608a of terminal subassembly 1602b and projection 2608b of terminal subassembly 1602c, with a slot 2610 in the cage 2602. The slots 1510 may be elongated perpendicular to the insertion direction.

Accordingly, the position of the terminal subassemblies may be established directly relative to cage 2602, which may be stamped by a die with low variation in dimensions. Additional alignment may be provided by ground staple 1702 (which may be stamped from metal) as described above. Additional mechanical support for the receptacle connector 1600 may be provided by engaging features 2604 of the organizer 1606 with complementary features 2606 of the cage 2602 and/or may be provided by engaging features 2618 of the housing 1604 with complementary features 2620 of the cage 2602.

As noted above, the position of a plug mated with the receptacle connector 1600 may also be established with low variability by engaging the mating plug with features on the cage 2602. When both the stack of terminal subassemblies 1602a, 1602b, 1602c, and 1602d and a mating plug are positioned directly with respect to the cage 2602, there may be less variability from connector to connector, leading to shorter pads, in turn reducing stub lengths and increasing operating frequency.

One or more members have been described as lossy or as made of conductive plastic. Conductive plastic members are an example of lossy members. Such members may be formed from or include plastic that is modified so as to be partially conductive. Plastic materials may be easily molded into a desired shape or inserted into a desired location within a connector. But, lossy members may be formed in other ways.

Any suitable lossy material may be used for these and other structures that are "lossy." Materials that conduct, but with some loss, or material which by another physical mechanism absorbs electromagnetic energy over the frequency range of interest are referred to herein generally as "lossy" materials. Electrically lossy materials can be formed from lossy dielectric and/or poorly conductive and/or lossy magnetic materials. Magnetically lossy material can be formed, for example, from materials traditionally regarded as ferromagnetic materials, such as those that have a magnetic loss tangent greater than approximately 0.05 in the frequency range of interest. The "magnetic loss tangent" is the ratio of the imaginary part to the real part of the complex electrical permeability of the material. Practical lossy magnetic materials or mixtures containing lossy magnetic materials may also exhibit useful amounts of dielectric loss or conductive loss effects over portions of the frequency range of interest. Electrically lossy material can be formed from material traditionally regarded as dielectric materials, such as those that have an electric loss tangent greater than approximately 0.05 in the frequency range of interest. The "electric loss tangent" is the ratio of the imaginary part to the real part of the complex electrical permittivity of the material. Electrically lossy materials can also be formed from materials that are generally thought of as conductors, but are either relatively poor conductors over the frequency range of interest, contain conductive particles or regions that are sufficiently dispersed that they do not provide high conductivity or otherwise are prepared with properties that lead to a relatively weak bulk conductivity compared to a good conductor such as copper over the frequency range of interest.

Electrically lossy materials typically have a bulk conductivity of about 1 Siemen/meter to about 100,000 Siemens/meter and preferably about 1 Siemen/meter to about 10,000 Siemens/meter. In some embodiments, material with a bulk conductivity of between about 10 Siemens/meter and about 200 Siemens/meter may be used. As a specific example, material with a conductivity of about 50 Siemens/meter may be used. However, it should be appreciated that the conductivity of the material may be selected empirically or through electrical simulation using known simulation tools to determine a suitable conductivity that provides both a suitably low crosstalk with a suitably low signal path attenuation or insertion loss.

Electrically lossy materials may be partially conductive materials, such as those that have a surface resistivity between 1 Ω/square and 100,000 Ω/square. In some embodiments, the electrically lossy material has a surface resistivity between 10 Ω/square and 1000 Ω/square. As a specific example, the material may have a surface resistivity of between about 20 Ω/square and 80 Ω/square.

In some embodiments, electrically lossy material is formed by adding to a binder a filler that contains conductive particles. In such an embodiment, a lossy member may be formed by molding or otherwise shaping the binder with filler into a desired form. Examples of conductive particles that may be used as a filler to form an electrically lossy material include carbon or graphite formed as fibers, flakes, nanoparticles, or other types of particles. Metal in the form of powder, flakes, fibers or other particles may also be used to provide suitable electrically lossy properties. Alternatively, combinations of fillers may be used. For example, metal plated carbon particles may be used. Silver and nickel are suitable metal plating for fibers. Coated particles may be used alone or in combination with other fillers, such as carbon flake. The binder or matrix may be any material that will set, cure, or can otherwise be used to position the filler material. In some embodiments, the binder may be a thermoplastic material traditionally used in the manufacture of electrical connectors to facilitate the molding of the electrically lossy material into the desired shapes and locations as part of the manufacture of the electrical connector. Examples of such materials include liquid crystal polymer (LCP) and nylon. However, many alternative forms of binder materials may be used. Curable materials, such as epoxies, may serve as a binder. Alternatively, materials such as thermosetting resins or adhesives may be used.

Also, while the above described binder materials may be used to create an electrically lossy material by forming a binder around conducting particle fillers, the invention is not so limited. For example, conducting particles may be impregnated into a formed matrix material or may be coated onto a formed matrix material, such as by applying a conductive coating to a plastic component or a metal component. As used herein, the term "binder" encompasses a material that encapsulates the filler, is impregnated with the filler or otherwise serves as a substrate to hold the filler.

Preferably, the fillers will be present in a sufficient volume percentage to allow conducting paths to be created from particle to particle. For example, when metal fiber is used, the fiber may be present in about 3% to 40% by volume. The amount of filler may impact the conducting properties of the material.

In some embodiments, lossy material might be molded into a desired shape and location within a connector or other component as the component is being manufactured. In other embodiments, the lossy material may be separately molded or otherwise formed into a desired shape and then inserted into the component. In yet other embodiments, the lossy material may be purchased or otherwise acquired as a preform, which may then be shaped for incorporation into a component. A preform may include an epoxy binder filled with carbon fibers and/or other carbon particles. The binder surrounds carbon particles, which act as a reinforcement for the preform. Such a preform may be inserted in a connector wafer to form all or part of the housing. In some embodiments, the preform may adhere through the adhesive in the preform, which may be cured in a heat treating process. In some embodiments, the adhesive may take the form of a separate conductive or non-conductive adhesive layer. In some embodiments, the adhesive in the preform alternatively or additionally may be used to secure one or more conductive elements, such as foil strips, to the lossy material.

Various forms of reinforcing fiber, in woven or non-woven form, coated or non-coated may be used. Non-woven carbon fiber is one suitable material. Other suitable materials, such as custom blends as sold by RTP Company, can be employed, as the present invention is not limited in this respect.

In some embodiments, a lossy member may be manufactured by stamping a preform or sheet of lossy material. For example, an insert may be formed by stamping a preform as described above with an appropriate pattern of openings. However, other materials may be used instead of or in addition to such a preform. A sheet of ferromagnetic material, for example, may be used.

However, lossy members also may be formed in other ways. In some embodiments, a lossy member may be formed by interleaving layers of lossy and conductive material such as metal foil. These layers may be rigidly attached to one another, such as through the use of epoxy or other adhesive, or may be held together in any other suitable way. The layers may be of the desired shape before being secured to one another or may be stamped or otherwise shaped after they are held together. Alternatively or additionally, plastic might be plated with a metal or other conductive material. The plating may be sufficiently thin or sufficiently diffuse that the resistivity of the resulting component is sufficiently high to provide loss.

Having thus described several embodiments, it is to be appreciated various alterations, modifications, and improvements may readily occur to those skilled in the art. Such alterations, modifications, and improvements are intended to be within the spirit and scope of the invention.

For example, FIG. 1 illustrates an electronic device in which a midboard cable termination assembly might be used. It should be appreciated that FIG. 1 shows a portion of such a device, and the device may include additional components not expressly illustrated. For example, board 110 may be larger than illustrated and may contain more components than illustrated. Likewise, board 118 may be larger than illustrated and may contain components. Moreover, multiple boards parallel to board 118 and/or parallel to board 110 may be included in the device.

A midboard cable termination assembly might also be used with board configurations other than the illustrated orthogonal configuration. The midboard cable termination assembly might be used on a printed circuit board connected to another, parallel printed circuit board or might be used in a daughter card that plugs into a backplane at a right angle. As yet another example, the midboard cable termination assembly might be mounted on a backplane.

As yet another example of a possible variation, a midboard cable termination assembly mounted on board 110 is shown with a cable that connects to a connector that is similarly mounted to board 110. That configuration is not, however, a requirement, as the cable may be connected directly to the board, an integrated circuit or other component, even directly to the board 110 to which the midboard cable termination assembly is mounted. As another variation, the cable may be terminated to a different printed circuit board or other substrate. For example, a cable extending from a midboard cable termination assembly mounted to board 110 may be terminated, through a connector or otherwise, to a printed circuit board parallel to board 110. Alternatively, cables extending from an I/O connector mounted to a first printed circuit board may be terminated to a daughter card containing a processor that is attached to the first printed circuit board or otherwise integrated into the electronic device.

As an example of a further variation, a double density, single port I/O connector was shown made with four terminal subassemblies, each having some conductive elements with tails configured for attachment to a printed circuit board and other conductive elements with tails configured to terminate a cable. In some embodiments, some terminal subassemblies may have conductive elements with tails configured for attachment to a printed circuit board without conductive elements with tails configured to terminate a cable, and/or some terminal subassemblies may have conductive elements with tails configured to terminate a cable without conductive elements with tails configured for attachment to a printed circuit board.

Techniques for making low loss, high frequency connections were described for making connections between an I/O connector and components in an electronic system remote from the I/O connector. Techniques as described herein may be used for any of multiple types of components, including microprocessors, graphics processors, FPGAs or ASICs, any of which may receive and/or transmit data at high speeds.

Moreover, a midboard cable termination assembly other than as pictured herein may be used in conjunction with an I/O connector configured for making cabled connections. More generally, the cables extending from an I/O connector may be terminated in other ways, including directly to a printed circuit board, device package, to other electrical connectors or other structures.

Further, a system configuration was described in which an I/O connector receives a plug of an active optical cable. Techniques as described herein are not limited to use with active optical cables, and may be used, for example, with connectors that receive active or passive plugs terminating copper cables.

A plug may have other configurations than described herein. For example, a paddle card in a plug, in some configurations, may have pre-wipe pads disposed between the rows of contact pads 406 and 408 or may be disposed between some or all of the contact pads in a row proximate an edge of the paddle card and that edge.

Terms signifying direction, such as "upwards" and "downwards," were used in connection with some embodiments. These terms were used to signify direction based on the orientation of components illustrated or connection to another component, such as a surface of a printed circuit board to which a termination assembly is mounted. It should be understood that electronic components may be used in any suitable orientation. Accordingly, terms of direction should be understood to be relative, rather than fixed to a coordinate system perceived as unchanging, such as the earth's surface.

Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

Examples of arrangements that may be implemented according to some embodiments include the following:

A1. An electrical connector comprising:
 a terminal subassembly, the terminal subassembly comprising:
  a plurality of conductive elements, wherein:
   each conductive element of the plurality of conductive elements comprises a contact portion, a contact tail and an intermediate portion joining the contact portion and the contact tail;
   the contact portions of the plurality of conductive elements are positioned in a row;
   the plurality of conductive elements comprises conductive elements of a first type and a second type;
   the conductive elements of the first type have intermediate portions with a 90 degree bend and contact tails configured for attachment to a printed circuit board; and
   the conductive elements of the second type have contact tails configured for a cable termination.

A2. The electrical connector of example A1, wherein the contact portions of the plurality of conductive elements positioned in a row are arranged having a row direction parallel to a plane of the printed circuit board.

A3. The electrical connector of example A1, wherein:
the conductive elements of the second type have straight intermediate portions.

A4. The electrical connector of example A1, wherein:
the terminal subassembly comprises an insulative portion attached to intermediate portions of the plurality of conductive elements.

A5. The electrical connector of example A4, wherein:
the insulative portion of the terminal subassembly comprises a recess elongated in a direction of the row; and
the terminal subassembly further comprises:
  a conductive member held within the insulative portion, the conductive member electrically coupled to a first portion of the plurality of conductive elements and electrically insulated from a second portion of the plurality of conductive elements; and
  a lossy member disposed in the recess and electrically coupled to the conductive member.

A6. The electrical connector of example A4, wherein the terminal subassembly further comprises:
a plurality of cables having wires terminated to tails of the conductive elements of the second type; and
an overmold around portions of the plurality of cables.

A7. The electrical connector of example A6, wherein:
the conductive elements of the first type are disposed in the row between a first subset of the conductive elements of the second type and a second subset of the conductive elements of the second type; and
the overmold has an opening aligned with the conductive elements of the first type.

A8. The electrical connector of example A7, wherein:
the electrical connector further comprising a conductive cage comprising conductive walls bounding, at least in part, a cavity; and
the insulative portion of the terminal subassembly is attached directly to a wall of the cage.

A9. The electrical connector of example A1, wherein the terminal subassembly further comprises:
a plurality of cables having wires terminated to tails of the conductive elements of the second type; and
a shield member comprising a plurality of concave sections and a plurality of flat sections;
the plurality of concave sections are aligned with respective cables of the plurality of cables and partially encircle the terminated wires of the respective cables;
the flat sections are attached to conductive elements of the plurality of conductive elements adjacent to conductive elements to which the wires of the plurality of cables are terminated.

A10. The electrical connector of example A9, wherein:
the plurality of cables comprise conductive layers surrounding the wires; and
the shield member comprises tabs pressing against the conductive layers.

A11. The electrical connector of example A1, further comprising at least one ground member configured to couple each conductive element of the plurality of conductive elements to a ground contact of a circuit board.

A12. The electrical connector of example A11, wherein the at least one ground member comprises at least one ground clip.

A13. The electrical connector of example A11, wherein the at least one ground member comprises at least one ground staple.

A14. The electrical connector of example A11, wherein the at least one ground member comprises at least one pressfit tail.

A15. The electrical connector of example A11, wherein the at least one ground member is configured to be bent around the terminal subassembly.

B1. An electrical connector, comprising:
a plurality of terminal subassemblies, each of the plurality of terminal subassemblies comprising:
  a plurality of conductive elements, wherein:
    each conductive element of the plurality of conductive elements comprises a contact portion, a contact tail and an intermediate portion joining the contact portion and the contact tail;
    the contact portions of the plurality of conductive elements are positioned in a row;
    the plurality of conductive elements comprises conductive elements of a first type and a second type;
    the conductive elements of the first type have intermediate portions with a 90 degree bend and contact tails configured for attachment to a printed circuit board;
    the conductive elements of the second type have contact tails configured for a cable termination.

B2. The electrical connector of example B1, wherein the contact portions of the plurality of conductive elements positioned in a row of the plurality of terminal subassemblies are arranged having a row direction parallel to a plane of the printed circuit board.

B3. The electrical connector of example B1, wherein:
the plurality of terminal subassemblies are configured to nest.

B4. The electrical connector of example B3, wherein:
the plurality of terminal subassemblies are configured such that the contact tails of the second type of conductive elements of each of the plurality of terminal subassemblies form a two-dimensional array comprising a plurality of rows of contact tails parallel to the direction of the rows of contact portions.

B5. The electrical connector of example B1, wherein:
the plurality of terminal subassemblies comprise insulative overmolds; and
the insulative overmolds have projections configured to engage a cage.

B6. The electrical connector of example B1, further comprising at least one ground member configured to couple each conductive element of the plurality of conductive elements to a ground contact of a circuit board.

B7. The electrical connector of example B6, wherein the at least one ground member comprises at least one ground clip.

B8. The electrical connector of example B6, wherein the at least one ground member comprises at least one ground staple.

B9. The electrical connector of example B6, wherein the at least one ground member comprises at least one pressfit tail.

B10. The electrical connector of example B6, wherein the at least one ground member is configured to be bent around the plurality of terminal subassemblies.

C1. An electrical connector, comprising:
a plurality of terminal subassemblies, each of the plurality of terminal subassemblies comprising:
  a plurality of conductive elements, wherein:
    each conductive element of the plurality of conductive elements comprises a contact portion, a contact tail and an intermediate portion joining the contact portion and the contact tail;
    the contact portions of the plurality of conductive elements are positioned in a row extending in a direction from a first side of the terminal subassembly towards a second side of the terminal subassembly;

a first conductive member and a second conductive member;

wherein:
the first conductive member is disposed adjacent the first sides of the plurality of terminal subassemblies and engages conductive elements within the terminal subassemblies; and
the second conductive member is disposed adjacent the second sides of the plurality of terminal subassemblies and engages conductive elements within the terminal subassemblies.

C2. The electrical connector of example C1, wherein the contact portions of the plurality of conductive elements positioned in a row are arranged having a row direction parallel to a plane of the circuit board.

C3. The electrical connector of example C2, wherein at least one of the first conductive member or the second conductive member is arranged in a plane normal to the row direction.

C4. The electrical connector of example C1, wherein the first conductive member and the second conductive member comprise a first arm of a single member and a second arm of the single member.

C5. The electrical connector of example C1, wherein the first conductive member and the second conductive member comprise a first member and a second member separate from the first member.

C6. The electrical connector of example C1, wherein:
the plurality of terminal subassemblies are disposed within a cage comprising an engagement feature; and
an engagement feature of at least one terminal subassembly of the plurality of terminal subassemblies is engaged with the engagement feature of the cage.

C7. The electrical connector of example C6, wherein the engagement feature of the at least one terminal subassembly is fixed to the engagement feature of the cage.

C8. The electrical connector of example C6, wherein the engagement feature of the cage comprises a slot and the engagement feature of the at least one terminal subassembly comprises a projection disposed in the slot.

C9. The electrical connector of example C6, wherein the engagement feature of the at least one terminal subassembly comprises an insulative portion of the at least one terminal subassembly.

C10. The electrical connector of example C6, wherein the engagement feature comprises a portion of each terminal subassembly of the plurality of terminal subassemblies.

C11. The electrical connector of example C6, wherein:
the electrical connector is configured for a mating direction orthogonal to a row direction from the first side of the terminal subassembly towards the second side of the terminal subassembly;
the engagement feature of the cage engages with the engagement feature of the at least one terminal subassembly to constrain motion of the plurality of terminal subassemblies in the mating direction; and
the engagement feature of the cage is a first engagement feature;
the cage comprises a second engagement feature;
the connector comprises an insulative member, coupled to the terminal subassemblies, and the insulative member comprises a further engagement feature; and
the further engagement feature is engaged with the second engagement feature to constrain motion of the plurality of terminal subassemblies in a direction perpendicular to the mating direction and the row direction.

C12. The electrical connector of example C11, wherein:
the insulative member, coupled to the terminal subassemblies, is an organizer for the contact tails of the plurality of terminal subassemblies.

D1. An input/output (I/O) connector, comprising:
a cage comprising a channel and at least one engagement feature;
a plurality of terminal subassemblies, each of the plurality of terminal subassemblies comprising:
a plurality of conductive elements, wherein:
each conductive element of the plurality of conductive elements comprises a contact portion, a contact tail and an intermediate portion joining the contact portion and the contact tail;
the contact portions of the plurality of conductive elements are positioned in a row;
an insulative portion holding the plurality of conductive elements, wherein:
the plurality of terminal subassemblies engage the at least one engagement feature of the cage such that the contact portions of the plurality of terminal subassemblies are positioned at predetermined locations within the at least one channel.

D2. The I/O connector of example D1, wherein:
the channel is elongated in a first direction; and
the at least one engagement feature of the cage comprises a slot that is elongated in a second direction, perpendicular to the first direction.

D3. The I/O connector of example D2, wherein an engagement feature of at least one terminal subassembly of the plurality of terminal subassemblies comprises a projection disposed in the slot.

D4. The I/O connector of example D3, wherein the projection comprises an insulative portion of the at least one terminal subassembly.

D5. The I/O connector of example D3, wherein the projection comprises a portion of each terminal subassembly of the plurality of terminal subassemblies.

E1. An electrical connector, comprising:
a plurality of terminal subassemblies, each of the plurality of terminal subassemblies comprising:
a plurality of conductive elements, wherein:
each conductive element of the plurality of conductive elements comprises a contact portion, a contact tail and an intermediate portion joining the contact portion and the contact tail;
the contact portions of the plurality of conductive elements are positioned in a row extending in a direction from a first side of the terminal subassembly towards a second side of the terminal subassembly;
an alignment member comprising a first edge and a second edge;
biasing members between the plurality of terminal subassemblies and the alignment member
wherein:
the biasing members are configured to urge surfaces of the plurality of terminal subassemblies against the second edge of the alignment member such that the plurality of terminal subassemblies have a predetermined position with respect to the alignment member.

E2. The electrical connector of example E1, wherein the biasing members comprise tabs extending from conductive elements in the plurality of terminal subassemblies.

E3. The electrical connector of example E1, wherein the alignment member comprises a portion of a stamped sheet of metal.

E4. The electrical connector of example E3, wherein the portion of the stamped sheet of metal comprises the first edge and the second edge.

E5. The electrical connector of example E1, wherein the first edge is not parallel to the second edge.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Also, circuits and modules depicted and described may be reordered in any order, and signals may be provided to enable reordering accordingly.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

Also, the phraseology and terminology used herein are for the purpose of description and should not be regarded as limiting. The use of "including," "comprising," "having," "containing," or "involving," and variations thereof herein, is meant to encompass the items listed thereafter (or equivalents thereof) and/or as additional items.

What is claimed is:

1. An receptacle connector comprising:
   a housing configured to receive a mating connector;
   a terminal subassembly coupled to the housing, the terminal subassembly comprising:
      a plurality of conductive elements, wherein:
         each conductive element of the plurality of conductive elements comprises a contact portion, a contact tail and an intermediate portion joining the contact portion and the contact tail;
         the contact portions of the plurality of conductive elements are positioned in a row;
         the plurality of conductive elements comprises a plurality of signal conductors and a plurality of ground conductors; and
      a shield comprising concave sections and flat portions, wherein the concave portions are aligned with signal conductors of the plurality of signal conductors and the flat portions are welded to ground conductors of the plurality of ground conductors.

2. The receptacle connector of claim 1, wherein:
   the plurality of signal conductors comprises a pair of signal conductors;
   a first flat portion of the flat portions is welded to a first ground conductor of the plurality of ground conductors on a first side of the pair of signal conductors; and
   a second flat portion of the flat portions is welded to a second ground conductor of the plurality of ground conductors on a second side of the pair of signal conductors.

3. The receptacle connector of claim 1, further comprising a conductive member welded to the intermediate portions of ground conductors of the plurality of ground conductors.

4. The receptacle connector of claim 3, wherein the conductive member comprises a shorting bar.

5. The receptacle connector of claim 3, wherein:
   the contact portions of the plurality of conductive elements are positioned in the row along a row direction;
   the row direction in perpendicular to an insertion direction for the electrical connector; and the shield and the conductive member are spaced along the insertion direction.

6. The receptacle connector of claim 5, wherein:
the receptacle connector comprises a plurality of shields elongated in the row direction;
the shield is a first shield of the plurality of shields; and
the receptacle connector further comprises at least one ground member elongated in a direction perpendicular to the row direction and engaging each of the plurality of shields.

7. The receptacle connector of claim 6, wherein the at least one ground member comprises at least one ground clip or at least one ground staple.

8. The receptacle connector of claim 1, wherein:
the plurality of conductive elements comprises conductive elements of a first type and a second type;
the conductive elements of the first type have intermediate portions that bend through 90 degrees, and contact tails configured for attachment to a printed circuit board; and
the conductive elements of the second type have contact tails configured for a cable termination.

9. The receptacle connector of claim 8, wherein the contact portions of the plurality of conductive elements positioned in the row are disposed within the housing.

10. The receptacle connector of claim 8, wherein:
the conductive elements of the second type have straight intermediate portions.

11. An electrical connector comprising:
a plurality of terminal subassemblies, wherein each of the plurality of terminal subassemblies comprises:
a plurality of conductive elements, wherein:
each conductive element of the plurality of conductive elements comprises a contact portion, a contact tail and an intermediate portion joining the contact portion and the contact tail;
the contact portions of the plurality of conductive elements are positioned in a row;
the plurality of conductive elements comprises a plurality of signal conductors and a plurality of ground conductors; and
a first conductive member welded to intermediate portions of ground conductors of the plurality of ground conductors;
a second conductive member welded to the intermediate portions of ground conductors of the plurality of ground conductors.

12. The electrical connector of claim 11, wherein for at least one of the plurality of terminal subassemblies, the first conductive member comprises a shield comprising concave sections and flat portions, wherein the concave portions are aligned with intermediate portions of signal conductors of the plurality of signal conductors and the flat portions are welded to the intermediate portions of ground conductors of the plurality of ground conductors.

13. The electrical connector of claim 12, wherein for the at least one of the plurality of terminal subassemblies:
the plurality of signal conductors comprises a pair of signal conductors;
a first flat portion of the flat portions is welded to an intermediate portion of a first ground conductor of the plurality of ground conductors on a first side of the pair of signal conductors; and
a second flat portion of the flat portions is welded to an intermediate portion of a second ground conductor of the plurality of ground conductors on a second side of the pair of signal conductors.

14. The electrical connector of claim 11, wherein for each of the plurality of terminal subassemblies the second conductive member comprises a shorting bar.

15. The electrical connector of claim 11, wherein for each of the plurality of terminal subassemblies:
the contact portions of the plurality of conductive elements are positioned in the row along a row direction;
the row direction in perpendicular to an insertion direction for the electrical connector; and
the first conductive member and the second conductive member are spaced along the insertion direction.

16. The electrical connector of claim 11, further comprising at least one ground member configured to electrically couple together ground conductors of the plurality of terminal subassemblies.

17. The electrical connector of claim 16, wherein the at least one ground member comprises at least one ground clip or at least one ground staple.

18. The electrical connector of claim 11, wherein for at least one of the plurality of terminal subassemblies:
the plurality of conductive elements comprises conductive elements of a first type and a second type;
the conductive elements of the first type have intermediate portions that bend through 90 degrees, and contact tails configured for attachment to a printed circuit board; and
the conductive elements of the second type have contact tails configured for a cable termination.

19. The electrical connector of claim 18, wherein for the at least one of the plurality of terminal subassemblies the contact portions of the plurality of conductive elements positioned in the row have contact portions configured to mate with a mating component.

20. The electrical connector of claim 18, wherein for the at least one of the plurality of terminal subassemblies:
the conductive elements of the second type have straight intermediate portions.

* * * * *

UNITED STATES PATENT AND TRADEMARK OFFICE
CERTIFICATE OF CORRECTION

PATENT NO. : 11,637,390 B2
APPLICATION NO. : 17/535425
DATED : April 25, 2023
INVENTOR(S) : Arkady Y. Zerebilov et al.

Page 1 of 1

It is certified that error appears in the above-identified patent and that said Letters Patent is hereby corrected as shown below:

In the Claims

At Column 42, Claim number 1, Line 44:
"wherein the concave portions are aligned with signal"
Should read:
"wherein the concave sections are aligned with signal"

At Column 42, Claim number 5, Line 67:
"for the electrical connector; and"
Should read:
"for the receptacle connector; and"

At Column 43, Claim number 12, Line 51:
"sections and flat portions, wherein the concave portions are"
Should read:
"sections and flat portions, wherein the concave sections are"

Signed and Sealed this
Twelfth Day of August, 2025

Coke Morgan Stewart
*Acting Director of the United States Patent and Trademark Office*